(12) United States Patent
Andrews et al.

(10) Patent No.: US 11,628,748 B2
(45) Date of Patent: Apr. 18, 2023

(54) VISIBILITY ENHANCEMENTS FOR DELIVERY VEHICLE

(71) Applicant: Oshkosh Corporation, Oshkosh, WI (US)

(72) Inventors: Benjamin Andrews, Oshkosh, WI (US); Robert Wesley Holliday, Oshkosh, WI (US); Dan Nett, Oshkosh, WI (US); Annette Rantanen, Oshkosh, WI (US); Paul Schmidt, Oshkosh, WI (US); Nick Winter, Oshkosh, WI (US); Mitchell Wolfrath, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 15 days.

(21) Appl. No.: 17/369,160

(22) Filed: Jul. 7, 2021

(65) Prior Publication Data
US 2022/0009563 A1 Jan. 13, 2022

Related U.S. Application Data

(60) Provisional application No. 63/049,456, filed on Jul. 8, 2020, provisional application No. 63/049,438, filed on Jul. 8, 2020, provisional application No. 63/049,377, filed on Jul. 8, 2020, provisional application No. 63/049,374, filed on Jul. 8, 2020, provisional application No. 63/049,446, filed on Jul. 8, 2020, provisional application No. 63/049,444, filed on Jul. 8, 2020.

(51) Int. Cl.
*B60N 2/015* (2006.01)
*B60N 2/06* (2006.01)
(Continued)

(52) U.S. Cl.
CPC ............ *B60N 2/01508* (2013.01); *B60J 1/08* (2013.01); *B60J 1/10* (2013.01); *B60J 1/12* (2013.01);
(Continued)

(58) Field of Classification Search
CPC ........ B60N 2/01508; B60N 2/00; B60N 2/06; B60N 2/688; B60N 2/005; B60N 2/015;
(Continued)

(56) References Cited

U.S. PATENT DOCUMENTS 3,245,714 A 4/1966 Blair
3,313,571 A 4/1967 Ferrara
(Continued)

FOREIGN PATENT DOCUMENTS

CN 101191339 A * 6/2008 ............ B60J 5/0487
EP 3 626 523 A1 3/2020
(Continued)

OTHER PUBLICATIONS

Canadian Office Action issued in connection with CA Appl. Ser. No. 3124175 dated Oct. 25, 2022.
(Continued)

*Primary Examiner* — Pinel E Romain
(74) *Attorney, Agent, or Firm* — Foley & Lardner LLP

(57) ABSTRACT

A vehicle includes a chassis defining a longitudinal axis, a cab coupled to the chassis, a cargo body coupled to the chassis and positioned rearward of the cab, and a driver seat disposed within the cab. The cab has a first door with a first window and a second door with a second window. When the driver seat is in a position that accommodates an operator being in the 95$^{th}$ male height percentile, the operator within the driver seat can see out of (i) the first window at a first angle relative to a forward looking direction that is parallel with the longitudinal axis and (ii) the second window at a second angle relative to the forward looking direction. Each of the first angle and the second angle is at least 95 degrees.

20 Claims, 68 Drawing Sheets

(51) Int. Cl.
| | |
|---|---|
| B60R 7/08 | (2006.01) |
| B60P 3/00 | (2006.01) |
| B60J 5/04 | (2006.01) |
| B60J 10/70 | (2016.01) |
| B60J 1/10 | (2006.01) |
| B60J 1/12 | (2006.01) |
| B60J 1/08 | (2006.01) |
| B60N 2/00 | (2006.01) |
| B62D 1/16 | (2006.01) |
| B62D 21/02 | (2006.01) |
| B62D 25/04 | (2006.01) |
| B62D 25/08 | (2006.01) |
| B62D 25/10 | (2006.01) |
| B62D 33/06 | (2006.01) |
| E05B 81/14 | (2014.01) |
| E05B 83/40 | (2014.01) |
| B60P 7/08 | (2006.01) |
| B60P 7/15 | (2006.01) |
| B60N 2/68 | (2006.01) |

(52) U.S. Cl.
CPC .............. *B60J 5/04* (2013.01); *B60J 5/0401* (2013.01); *B60J 10/70* (2016.02); *B60N 2/00* (2013.01); *B60N 2/06* (2013.01); *B60P 3/007* (2013.01); *B60P 7/0815* (2013.01); *B60P 7/15* (2013.01); *B60R 7/08* (2013.01); *B62D 1/16* (2013.01); *B62D 21/02* (2013.01); *B62D 25/04* (2013.01); *B62D 25/082* (2013.01); *B62D 25/10* (2013.01); *B62D 33/06* (2013.01); *E05B 81/14* (2013.01); *E05B 83/40* (2013.01); *B60N 2/688* (2013.01)

(58) Field of Classification Search
CPC ..... B60N 2/065; B60J 1/08; B60J 1/10; B60J 1/12; B60J 5/04; B60J 5/0401; B60J 10/70; B60J 5/0477; B60J 5/06; B60P 3/007; B60P 7/0815; B60P 7/15; B60R 7/08; B62D 1/16; B62D 21/02; B62D 25/04; B62D 25/082; B62D 25/10; B62D 33/06; B62D 33/04; E05B 81/14; E05B 83/40; E05B 29/00; E05B 79/04; E05Y 2900/518; E05Y 2900/531; E05C 3/042
USPC ...................................................... 296/190.1
See application file for complete search history.

(56) References Cited

U.S. PATENT DOCUMENTS

| | | |
|---|---|---|
| 3,808,742 A | 5/1974 | Ehret |
| 5,493,881 A | 2/1996 | Harvey |
| 5,538,274 A | 7/1996 | Schmitz et al. |
| 5,697,741 A | 12/1997 | Harris et al. |
| 5,741,000 A | 4/1998 | Goodbred |
| 5,779,300 A | 7/1998 | Mcneilus et al. |
| 5,829,946 A | 11/1998 | Mcneilus et al. |
| 5,931,628 A | 8/1999 | Christenson |
| 6,149,290 A | 11/2000 | Quigley |
| 6,290,450 B1 | 9/2001 | Humphries et al. |
| 6,485,079 B1 | 11/2002 | Brown et al. |
| 6,527,495 B2 | 3/2003 | Humphries et al. |
| 6,666,491 B2 | 12/2003 | Schrafel |
| 6,883,671 B2 | 4/2005 | Rushing |
| 6,918,721 B2 | 7/2005 | Venton-Walters et al. |
| 6,938,749 B1 | 9/2005 | Quigley et al. |
| 6,997,506 B2 | 2/2006 | Hecker |
| 7,055,880 B2 | 6/2006 | Archer |
| 7,073,847 B2 | 7/2006 | Morrow et al. |
| 7,118,314 B2 | 10/2006 | Zhou et al. |
| 7,264,305 B2 | 9/2007 | Kuriakose |
| 7,370,904 B2 | 5/2008 | Wood et al. |
| 7,517,005 B2 | 4/2009 | Kuriakose |
| 7,621,580 B2 | 11/2009 | Randjelovic et al. |
| 7,823,948 B2 | 11/2010 | Redman et al. |
| 7,909,184 B2 | 3/2011 | Clark et al. |
| 7,909,379 B2 | 3/2011 | Winget et al. |
| 7,954,882 B2 | 6/2011 | Brummel et al. |
| 8,152,216 B2 | 4/2012 | Howell et al. |
| 8,376,439 B2 | 2/2013 | Kuriakose et al. |
| 8,656,842 B1 | 2/2014 | Mcdonley |
| 8,662,525 B1 | 3/2014 | Dierks et al. |
| 8,794,886 B1 | 8/2014 | Nett et al. |
| 8,967,699 B1 | 3/2015 | Richmond et al. |
| 9,045,014 B1 | 6/2015 | Verhoff et al. |
| 9,174,686 B1 | 11/2015 | Messina et al. |
| 9,366,507 B1 | 6/2016 | Richmond et al. |
| 9,493,093 B2 | 11/2016 | Stingle et al. |
| 9,656,640 B1 | 5/2017 | Verhoff et al. |
| 9,707,869 B1 | 7/2017 | Messina et al. |
| 9,738,186 B2 | 8/2017 | Krueger et al. |
| 9,802,655 B2 | 10/2017 | Sharbono et al. |
| 10,309,132 B1 * | 6/2019 | Johnson ................ B60J 5/0479 |
| 10,545,010 B1 | 1/2020 | Leeman et al. |
| 10,611,416 B1 | 4/2020 | Groteleuschen et al. |
| D907,544 S | 1/2021 | Wall et al. |
| 11,225,185 B1 | 1/2022 | Mcgraw et al. |
| 11,440,456 B1 | 9/2022 | Willison et al. |
| 2003/0226737 A1 | 12/2003 | Quigley et al. |
| 2005/0131600 A1 | 6/2005 | Quigley et al. |
| 2005/0156445 A1 | 7/2005 | Mains |
| 2005/0263337 A1 | 12/2005 | Corey et al. |
| 2006/0055206 A1 | 3/2006 | Morrow et al. |
| 2007/0189108 A1 | 8/2007 | Lindblom et al. |
| 2008/0004777 A1 | 1/2008 | Quigley |
| 2008/0059030 A1 | 3/2008 | Quigley et al. |
| 2008/0099213 A1 | 5/2008 | Morrow et al. |
| 2011/0148134 A1 * | 6/2011 | Gerhardt ................. B60P 3/423 296/24.4 |
| 2012/0282077 A1 | 11/2012 | Alberts et al. |
| 2014/0054916 A1 | 2/2014 | Knudtson et al. |
| 2014/0131969 A1 | 5/2014 | Rowe et al. |
| 2015/0034580 A1 | 2/2015 | Hofvander |
| 2015/0224847 A1 | 8/2015 | Rowe et al. |
| 2015/0246331 A1 | 9/2015 | Broker et al. |
| 2015/0298749 A1 * | 10/2015 | Zurinski ............ B60H 1/00207 296/190.08 |
| 2016/0144211 A1 | 5/2016 | Betz et al. |
| 2017/0253221 A1 | 9/2017 | Verhoff et al. |
| 2019/0168678 A1 | 6/2019 | Magnuson et al. |
| 2019/0185077 A1 | 6/2019 | Smith et al. |
| 2019/0217698 A1 | 7/2019 | Broker et al. |
| 2019/0322321 A1 | 10/2019 | Schwartz et al. |
| 2019/0351883 A1 | 11/2019 | Verhoff et al. |
| 2020/0158474 A1 | 5/2020 | Leeman et al. |
| 2020/0189498 A1 | 6/2020 | Line et al. |
| 2020/0247486 A1 | 8/2020 | Groteleuschen et al. |
| 2020/0290238 A1 | 9/2020 | Andringa et al. |
| 2022/0144051 A1 * | 5/2022 | Singh .................... B60J 5/0497 |

FOREIGN PATENT DOCUMENTS

| | | |
|---|---|---|
| FR | 2936196 A1 | 3/2010 |
| GB | 2 592 940 A | 9/2021 |

OTHER PUBLICATIONS

Canadian Office Action issued in connection with CA Appl. Ser. No. 3124181 dated Oct. 7, 2022.

* cited by examiner

VISIBILITY ENHANCEMENTS FOR DELIVERY VEHICLE

CROSS-REFERENCE TO RELATED PATENT APPLICATIONS

This application (a) claims the benefit of and priority to (i) U.S. Provisional Patent Application No. 63/049,374, filed Jul. 8, 2020, (ii) U.S. Provisional Patent Application No. 63/049,377, filed Jul. 8, 2020, (iii) U.S. Provisional Patent Application No. 63/049,438, filed Jul. 8, 2020, (iv) U.S. Provisional Patent Application No. 63/049,444, filed Jul. 8, 2020, (v) U.S. Provisional Patent Application No. 63/049,446, filed Jul. 8, 2020, and (vi) U.S. Provisional Patent Application No. 63/049,456, filed Jul. 8, 2020, and (b) is related to (i) U.S. patent application Ser. No. 17/369,303, filed Jul. 7, 2021, (ii) U.S. patent application Ser. No. 17/369,762, filed Jul. 7, 2021, (iii) U.S. patent application Ser. No. 17/369,755, filed Jul. 7, 2021, (iv) U.S. patent application Ser. No. 17/369,652, filed Jul. 7, 2021, and (v) U.S. patent application Ser. No. 17/369,667, filed Jul. 7, 2021, all of which are incorporated herein by reference in their entireties.

BACKGROUND

Delivery vehicles may have a number of doors, a cab, and a cargo portion. An operator may operate the vehicle from the cab. The cargo portion may serve as a storage area for parcels. The doors may provide entry and exit points for the operator to and from the cab and/or the cargo portion.

SUMMARY

One embodiment relates to a vehicle. The vehicle includes a chassis defining a longitudinal axis, a cab coupled to the chassis, a cargo body coupled to the chassis and positioned rearward of the cab, and a driver seat disposed within the cab. The cab has a first door with a first window and a second door with a second window. When the driver seat is in a position that accommodates an operator being in the $95^{th}$ male height percentile, the operator within the driver seat can see out of (i) the first window at a first angle relative to a forward looking direction that is parallel with the longitudinal axis and (ii) the second window at a second angle relative to the forward looking direction. Each of the first angle and the second angle is at least 95 degrees.

Another embodiment relates to a vehicle. The vehicle includes a chassis defining a longitudinal axis, a cab coupled to the chassis, and a driver seat disposed within the cab. The cab has a driver side door with a window. When the driver seat is in a position that accommodates an operator being in the $95^{th}$ male height percentile, the operator within the driver seat can see out of the window at an angle of at least 120 degrees relative to a forward looking direction that is parallel with the longitudinal axis.

Still another embodiment relates to a vehicle. The vehicle includes a chassis defining a longitudinal axis, a cab coupled to the chassis, a cargo body coupled to the chassis and positioned rearward of the cab, a driver seat disposed within the cab, and a steering column positioned within the cab. The cab has a first door with a first window and a second door with a second window. The driver seat and the steering column are centered about a central seating plane. The central seating plane is positioned a first distance from a side of the cab. The first distance is less than 25% of a total width of the cab. When the driver seat is in a position that accommodates an operator being in the $95^{th}$ male height percentile, (i) the driver seat is positioned a second distance of at least four inches forward of a rear edge of the first window and (ii) the operator within the driver seat can see out of (a) the first window at a first angle relative to a forward looking direction that is parallel with the longitudinal axis and (b) the second window at a second angle relative to the forward looking direction. The first angle is at least 130 degrees. The second angle is at least 100 degrees.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

According to the exemplary embodiment shown in FIGS. 1-7, a vehicle (e.g., a parcel vehicle, a cargo transport vehicle, a mail vehicle, a postal vehicle, a postal van, a truck, a van, etc.), shown as delivery vehicle 10, is configured to facilitate improved parcel delivery. Generally, the delivery vehicle 10 may be a specialized vehicle that transports parcels (e.g., mail, packages, etc.) from a distribution center (e.g., a post office, a warehouse, etc.) to various delivery locations (e.g., recipients' homes, offices, etc.).

Figure 1:
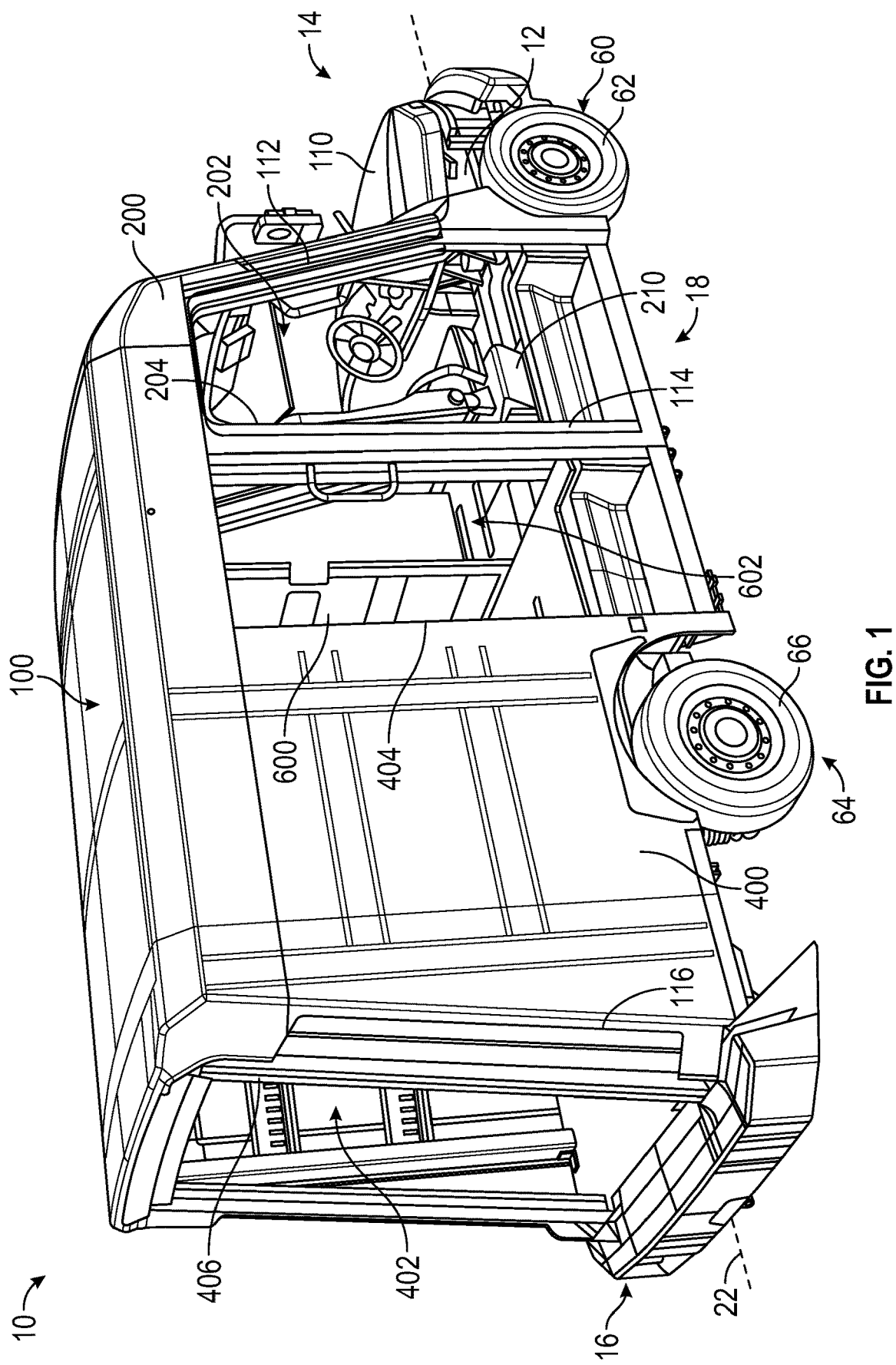
FIG. 1 is a rear perspective view of a delivery vehicle, according to an exemplary embodiment.
Figure 2:
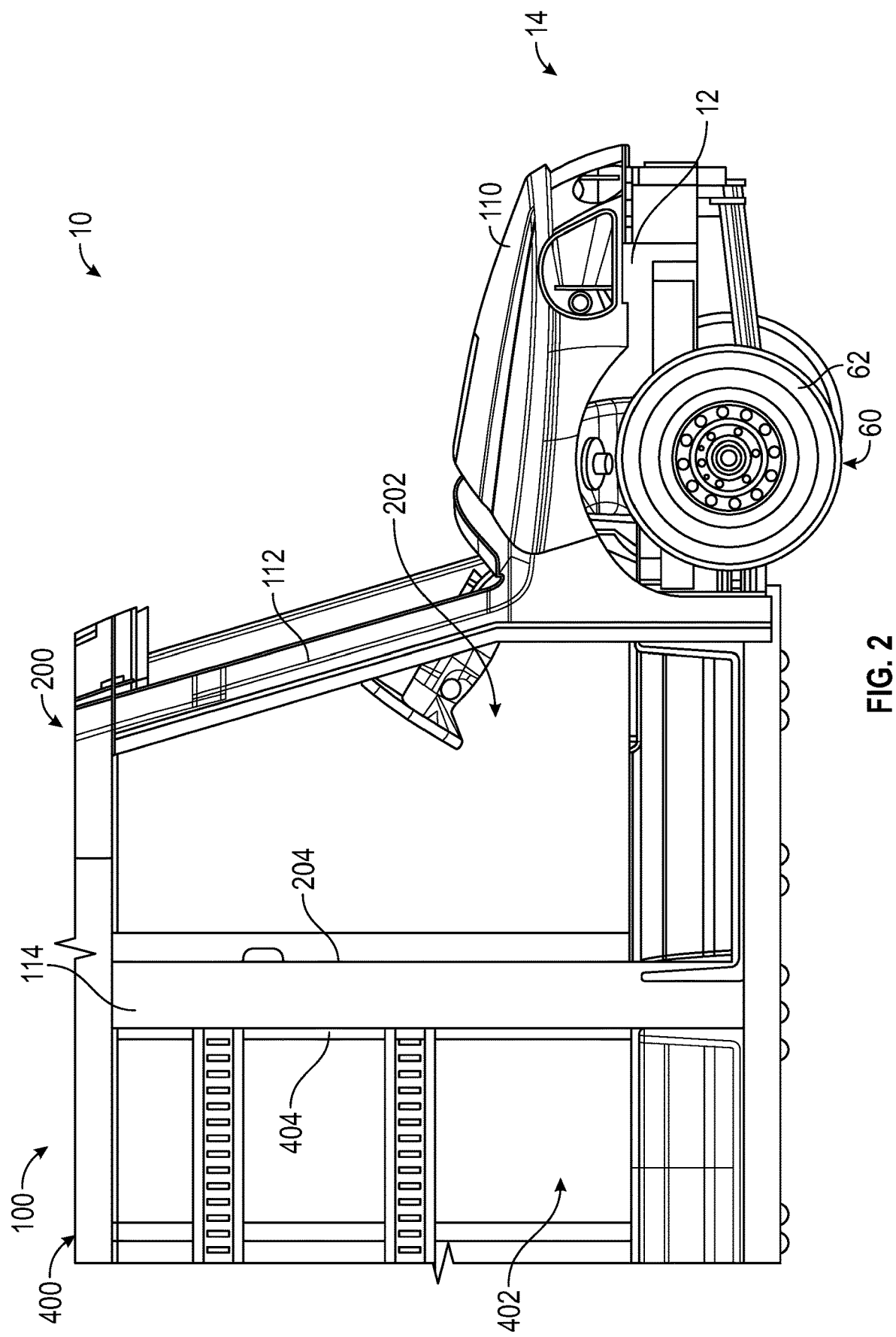
FIG. 2 is a partial side view of the delivery vehicle of FIG. 1, according to an exemplary embodiment.

As shown in FIGS. 1-7, the delivery vehicle 10 includes a chassis, shown as a frame 12. The frame 12 defines a first end, shown as front end 14, an opposing second end, shown as rear end 16, a first lateral side (e.g., a driver side, etc.), shown as right side 18, and an opposing second lateral side (e.g., a passenger side, etc.), shown as left side 20, of the delivery vehicle 10. While components of the delivery vehicle 10 may be described as being positioned along, proximate, adjacent, etc. the right side 18 or the left side 20 herein, it should be understood that such components could be positioned on the opposite side. As shown in FIG. 1, the frame 12 also defines a longitudinal axis, shown as central axis 22, extending longitudinally through the delivery vehicle 10 from the front end 14 to the rear end 16. As shown in FIG. 1-7, the frame 12 supports a first axle, shown as front axle 60, having a first plurality of tractive elements, shown as front wheels 62, coupled thereto; a second axle, shown as rear axle 64, having a second plurality of tractive elements, shown as rear wheels 66, coupled thereto; a power unit, shown as powertrain 70, that drives the front axle 60 and/or the rear axle 64 to move the delivery vehicle 10; and a body assembly, shown as body 100.

Figure 5:
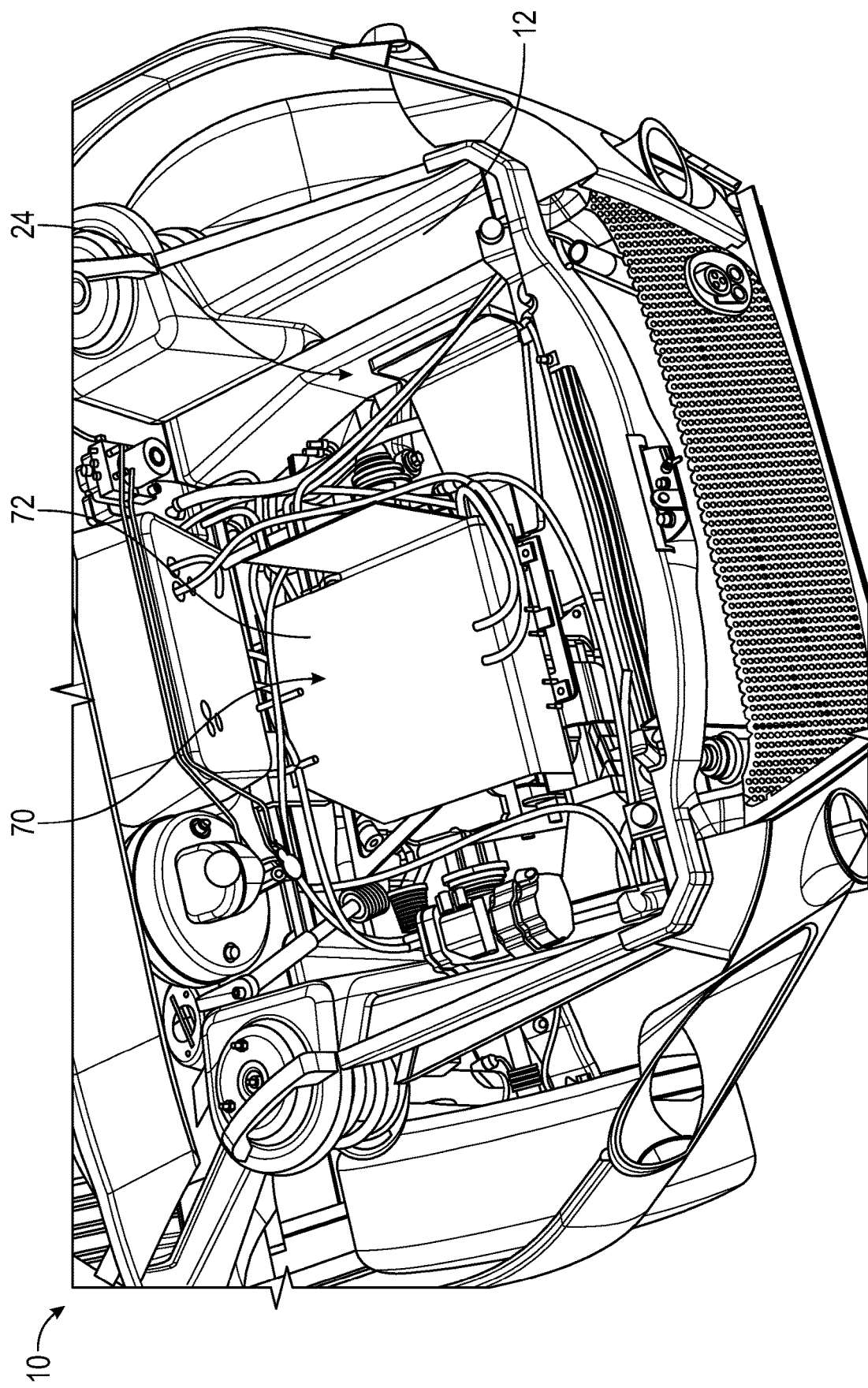
FIG. 5 is a detailed view of a primary driver compartment of the delivery vehicle of FIG. 1, according to an exemplary embodiment.
Figure 6:
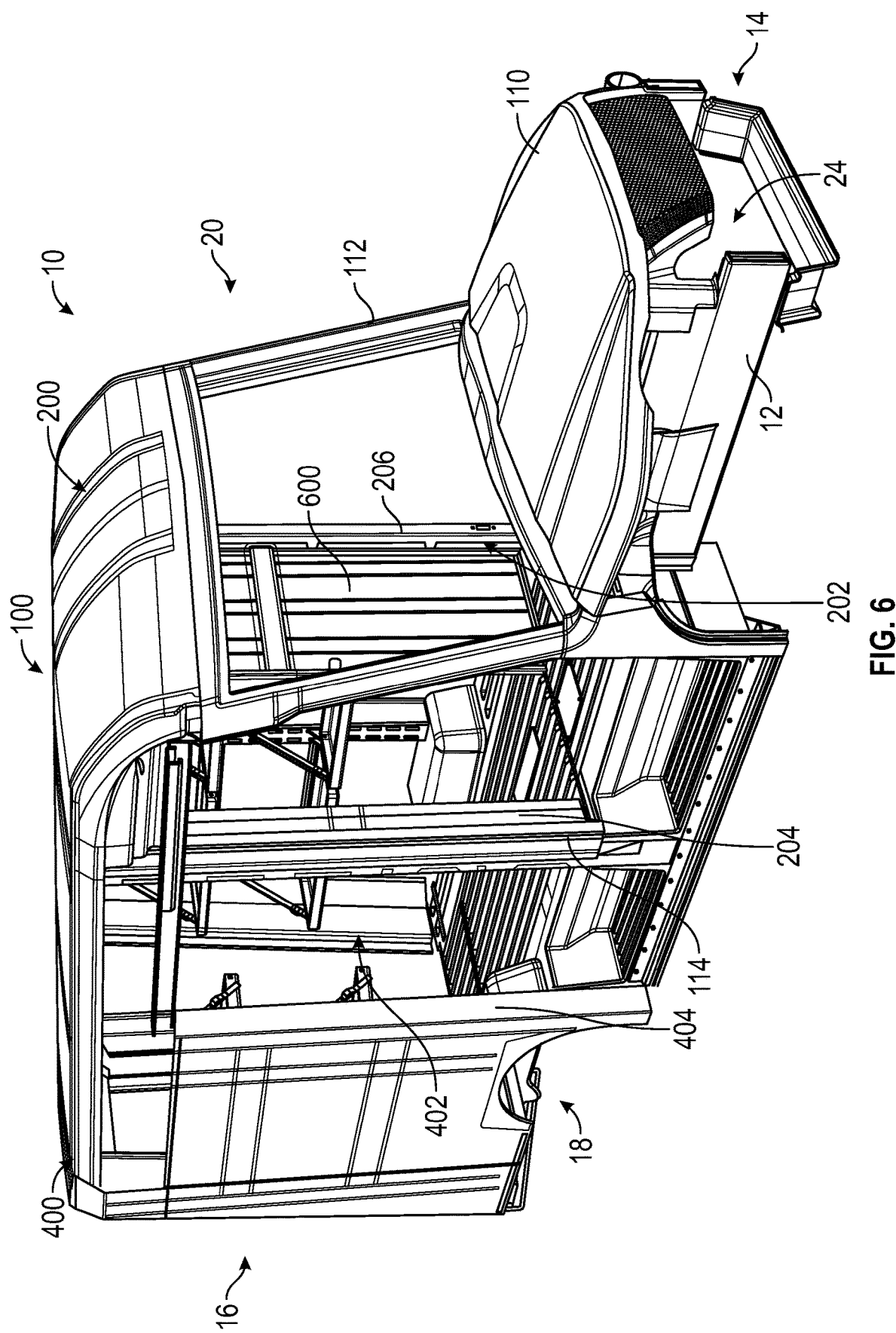
FIG. 6 is a right side perspective view of the delivery vehicle of FIG. 1 without a side door assembly, according to an exemplary embodiment.

As shown in FIG. 5, the powertrain 70 includes a primary driver or prime mover, shown as engine 72, coupled to and disposed within a primary driver compartment, shown as engine compartment 24, at the front end 14 of the frame 12. In some embodiments, the powertrain 70 is a traditional, internal combustion engine driven powertrain. In some embodiments, the powertrain 70 additionally includes on-board energy storage (e.g., a battery pack, etc.), a generator, and/or an electric motor to supplement the engine 72 such that the powertrain 70 is a hybrid powertrain. In some embodiments, the powertrain 70 does not include the engine 72. Rather, the primary driver may be an electric motor and the powertrain 70 may include on-board energy storage such that the powertrain 70 is an electric powertrain. In another embodiment, the primary diver includes a fuel cell and an electric motor such that the powertrain 70 is a fuel cell electric powertrain.

As shown in FIGS. 1-4, 6, and 7, the body 100 includes a hood, shown as hood 110, coupled to the front end 14 of the frame 12 and extending over the engine compartment 24 within which the engine 72 is positioned; a first pair of pillars, shown as A-pillars 112; a second pair of pillars, shown as B-pillars 114; a third pair of pillars, shown as C-pillars 116; a front cabin, shown as cab 200, positioned between the A-pillars 112 and the B-pillars 114; a rear storage section, shown as cargo body 400, positioned behind the cab 200 and between the B-pillars 114 and the C-pillars 116; a divider, shown as partition 600, extending between the B-pillars 114 and at least partially separating the cab 200 from the cargo body 400; and a door assembly, shown as side door assembly 700.

Figure 3:
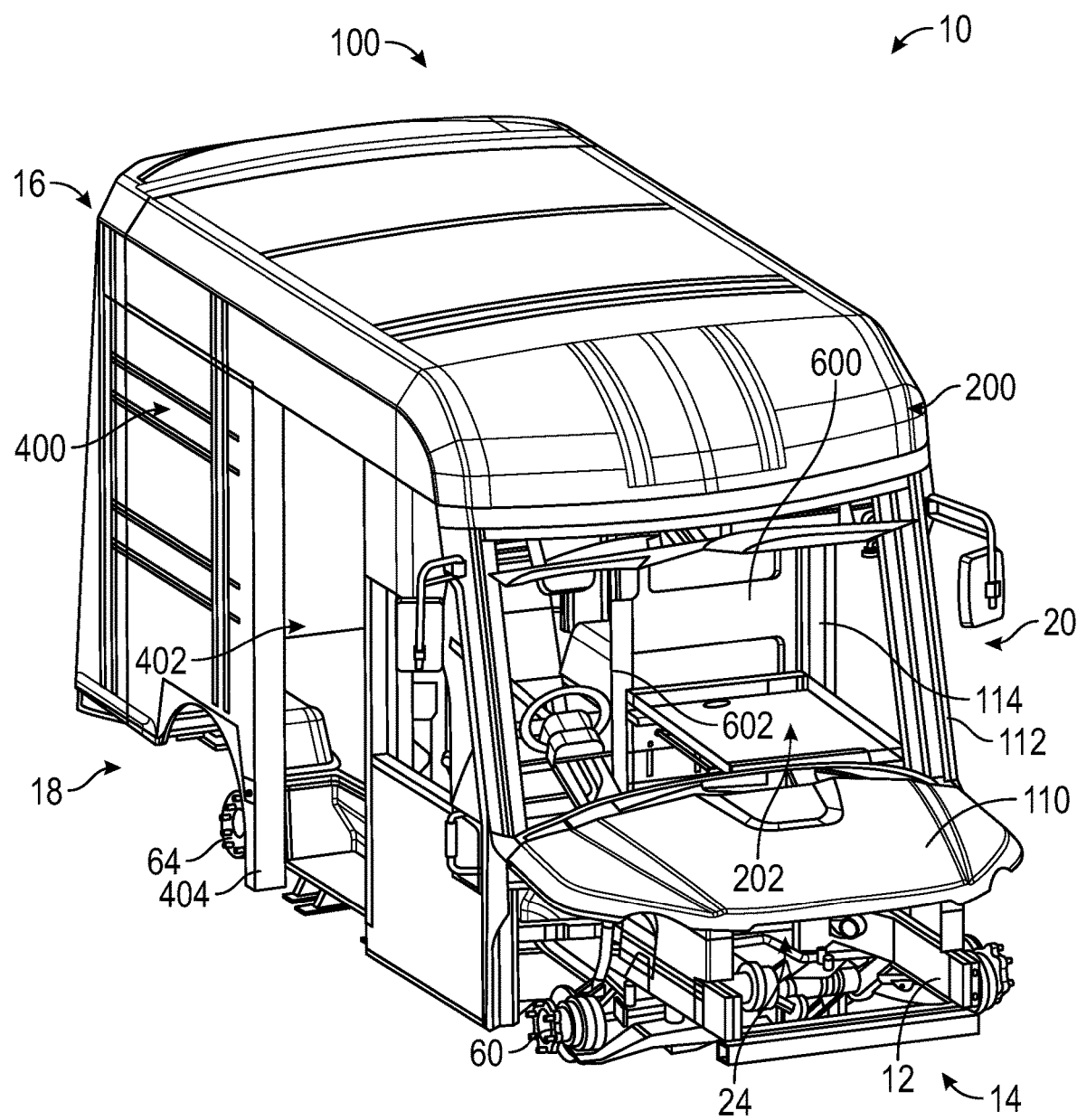
FIG. 3 is a front perspective view of the delivery vehicle of FIG. 1, according to an exemplary embodiment.
Figure 4:
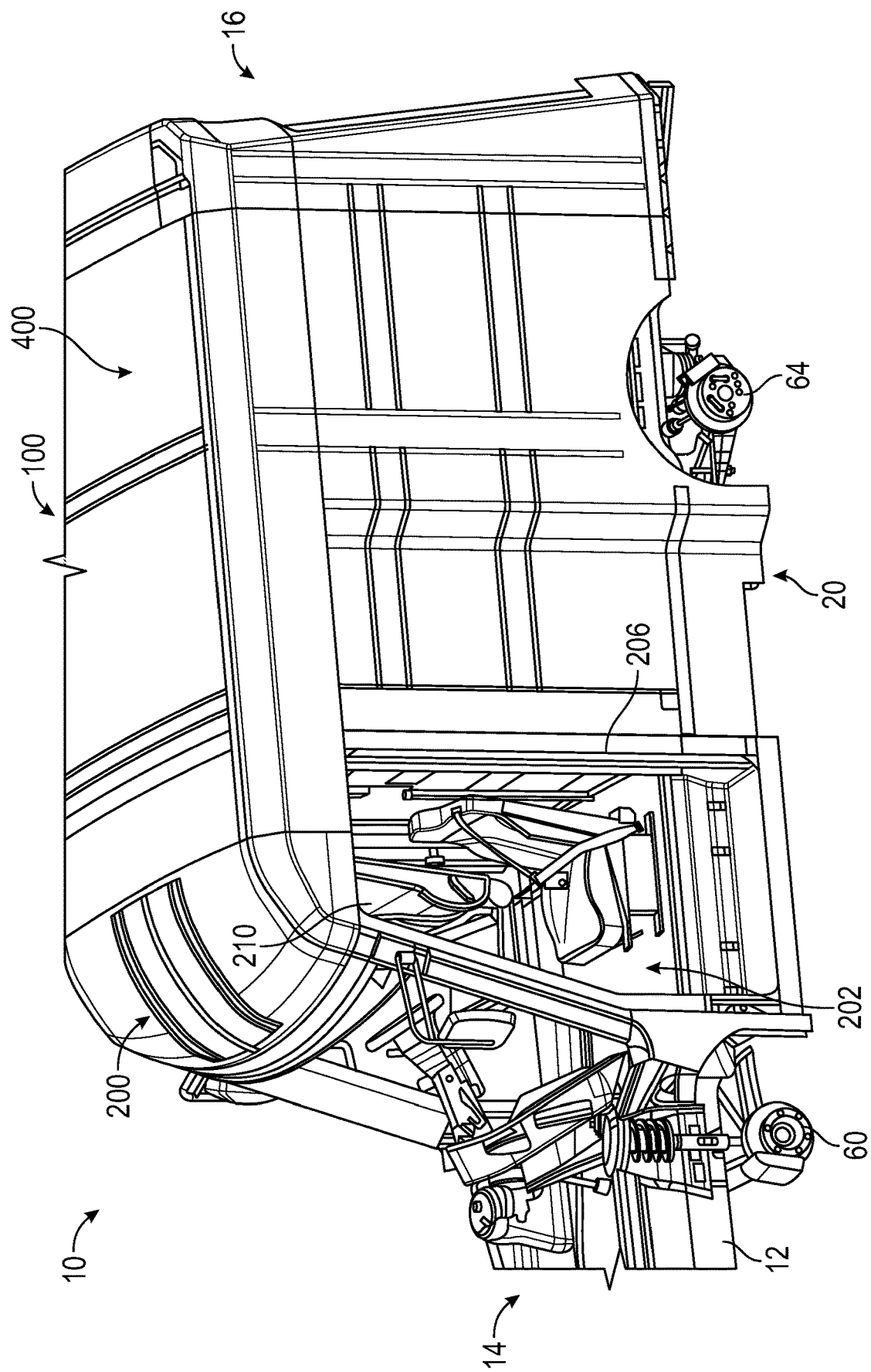
FIG. 4 is a left side perspective view of the delivery vehicle of FIG. 1, according to an exemplary embodiment.

As shown in FIGS. 1-4, 6, and 7, the cab 200 defines a first interior section or zone, shown as driver compartment 202, a first opening, shown as right cab opening 204, and a second opening, shown as left cab opening 206. The right cab opening 204 is positioned along the right side 18 of the delivery vehicle 10. The right cab opening 204 facilitates ingress into and egress from the driver compartment 202. The driver compartment 202 may be configured to contain or otherwise support a number of seats (e.g., one or more seats, etc.), storage units (e.g., a mail tray, etc.), and/or other equipment. As shown in FIGS. 1 and 4, the driver compartment 202 is configured to provide seating for an operator (e.g., a driver, etc.) of the delivery vehicle 10 with a seat, shown as driver seat 210. In some embodiments, the driver compartment 202 is configured to provide seating for a passenger of the delivery vehicle 10 (e.g., a temporary training seat, a repositionable passenger seat, etc.). The driver compartment 202 may also include various controls for driving the delivery vehicle 10 and/or operating the systems thereof (e.g., a user interface, a touchscreen, a display, a steering wheel, an accelerator pedal, a brake pedal, control levers, buttons, switches, etc.).

As shown in FIGS. 1-3 and 6, the cargo body 400 defines a second interior section or zone, shown as cargo compartment 402, a third opening, shown as side cargo opening 404, and a fourth opening, shown as rear cargo opening 406. The side cargo opening 404 is positioned along the right side 18 of the delivery vehicle 10 adjacent the right cab opening 204 with the right B-pillar 114 separating the two. The side cargo opening 404 facilitates ingress into and egress from the cargo compartment 402 from the right side 18 of the delivery vehicle 10. The rear cargo opening 406 is positioned at the rear end 16 of the delivery vehicle 10. The rear cargo opening 406 facilitates ingress into and egress from the cargo compartment 402 from the rear end 16 of the delivery vehicle 10. According to an exemplary embodiment, the cargo compartment 402 is configured to receive and store parcels (e.g., mail, packages, etc.) for transport and delivery via the delivery vehicle 10. In some embodiments, the cargo compartment 402 includes cabinets, shelves, racks, and/or other storage devices to facilitate organizing and securing the parcels within the cargo compartment 402.

As shown in FIGS. 1 and 3, the partition 600 is a partial partition that defines an opening, shown as passageway 602, that connects the driver compartment 202 to the cargo compartment 402. In some embodiments, the partition 600 includes a door or gate that at least partially and selectively encloses the passageway 602. In other embodiments, the partition 600 is a full partition that completely segregates the driver compartment 202 from the cargo compartment 402.

Figure 7:
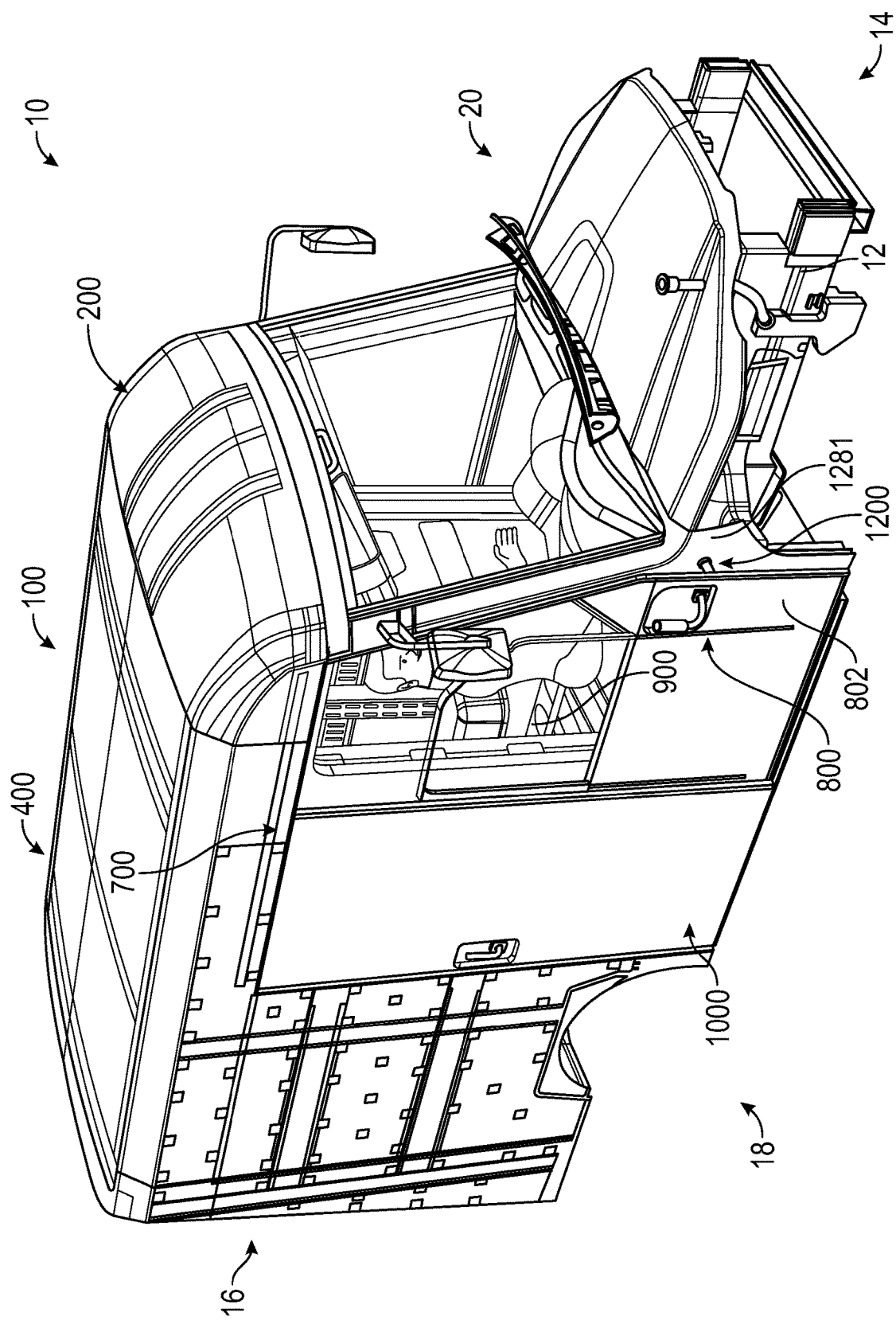
FIG. 7 is a right side perspective view of the delivery vehicle of FIG. 6 having the side door assembly, according to an exemplary embodiment.

As shown in FIG. 7, the side door assembly 700 includes a first door, shown driver cab door 800, a second door, shown as side cargo door 1000, and a locking assembly, shown as door locking assembly 1200. The driver cab door 800 extends over the right cab opening 204 and is selectively openable to access the driver compartment 202. According to an exemplary embodiment, the driver cab door 800 translates or slides rearward along the right side 18 of the body 100 from a closed position to an open position (e.g., such that the driver cab door 800 at least partially overlaps with the side cargo door 1000, extends past the B-pillar 114, etc.). In other embodiments, the driver cab door 800 is hingedly coupled to the body 100 (e.g., the A-pillar 112, etc.) and pivots between a closed position and an open position. As shown in FIG. 7, the driver cab door 800 includes a panel, shown as door panel 802, and a window assembly, shown as window assembly 900, disposed within the door panel 802. According to an exemplary, the delivery vehicle 10 includes a second cab door or passenger cab door positioned on the left side 20 of the cab 200 that extends over the left cab opening 206 and is selectively openable to access the driver compartment 202. The passenger cab door can similarly slide or pivot between an open position and a closed positioned to facilitate ingress into and egress from the cab 200 from the left side 20 of the delivery vehicle 10. According to an exemplary embodiment, the passenger cab door similarly includes a window disposed therein.

As shown in FIG. 7, the side cargo door 1000 extends over the side cargo opening 404 and is selectively openable to access the cargo compartment 402. According to an exemplary embodiment, the side cargo door 1000 translates or slides forward along the right side 18 of the body 100 from a closed position to an open position (e.g., such that the side cargo door 1000 at least partially overlaps with the driver cab door 800, toward the A-pillar 112, etc.). In another embodiment, the side cargo door 1000 translates or slides rearward along the right side 18 of the body 100 from a closed position to an open position (e.g., away from the right cab opening 204, toward the C-pillar 116, etc.). In other embodiments, the side cargo door 1000 is hingedly coupled to the body 100 (e.g., the B-pillar 114, etc.) and pivots between a closed position and an open position. According to an exemplary embodiment, the delivery vehicle 10 includes a rear door assembly that includes a rear cargo door. The rear cargo door extends over the rear cargo opening 406 and is selectively openable to access the cargo compartment 402.

Visibility Enhancements

According to an exemplary embodiment, the design of the delivery vehicle 10 and the arrangement of the components thereof (e.g., the front end 14 of the frame 12, the engine 72, the hood 110, the A-pillars 112, the driver seat 210, the driver cab door 800, the passenger cab door, etc.) provide various visibility enhancements that improve the visibility of the driver out of the cab 200.

Figure 8:
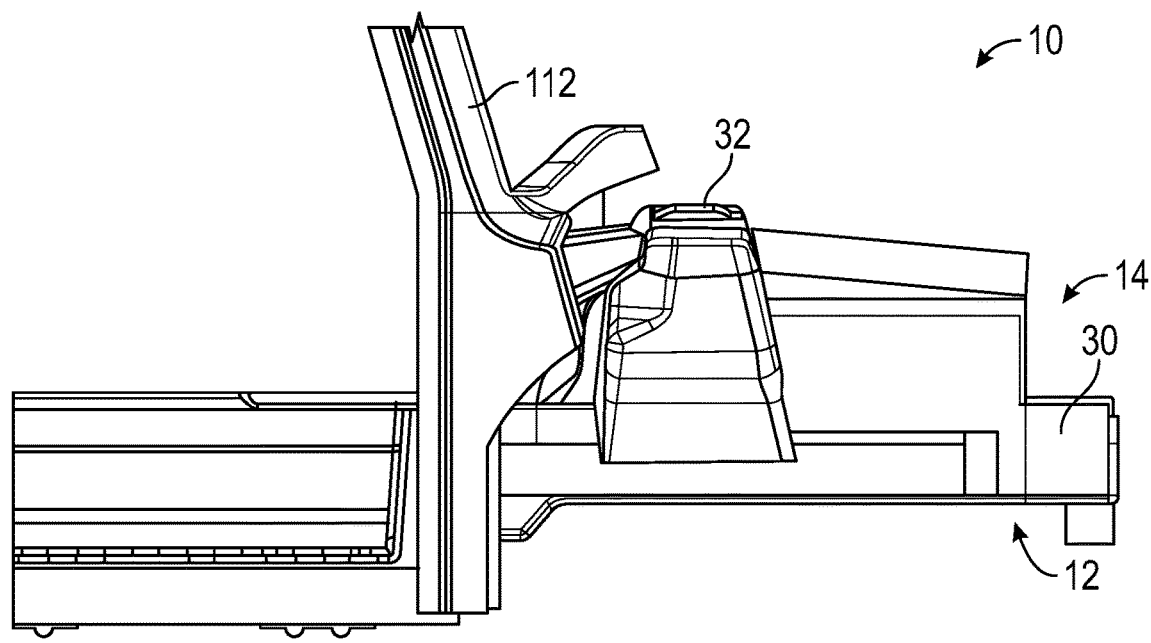
FIGS. 8 and 9 are various detailed views of a frame of the delivery vehicle of FIG. 1, according to an exemplary embodiment.
Figure 9:
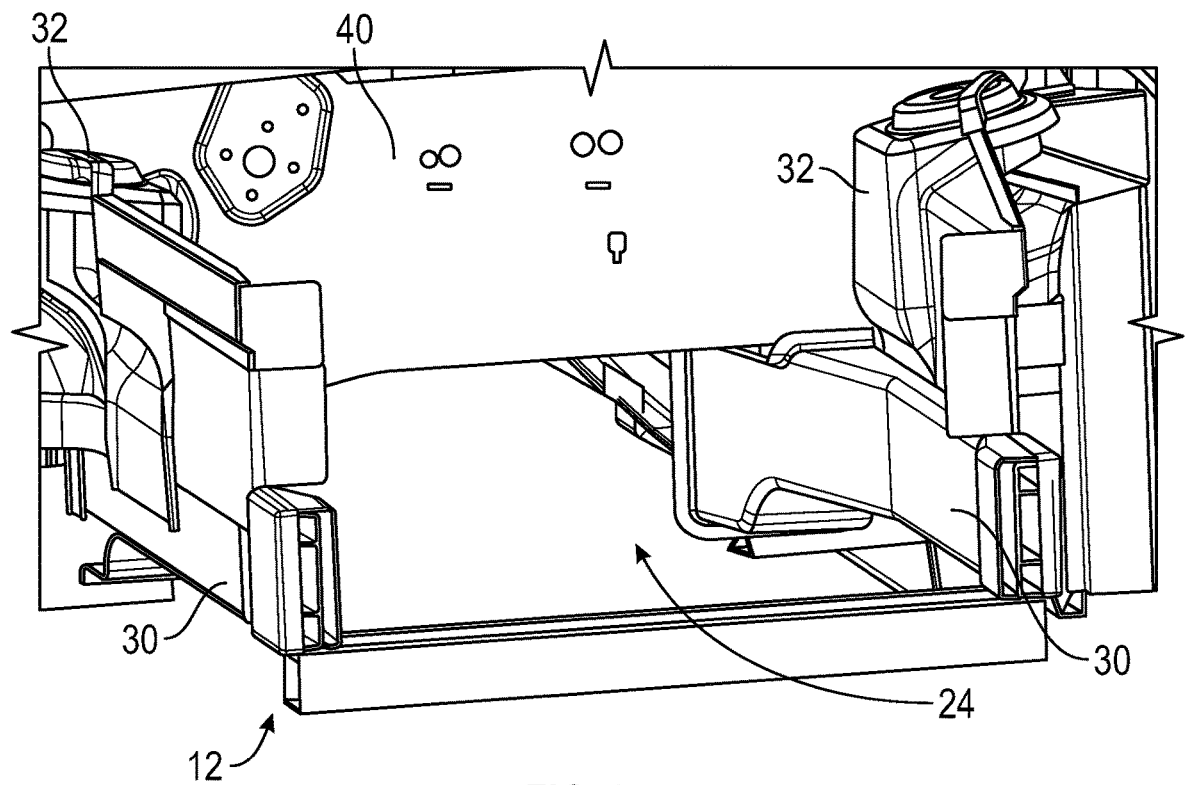

As shown in FIGS. 5, 8, and 9, the frame 12 includes a pair of frame rails, shown as frame rails 30, that define the engine compartment 24 and provide mounting locations for the engine 72. According to an exemplary embodiment, the engine 72 is undersized or smaller than a typical engine used in a vehicle of the weight and size of the delivery vehicle 10. According to an exemplary embodiment, the delivery vehicle 10 has (i) overall dimensions of between 4.5 meters to 7.5 meters (e.g., 5 meters to 7 meters, 5.5 meters to 6.5 meters, 5.5 meters to 6 meters, etc.) and (ii) a weight of between 4,000 to 7,500 lbs. (e.g., 4,000; 4,500; 5,000; 5,500; 6,000; 6,500; 7,000; 7,500; etc. lbs.). In one embodiment, the engine 72 is a 2.0 liter turbocharged engine that outputs approximately 250 horsepower or less. Further, according to the exemplary embodiment shown in FIG. 5, such an undersized engine 72 can be transversely mounted between the frame rails 30 at a lower position than is typical, which minimizes the length of the engine 72 along the central axis 22 and the height at which engine 72 extends vertically within the engine compartment 24. Accordingly, the front end 14 of the frame 12 and the engine compartment 24 defined thereby can be more compact and truncated, which allows for a shorter hood 110, thereby providing enhanced forward visibility from the driver compartment 202 over the hood 110.

As shown in FIGS. 2, 5, and 8-11, the frame 12, the engine 72, the front axle 60, and the suspension components (e.g., coilovers, etc.) of the delivery vehicle 10 are arranged to provide an enhanced position of the driver seat 210 and, therefore, improve the visibility from the driver seat 210 within the driver compartment 202. As shown in FIGS. 8 and 9, the frame 12 includes suspension interfaces, shown as jounce towers 32, coupled to and extending upward from the frame rails 30, and a rear firewall, shown as firewall 40, positioned rearward of the jounce towers 32. Specifically, the arrangement of the frame rails 30 and the jounce towers 32 facilitate positioning the engine 72, the front axle 60, and the suspension components forward of the firewall 40 such that design of the firewall 40 (e.g., the shape, position, etc.) thereof is independent of such components. Therefore, as shown in FIG. 9, the firewall 40 can be substantially flat and arranged substantially vertically, which maximizes the space of the driver compartment 202 of the cab 200 and facilitates positioning the driver seat 210 in a more desirable position to improve visibility.

Figure 10:
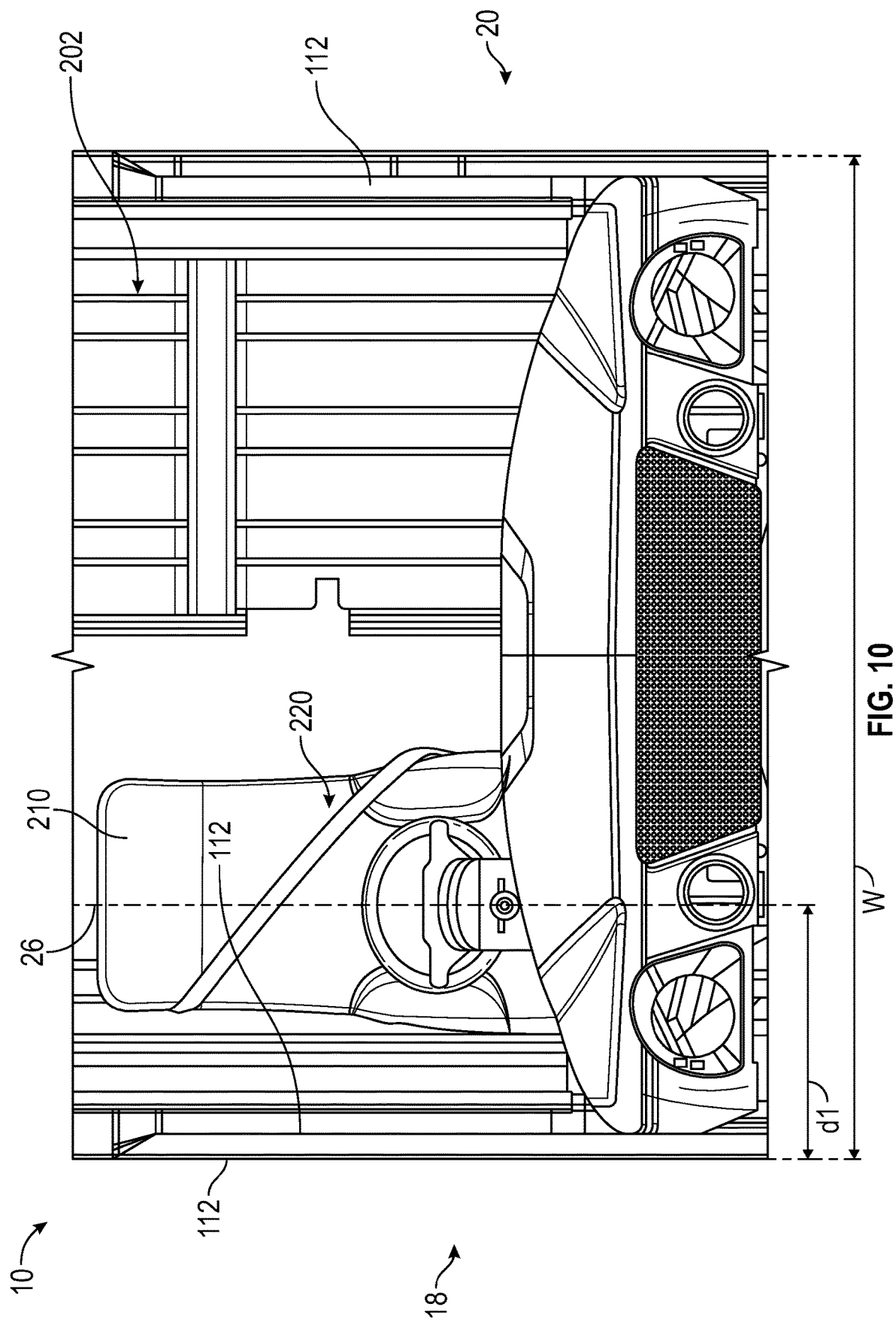
FIG. 10 is a detailed front view of a seating position of a seat within a cab of the delivery vehicle of FIG. 1, according to an exemplary embodiment.

Specifically, as shown in FIG. 10, the arrangement of the firewall 40, the jounce towers 32, the front axle 60, and the engine 72 facilitates centering the driver seat 210 and a steering assembly, shown as steering column 220, along a plane, shown as central seating plane 26, spaced a first distance $d_1$ from the A-pillar 112 along the right side 18 of the delivery vehicle 10 relative to a total width w between the A-pillar 112 along the right side 18 and the A-pillar 112 along the left side 20 of the delivery vehicle 10. According to an exemplary embodiment, the distance $d_1$ is less than 25% of the total width w.

Figure 11:
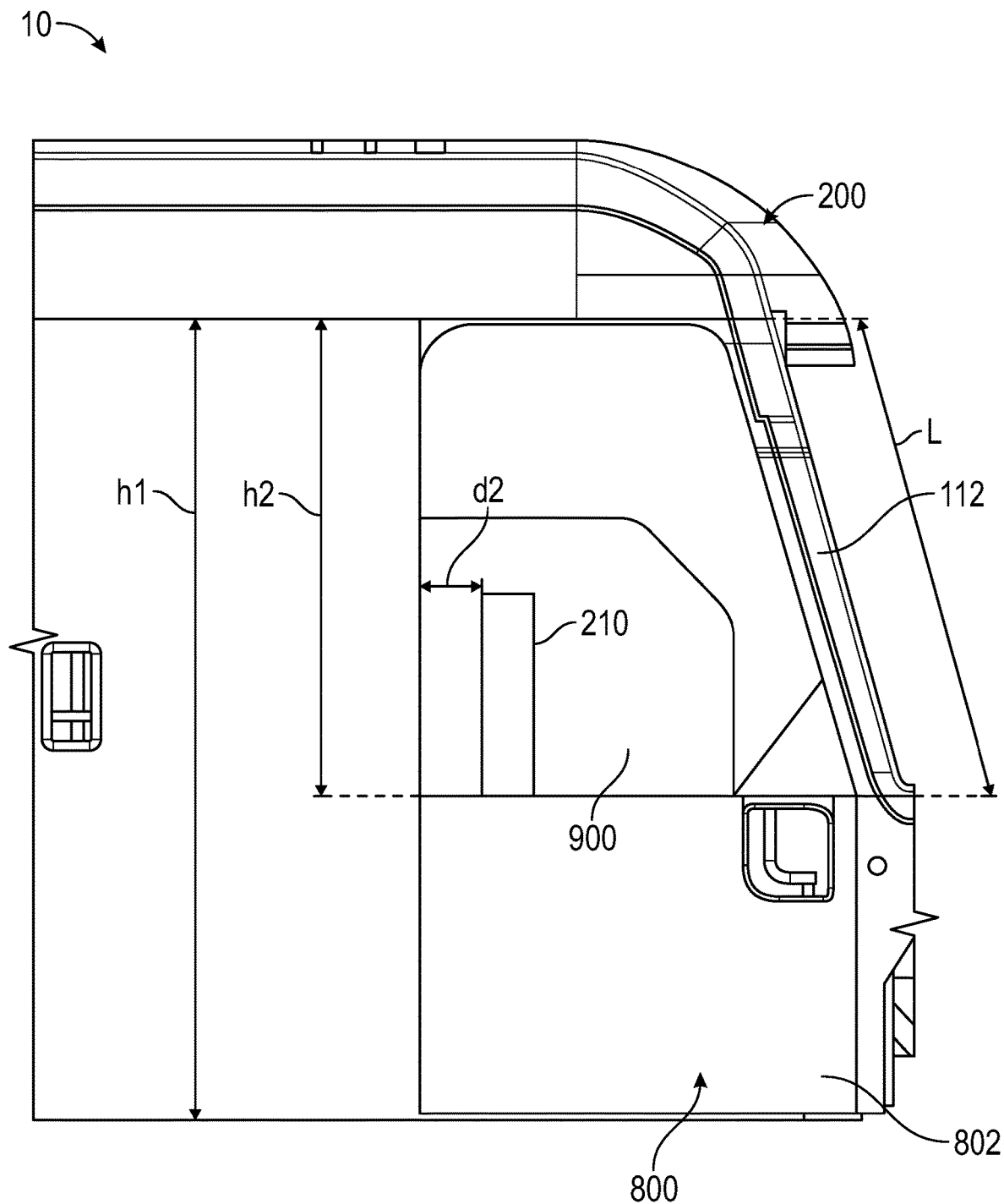
FIG. 11 is a detailed side view of the seating position of the seat within the cab of the delivery vehicle of FIG. 10, according to an exemplary embodiment.

As shown in FIG. 11, the A-pillars 112 have a length L. Typically, a vehicle of similar size to the delivery vehicle 10 has A-pillars that are less than 0.75 meters long. However, the length L of the A-pillars 112 of the delivery vehicle 10 have been extended, which provides a lower position of the hood 110 and a larger front windshield, and further improves forward visibility from the driver compartment 202. According to an exemplary embodiment, the length L of the A-pillars 112 of the delivery vehicle 10 is at least 1.0 meter.

Figure 12:
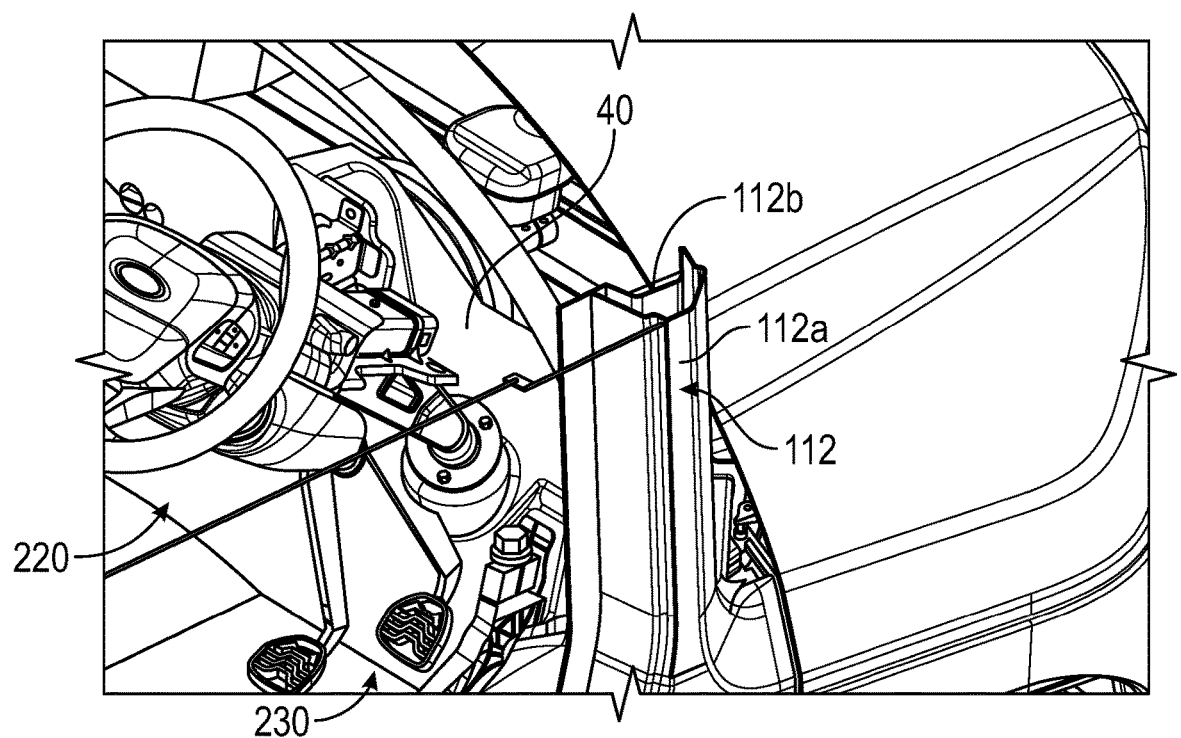
FIGS. 12 and 13 are various detailed interior cab views of the delivery vehicle of FIG. 1, according to an exemplary embodiment.

In some embodiments, the length L of the A-pillars 112 is at least 1.10 meters (e.g., 1.12 meters, 1.15, meters, etc.). As shown in FIG. 12, the A-pillars 112 have an overlapping construction including an inner component, shown as inner portion 112a, and an outer component, shown as outer portion 112b, overlapping the inner portion 112a. Such an overlapping construction improves strength and, thereby, facilitates reducing the overall size of the A-pillars 112, which further improves forward and lateral visibility out of the driver compartment 202.

As shown in FIG. 11, the driver cab door 800 is configured such that driver cab door 800 (i.e., the door panel 802 and the window assembly 900) has a first height $h_1$ and the window assembly 900 has a second height $h_2$. In some embodiments, the second height $h_2$ is at least 50% of the height $h_1$. In some embodiments, the second height $h_2$ is at least 60% of the height $h_1$. According to an exemplary embodiment, (i) the height $h_1$ is between 1.6 meters and 2.4 meters and (ii) the height $h_2$ is between 0.8 meters and 1.4 meters. The passenger cab door may be similarly arranged. Such an oversized window assembly 900 provides improved lateral visibility out of the right side 18 and the left side 20 of the cab 200 of the delivery vehicle 10.

As shown in FIG. 11, the driver seat 210 is positioned a distance $d_2$ forward of the rear edge of the window assembly 900. While the distance $d_2$ is variable (e.g., based on driver seating position preference, etc.), the distance $d_2$ is at least four inches when the driver seat 210 is in a position suitable for a male being in the $95^{th}$ height percentile (e.g., approximately 6 feet 1 inch). Such a distance $d_2$ provides various advantages. First, when the driver reaches out of the window assembly 900 (e.g., to deposit mail into a mail box, etc.), the trailing edge of the driver cab door 800 is sufficiently spaced from the driver to effectively eliminate inadvertent contact between the trailing edge of the driver cab door 800 and the driver's arm. Second, the distance $d_2$ provides enhanced lateral visibility because the driver can see further back along the right side 18 and the left side 20 of the delivery vehicle 10, thereby reducing blind spots.

Figure 13:
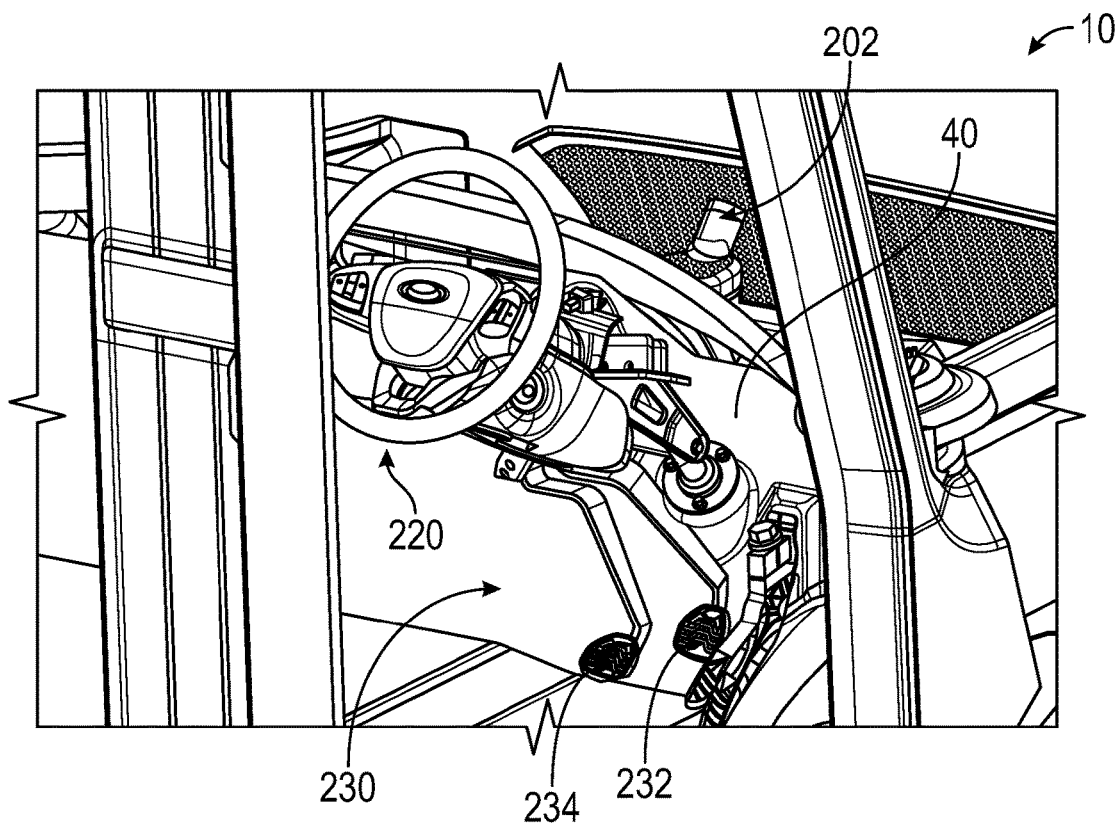
Figure 14:
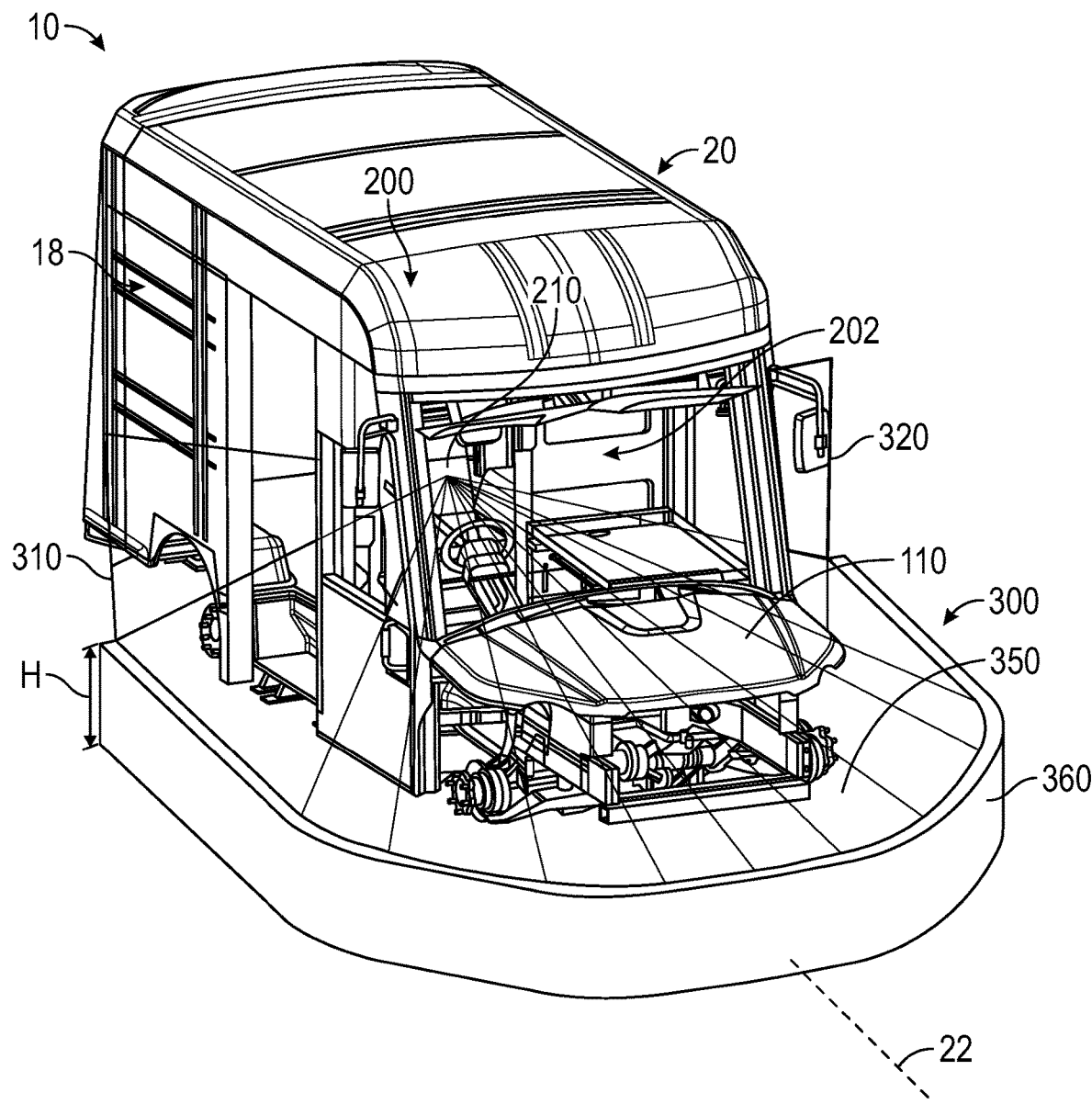
FIGS. 14-17 are various views of a visibility envelope of the delivery vehicle of FIG. 1, according to an exemplary embodiment.
Figure 15:
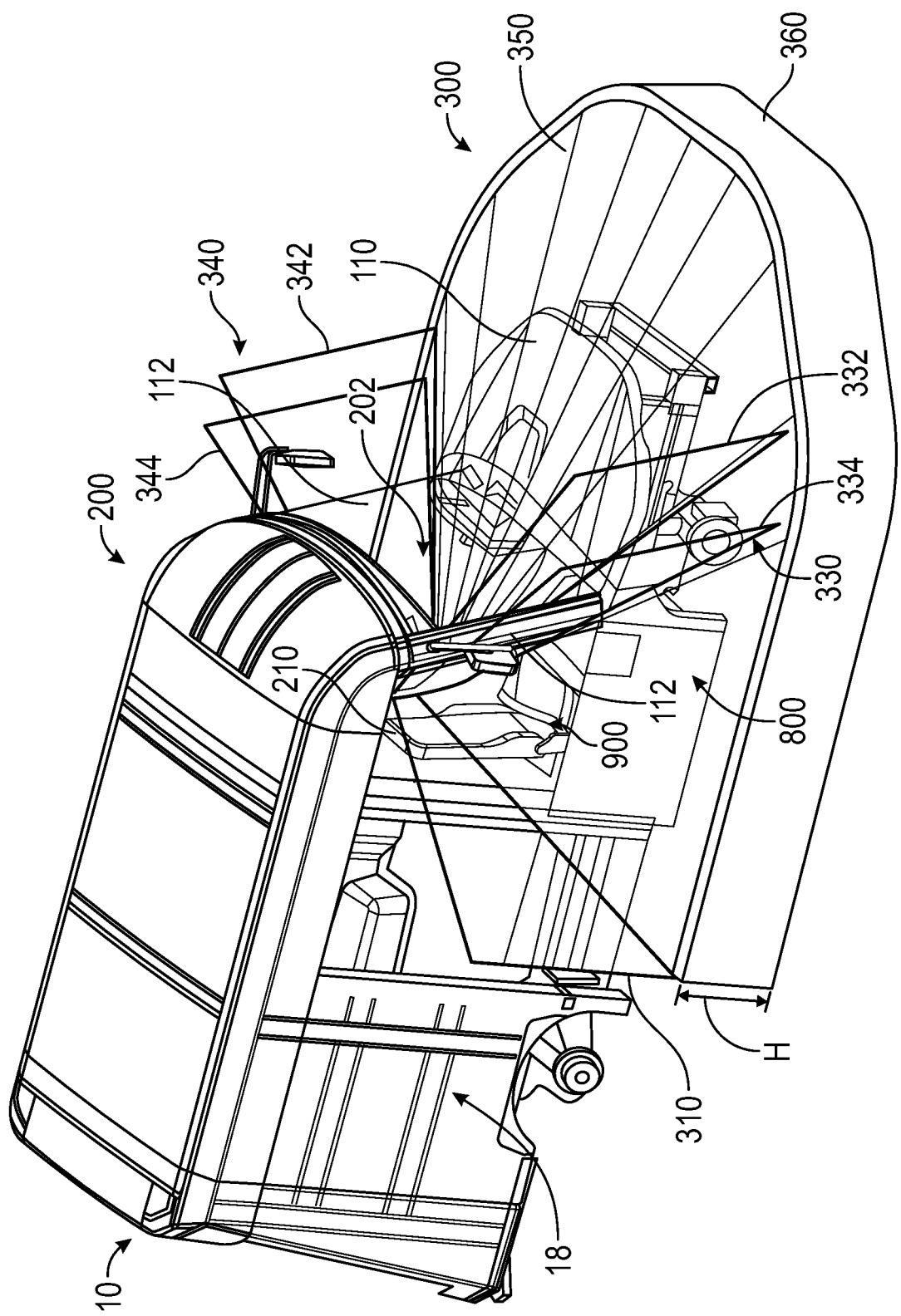
Figure 16:
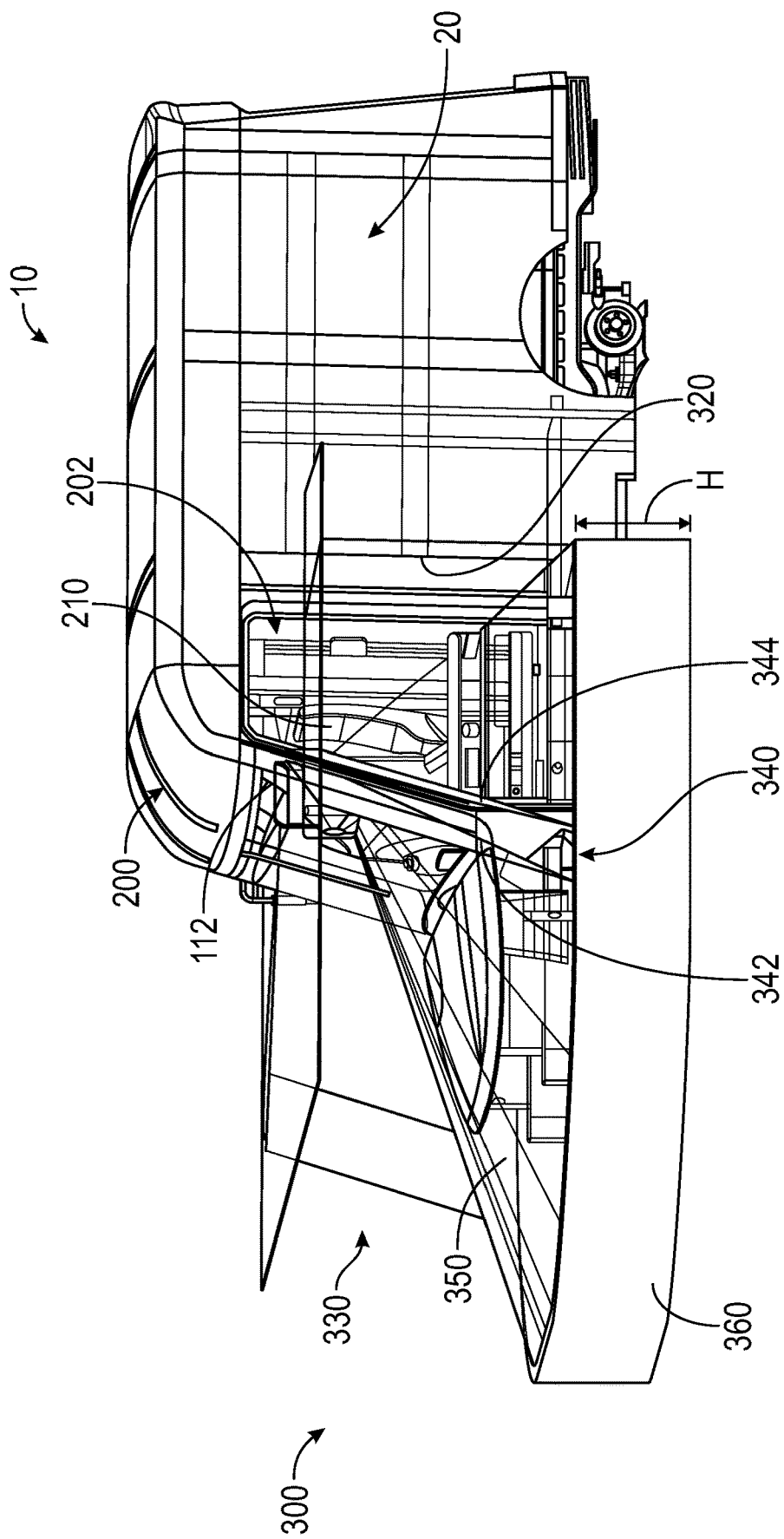

As shown in FIGS. 12 and 13, the cab 200 includes speed controls, shown as controls 230, including a first pedal, shown as accelerator pedal 232, and a second pedal, shown as brake pedal 234. According to an exemplary embodiment, the brake pedal 234 has a special offset to interface with the master brake cylinder.

As shown in FIGS. 14-17, the various visibility enhancements described herein facilitate providing an enhanced visibility envelope, shown visibility envelope 300. The visibility envelope 300 is defined by various planes including a first plane, shown as rear right visibility plane 310; a second plane, shown as rear left visibility plane 320; a third pair of planes, shown as right A-pillar planes 330, including a first right A-pillar plane, shown as inner right A-pillar plane 332, and a second right A-pillar plane, shown as outer right A-pillar plane 334; and a fourth pair of planes, shown as left A-pillar planes 340, including a first left A-pillar plane, shown as inner left A-pillar plane 342, and a second left A-pillar plane, shown as outer left A-pillar plane 344.

Figure 17:
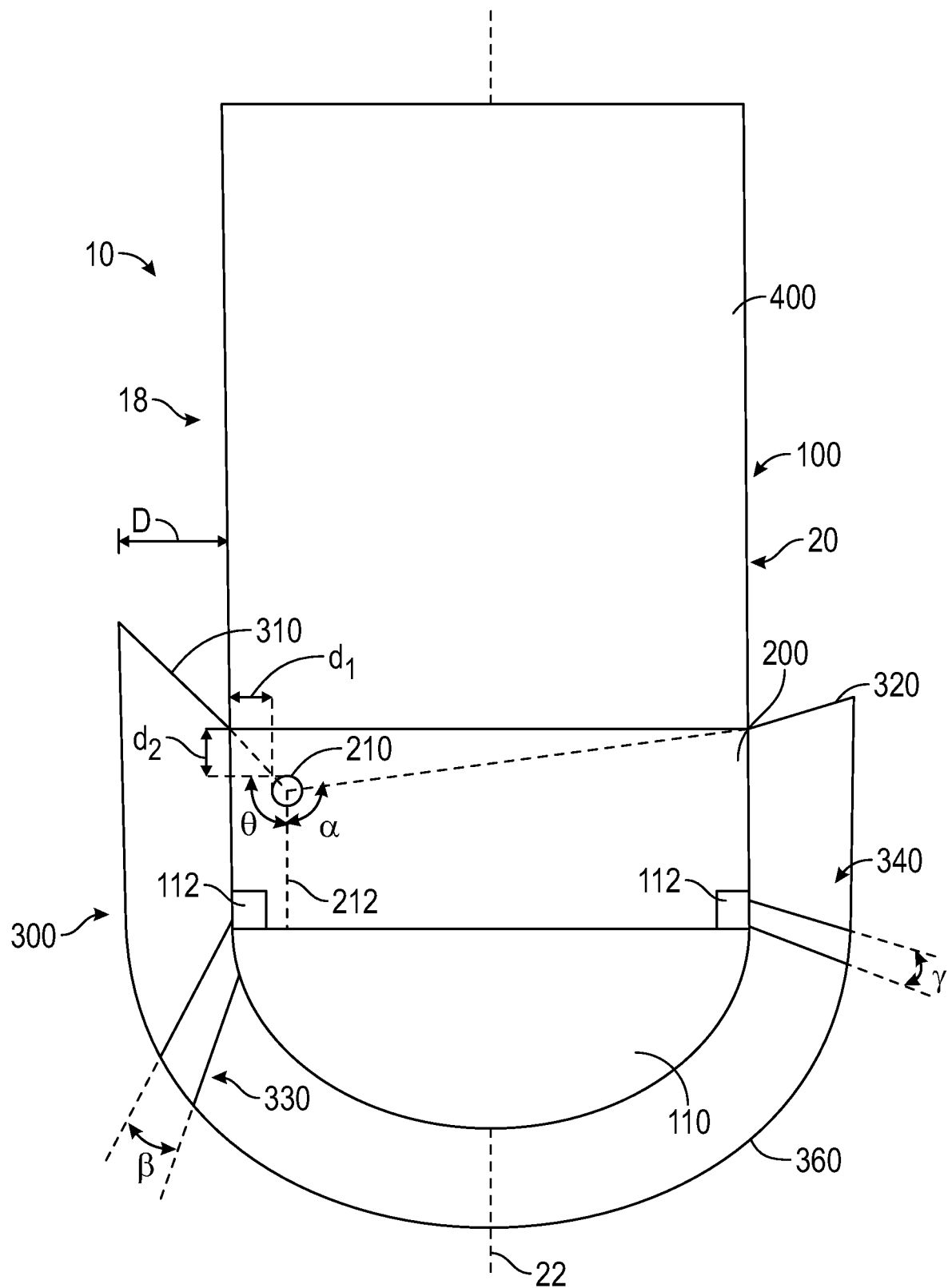

As shown in FIG. 17, the driver seat 210 is positioned (e.g., at a position defined by the distance $d_1$ and the distance $d_2$, in the $95^{th}$ height percentile position, etc.) such that, relative to a forward looking direction 212 (e.g., a direction parallel with the central axis 22), (i) the rear right visibility plane 310 extends at angle θ from the trailing edge of the window assembly 900 along the right side 18 of the delivery vehicle 10 and (ii) the rear left visibility plane 320 extends at angle α from the trailing edge of the window assembly 900 along the left side 20 of the delivery vehicle 10. According to an exemplary embodiment, the angle θ and the angle α are greater than 90 degrees. In some embodiment, the angle θ and the angle α are at least 95 degrees. In some embodiment, the angle θ and the angle α are at least 100 degrees. In some embodiments, the angle θ is at least 110 degrees. In some embodiments, the angle θ is at least 120 degrees. In some embodiments, the angle θ is at least 130 degrees. According to the exemplary embodiment shown in FIGS. 14-17, the angle θ is 135 degrees and the angle α is 100 degrees with the driver seat 210 at the distance $d_2$ in the $95^{th}$ height percentile position. It should be understood that the angle θ and the angle α would increase if the driver seat 210 were moved forward from the $95^{th}$ height percentile position by the driver (i.e. to accommodate a shorter height of the driver), thereby, increasing the distance $d_2$.

As shown in FIG. 17, the A-pillars 112 are configured (as described above) to minimize visibility obstruction such that (i) the right A-pillar planes 330, depicting the visibility obstruction of the right A-pillar 112 from the driver seat 210, block only an angle β of the driver's view and (ii) the left A-pillar planes 340, depicting the visibility obstruction of the left A-pillar 112 from the driver seat 210, block only an angle γ of the driver's view. According to an exemplary embodiment, the angle β is at most 11.5 degrees and the angle γ is at most 5 degrees. According to an exemplary embodiment, the visibility range of the visibility envelope 300 (i.e., from the rear right visibility plane 310 to the rear left visibility plane 320, minus the angle β and the angle γ) from the driver seat 210 with the distance $d_2$ in the $95^{th}$ height percentile position (e.g., with the angle θ of 135 degrees, with the angle α of 100 degrees, with the angle β of 11.5 degrees, with the angle of γ of 5 degrees, etc.) is approximately 218.5 degrees. The visibility from the driver seat 210 is dependent on the distance $d_2$, however. Therefore, the visibility range may be between approximately 163.5 degrees (e.g., when the driver seat 210 is fully back, etc.) and approximately 240 degrees (e.g., when the driver seat 210 is fully forward, etc.) depending on the minimum distance $d_2$ and the maximum distance $d_2$ of the driver seat 210, respectively.

As shown in FIGS. 14-17, the visibility envelope 300 includes a downward sloping perimeter plane, shown as lower boundary visibility plane 350, that extends downward from the driver seat 210 (e.g., from the approximate eye position of a male being in the $95^{th}$ height percentile, etc.), out of the driver compartment 202, and to the upper edge of a peripheral plane, shown as visibility periphery 360. The visibility periphery 360 is spaced a distance D around the delivery vehicle 10 (i.e., the right side 18 of the cab 200, the outer periphery of the hood 110, the left side 20 of the cab 200) through the visibility range of the visibility envelope 300 and extends vertically a height H. According to an exemplary embodiment, (i) the distance D is between 0.9 meters and 2 meters (e.g., 0.9, 1, 1.1, 1.2, 1.3, 1.4, 1.5, 1.6, 1.7, 1.8, 1.9, 2.0, etc. meters) and (ii) the height H is between 0.3 meters and 0.6 meters (e.g., 0.3, 0.35, 0.4, 0.45, 0.5, 0.55, 0.6, etc. meters). It should be understood that the distance D and the height H will be different for drivers of different heights (i.e., not in the male $95^{th}$ height percentile).

Repositionable Seating Unit

Figure 18:
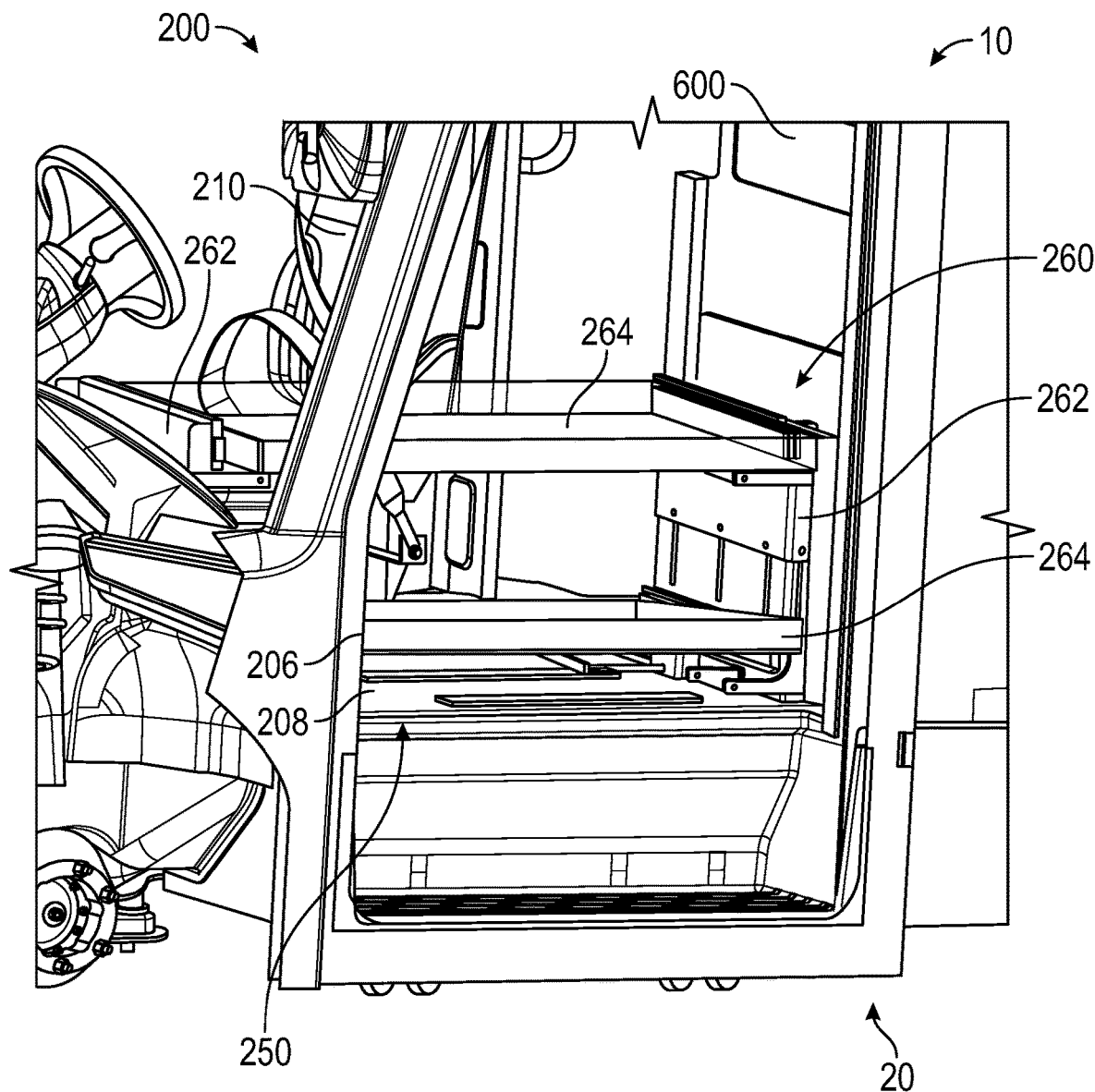
FIG. 18 is a left side detailed view of a cab of the delivery vehicle of FIG. 1 having a mail tray in a first position, according to an exemplary embodiment.

According to the exemplary embodiment shown in FIGS. 18-23, the delivery vehicle 10 includes a repositionable storage rack, shown as mail tray 260, and a repositionable seating unit, shown as training seat unit 270, that are selectively interchangeable with one another at a first location, shown as first position 250, on the left side 20 of the driver compartment 202 of the cab 200 next to the driver seat 210. As shown in FIG. 18, the mail tray 260 includes a pair of supports, shown as end supports 262, and a plurality of trays, shown as trays 264, extending between the end supports 262 in a stacked arrangement. According to an exemplary embodiment, the trays 264 are configured to temporarily store parcels (e.g., mail, packages, etc.) that are nearing their delivery locations. In some embodiments, the mail tray 260 is free standing. In some embodiments, the mail tray 260 is selectively securable to a first floor portion of the body 100, shown as cab floor 208, and/or the partition 600 (e.g., bolted, clipped, engages with a track, etc.).

Figure 19:
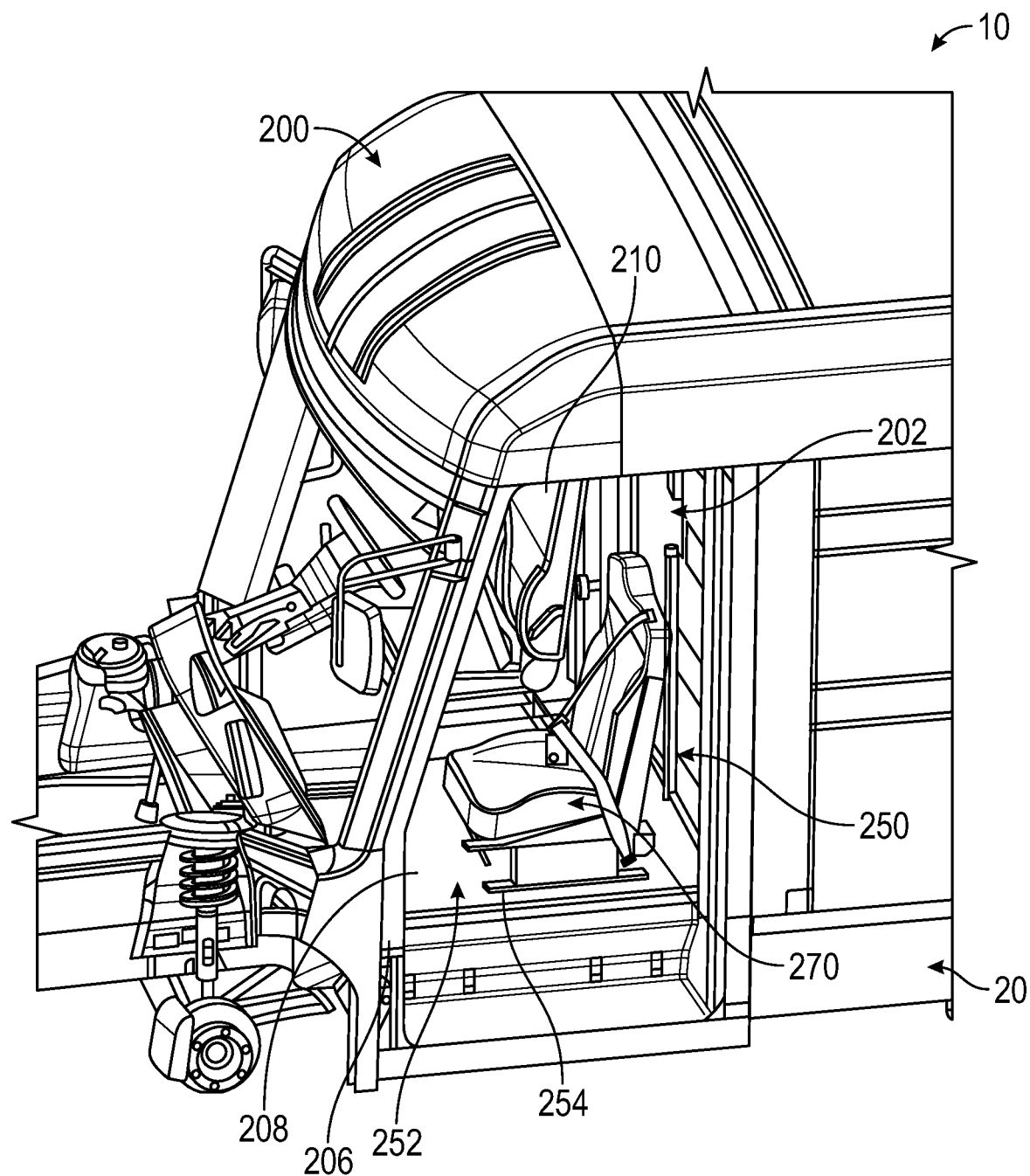
FIG. 19 is a left side detailed view delivery vehicle of FIG. 18 having a repositionable training seat in the first position, according to an exemplary embodiment.
Figure 20:
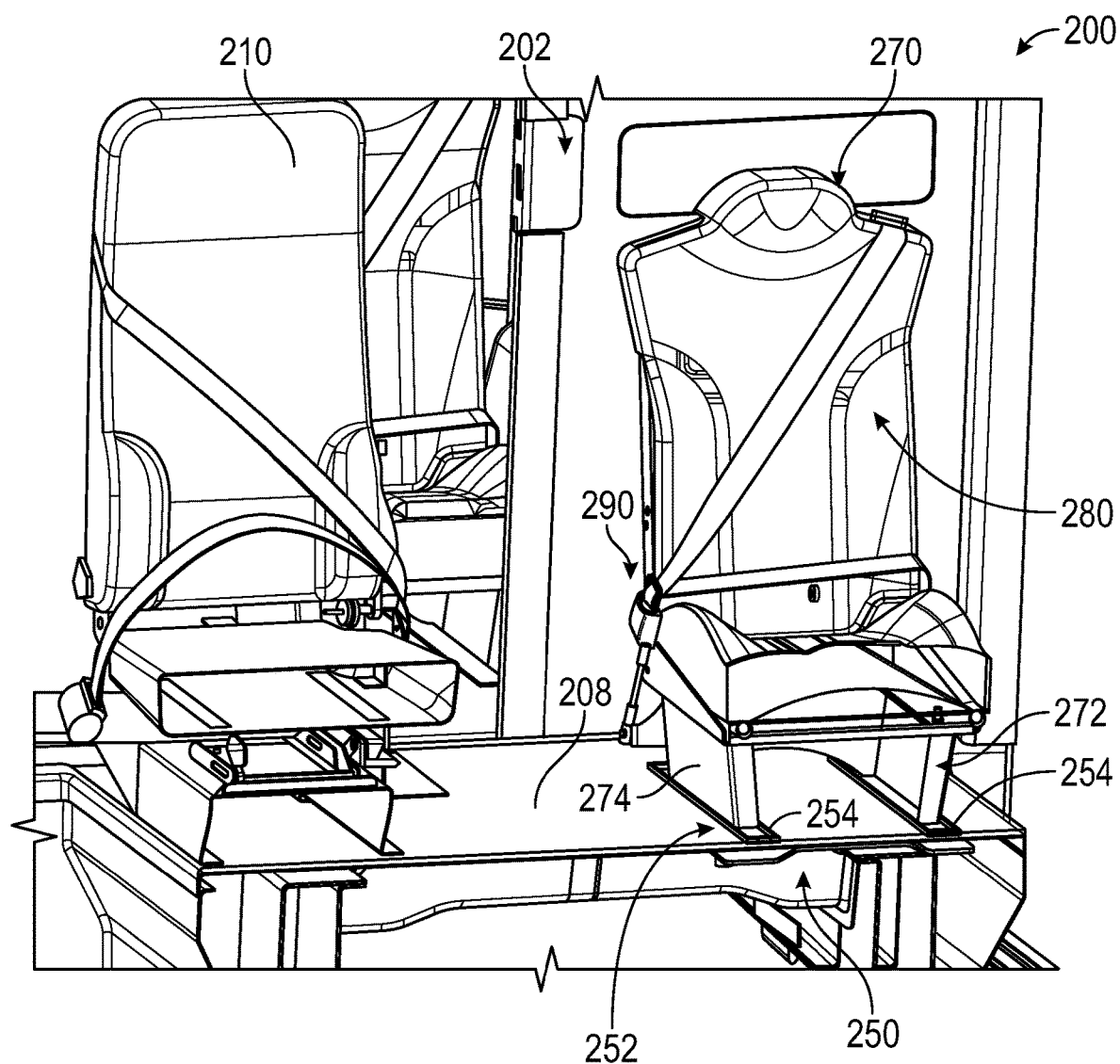
FIG. 20 is a front interior view of the delivery vehicle of FIG. 19, according to an exemplary embodiment.
Figure 21:
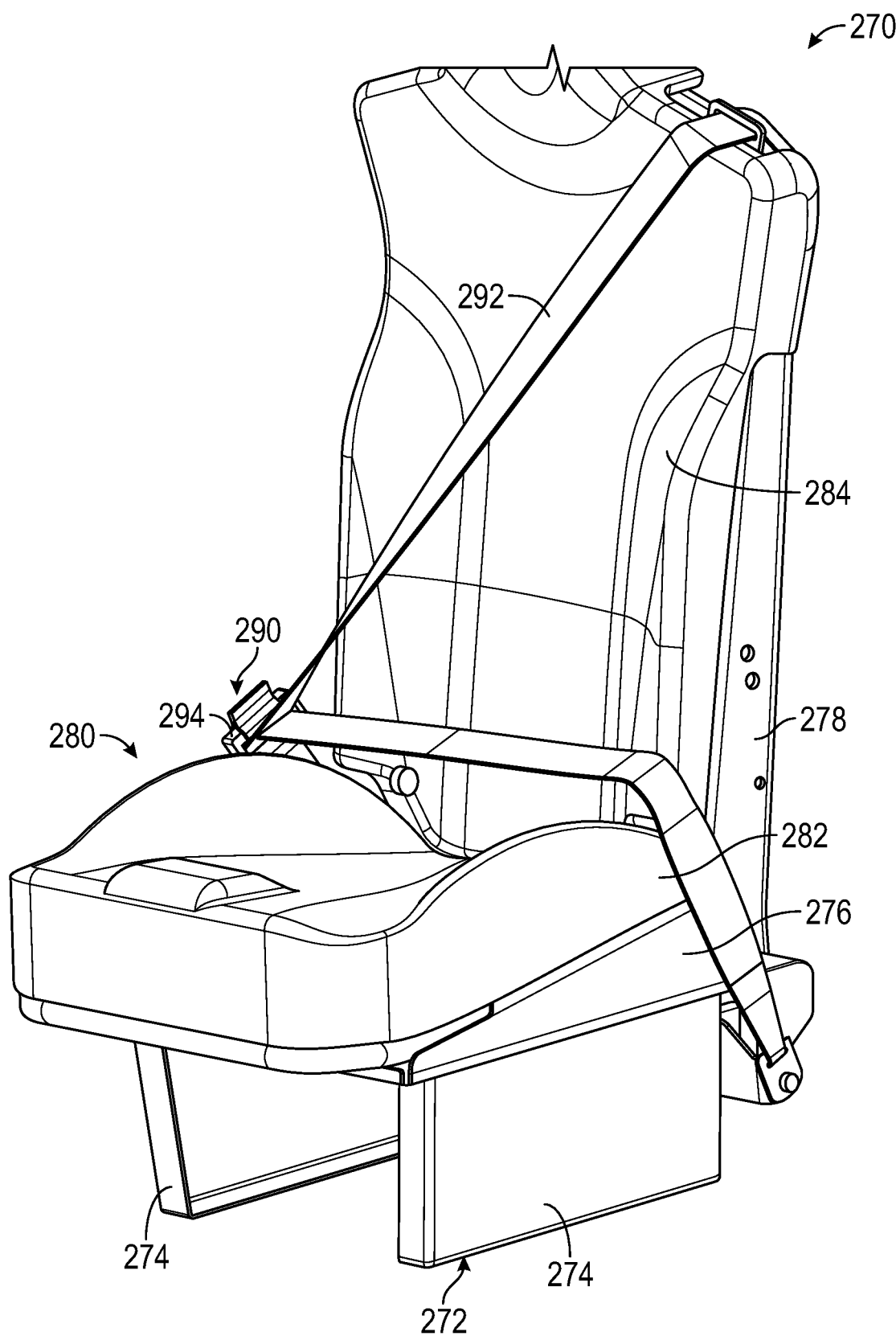
FIG. 21 is a perspective view of the repositionable seat of FIG. 19, according to an exemplary embodiment.

As shown in FIGS. 19-21, the mail tray 260 is removed from the first position 250 within the driver compartment 202 and replaced with the training seat unit 270. As shown in FIGS. 19 and 20, the cab floor 208 within the driver compartment 202 includes a first interface, shown as cab seat interface 252, that defines a pair of slots, shown as cab engagement slots 254, that facilitate coupling the training seat unit 270 to the cab floor 208 in the first position 250.

As shown in FIGS. 20 and 21, the training seat unit 270 includes a frame assembly, shown as seat frame assembly 272, a padding assembly, shown as cushions 280, and a passenger restraint assembly (e.g., a 3-point seatbelt harness, a 5-point seatbelt harness, etc.), shown as seatbelt harness 290, integrated into a single seating unit. The seat frame assembly 272 includes a pair of legs, shown as legs 274; a bottom frame portion, shown as base frame 276, coupled to the legs 274 and extending substantially horizontally; and a back frame portion, shown as back frame 278, coupled to the rear of the base frame 276 and extending substantially vertically therefrom. The cushions 280 include a first cushion, shown as bottom cushion 282, disposed along the base frame 276, and a second cushion, shown as back cushion 284, disposed along the back frame 278. The seatbelt harness 290 includes a belt, shown as seatbelt 292, secured to the seat frame assembly 272 at a plurality of points (e.g., two points, four points, etc.), and a receiver or coupler, shown as seatbelt buckle 294, coupled to the seat frame assembly 272 (e.g., the base frame 276) and configured to selectively engage a corresponding coupler or tongue on the seatbelt 292.

As shown in FIG. 20, the legs 274 of the seat frame assembly 272 are configured to interface with the cab engagement slots 254 to facilitate securing the training seat unit 270 to the cab floor 208 in the first position 250. By way of example, the cab engagement slots 254 may include threaded apertures that receive bolts to secure the legs 274 of the seat frame assembly 272 to the cab seat interface 252. By way of another example, the cab engagement slots 254 may include threaded studs extending upward therefrom that receive nuts to secure the legs 274 of the seat frame assembly 272 to the cab seat interface 252.

Figure 22:
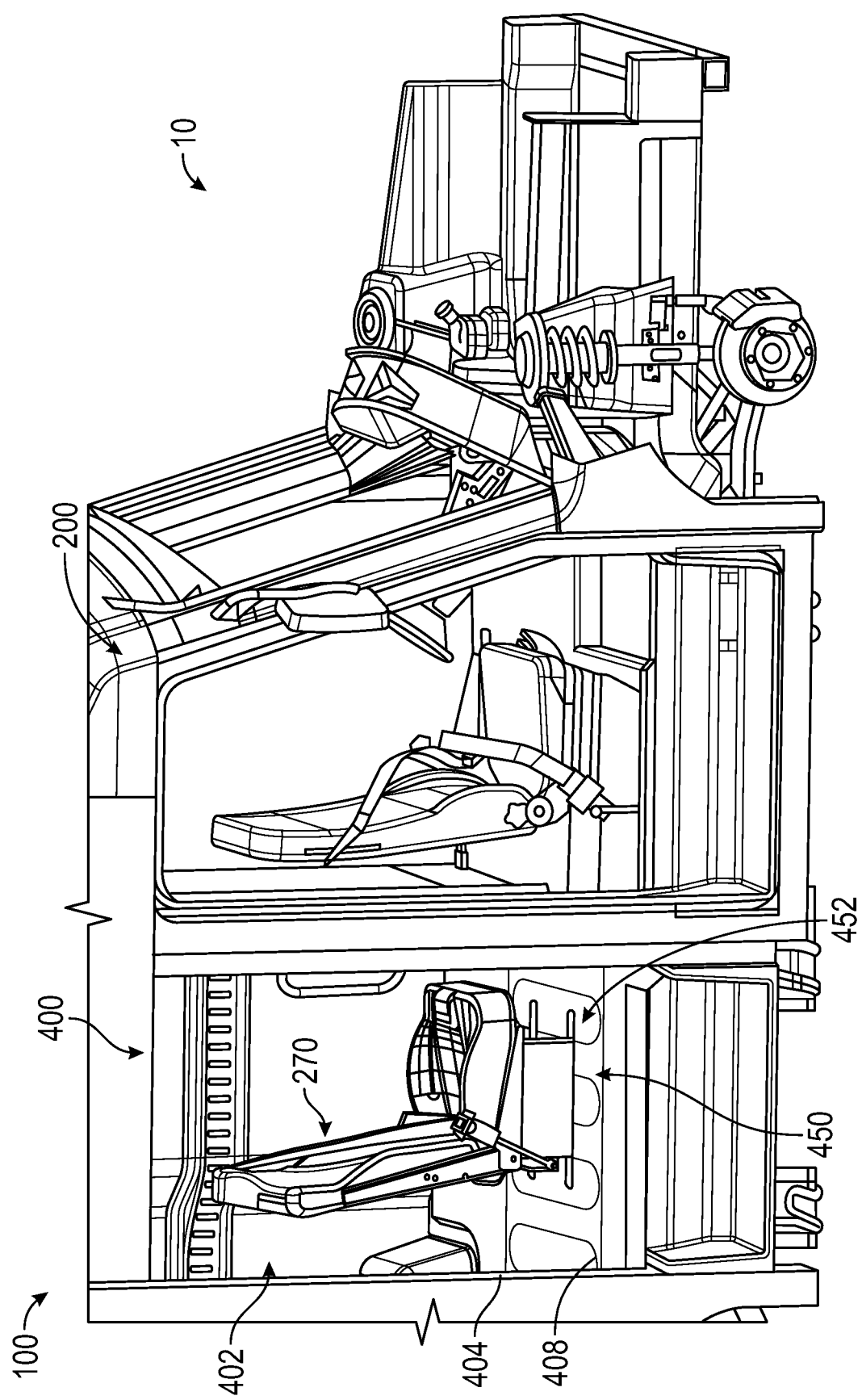
FIGS. 22 and 23 are various right side views of the delivery vehicle of FIG. 19 with the repositionable training seat in a second position, according to an exemplary embodiment.
Figure 23:
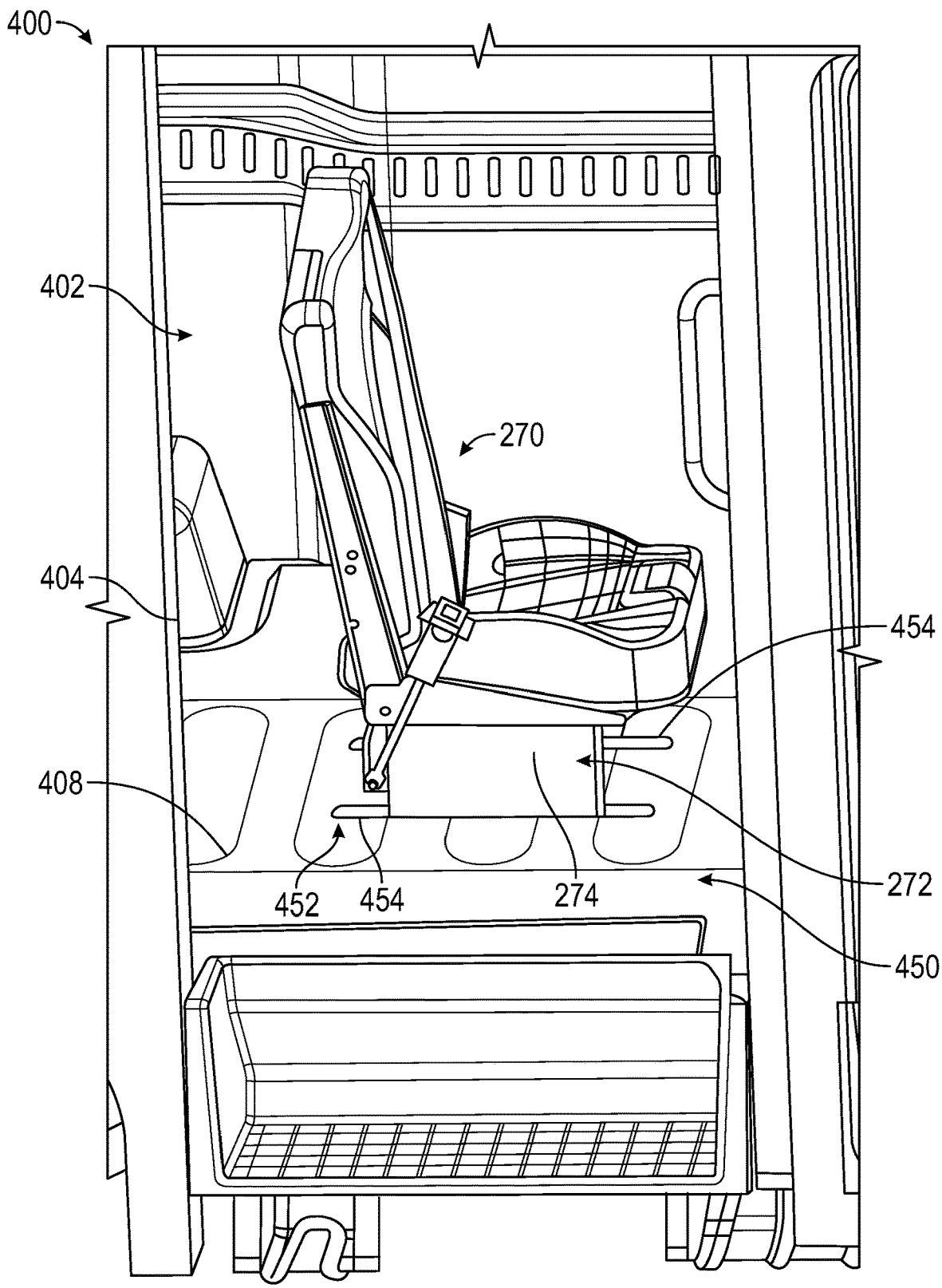

As shown in FIGS. 22 and 23, the training seat unit 270 is selectively repositionable from the first position 250 within the driver compartment 202 to a second location, shown as second position 450, within the cargo compartment 402 of the cargo body 400. The cargo body 400 includes a second floor portion of the body 100, shown as cargo floor 408. The cargo floor 408 within the cargo compartment 402 includes a second interface, shown as cargo seat interface 452, that defines a pair of slots, shown as cargo engagement slots 454, that facilitate coupling the training seat unit 270 to the cargo floor 408 in the second position 450. The legs 274 of the seat frame assembly 272 are configured to interface with the cargo engagement slots 454 to facilitate securing the training seat unit 270 to the cargo floor 408 in the second position 450. By way of example, the cargo engagement slots 454 may include threaded apertures that receive bolts to secure the legs 274 of the seat frame assembly 272 to the cargo seat interface 452. By way of another example, the cargo engagement slots 454 may include threaded studs extending upward therefrom that receive nuts to secure the legs 274 of the seat frame assembly 272 to the cargo seat interface 452.

According to the exemplary embodiment shown in FIGS. 19-23, the cab seat interface 252 and the cargo seat interface 452 provide discrete coupling locations that facilitate selectively repositioning the training seat unit 270 between the first position 250 and the second position 450. In other embodiments, the cab seat interface 252 and the cargo seat interface 452 are connected along a track assembly/mechanism such that the training seat unit 270 is integrated into the cab floor 208 and the cargo floor 408 and can be selectively repositioned (e.g., translated along the track, etc.) between the first position 250 and the second position 450 (e.g., through the passageway 602 of the partition 600, etc.) without having to detach and move the training seat unit 270 between the cab seat interface 252 and the cargo seat interface 452. In some embodiments, the mail tray 260 is configured to selectively engage with the cab seat interface 252 and/or the cargo seat interface 452.

Cargo Shelf Assembly

Figure 24:
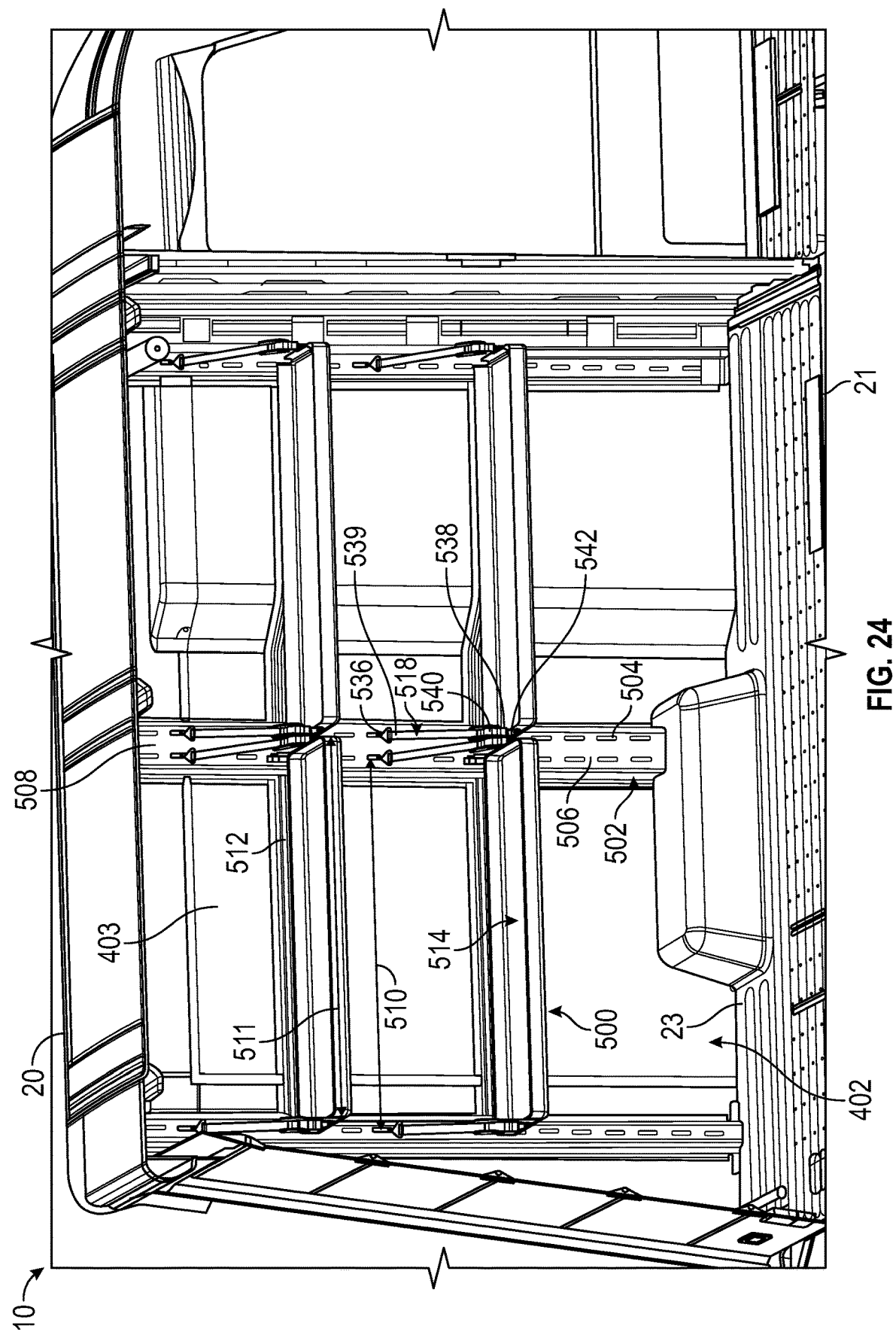
FIG. 24 is a partial side view of the delivery vehicle of FIG. 1 including a cargo shelf assembly, according to an exemplary embodiment.

As shown in FIG. 24, the cargo compartment 402 includes a plurality of cargo shelf assemblies, shown as shelf assemblies 500, for storing and securing parcels (e.g., cargo, mail, packages, etc.) within the cargo compartment 402 during transit operations. The shelf assemblies 500 are mounted to cargo support members, shown as tracks 502, that extend along outer walls 403 of the cargo compartment 402. According to the exemplary embodiment shown in FIG. 24, the tracks 502 are logistics tracks that include a plurality of anchor points along the outer walls 403 of the cargo compartment 402 (e.g., right side wall on the right side 18 of the delivery vehicle 10, left side wall on the left side 20 of the delivery vehicle 10, etc.). The tracks 502 may be mounted to the outer walls 403 of the cargo compartment 402 using bolts, screws, rivets, or another suitable fastener, which extend through openings on either side of the tracks 502. In particular, the openings may be disposed in side flanges that extend along both sides of the tracks 502 (e.g., side flanges that extend in a substantially parallel orientation relative to the outer wall 403). As shown in FIG. 24, a central portion of each track 502 protrudes inwardly toward the hollow space or cargo area defined by the cargo compartment 402 and away from the outer walls 403 of the cargo compartment 402. In other embodiments, the tracks 502 may be flush mounted to the outer wall 403 instead of protruding inwardly from the outer wall 403.

As shown in FIG. 24, the tracks 502 are configured as A-tracks that include a plurality of rectangular shaped openings, shown as slots 504, that are spaced equally along a length of the tracks 502. The slots 504 are sized to receive mounting hardware for the shelf assemblies 500 therein. The slots 504 provide access to a hollow space between the outer walls 403 of the cargo compartment 402 and a forward surface 506 of the tracks 502. The number, shape, and size of the slots 504 may differ in various exemplary embodiments. In another embodiment, the tracks 502 are configured as E-tracks that include a tang, lip, ledge, or tab extending outwardly from a perimeter edge of the slots 504 (e.g., from the perimeter edge of the slots 504 toward the outer wall 403 of the cargo compartment 402). The additional structure included with the E-track allows for increased load capacity as compared to the A-track, but has a higher cost than the A-track. According to an exemplary embodiment, the shelf assembly 500 is interchangeably couplable to A-track, E-track, and/or various other logistics track designs (e.g., the shelf assembly 500 may be structured to connect to both an A-track and an E-track without changing any components of the shelf assembly 500, etc.). In other embodiments, the tracks 502 may be another track type, such as an F-track, an L-track, and/or another logistics track structure suited for anchoring and tie down within the delivery vehicle 10. The tracks 502 may be made from galvanized and/or painted steel, aluminum, or another suitable material.

As shown in FIG. 24, each of the tracks 502 is disposed proximate to a side wall of the cargo compartment 402 (e.g., a right side wall on the right side 18 of the delivery vehicle 10 as shown in FIG. 24, a left side wall on the left side 20 of the delivery vehicle 10, etc.). As shown in FIG. 24, the tracks 502 include a first plurality of tracks 508 disposed at regular intervals along the length (e.g., front to back, etc.) of the cargo compartment 402. Each one of the first plurality of tracks 508 extends upwardly from a lower wall 21 (e.g., floor, etc.) of the cargo compartment 402, from a perimeter of the lower wall 21, in substantially perpendicular orientation relative to an upper surface 23 of the lower wall 21. In other words, each one of the first plurality of tracks 508 is arranged substantially vertically. In the embodiment of FIG. 24, the tracks 508 are spaced at approximately equal intervals along the length of the lower wall 21, in a direction parallel to the central axis 22 of the delivery vehicle 10. A distance 510 between adjacent tracks of the first plurality of tracks 508 (e.g., between a centerline of adjacent tracks 508), along the central axis 22, corresponds to a width 511 of each individual shelf assembly 500. In other embodiments, the spacing between the adjacent tracks of the first plurality of tracks 508 and/or the number of tracks 508 may be different.

Figure 25:
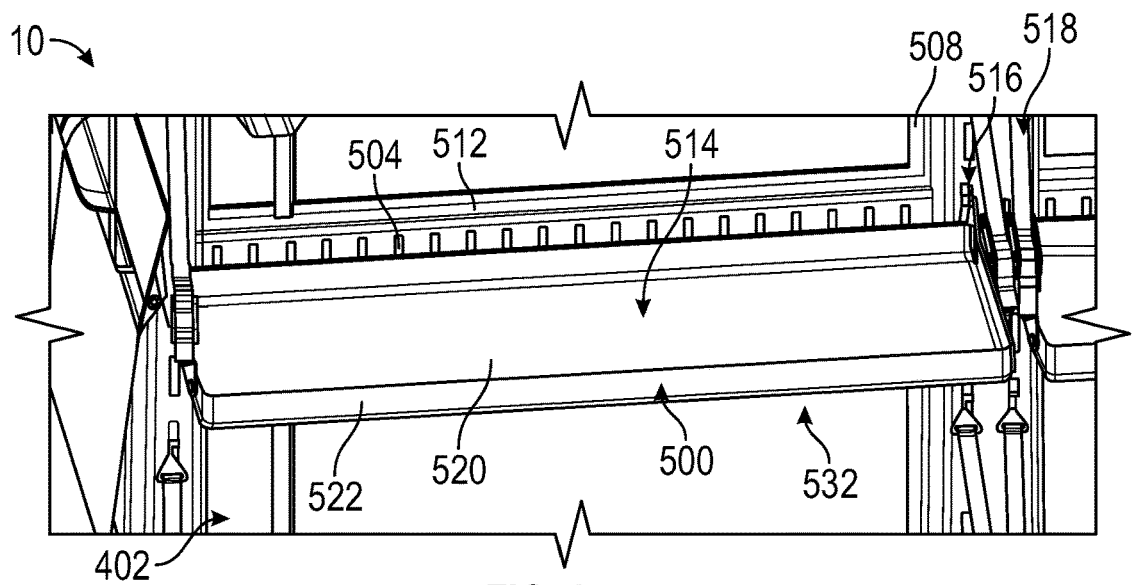
FIG. 25 is a detailed view of the cargo shelf assembly of FIG. 24, according to an exemplary embodiment.

As shown in FIG. 24, the tracks 502 in the cargo compartment 402 includes a second plurality of tracks, shown as load retainer tracks 512, that engage with and extend between adjacent ones of the first plurality of tracks 508. The load retainer tracks 512 are arranged in a substantially perpendicular orientation relative to the first plurality of tracks 508 and are spaced at approximately equal intervals along the height of the outer walls 403. As shown in FIG. 25, the slots 504 in the load retainer tracks 512 are oriented perpendicular to a longitudinal axis of the load retainer tracks 512 such that the slots 504 in the load retainer tracks 512 are substantially aligned with a corresponding one of the slots 504 in the first plurality of tracks 508. In some embodiments, the spacing between adjacent ones of the load retainer tracks 512, the first plurality of tracks 508, and/or between adjacent slots 504 within the load retainer tracks 512 or the first plurality of tracks 508, conforms to standard spacing requirements used in semi-trucks, line haul vans, and other cargo transport vehicles. As such, the shelf assemblies 500 may be used in other applications other than the delivery vehicle 10. Among other benefits, the combination of the first plurality of tracks 508 and the load retainer tracks 512 reinforce the cargo compartment 402 (e.g., the outer walls 403, etc.) under externally applied loads (e.g., wind, etc.) and under the weight of the shelf assemblies 500 and parcels.

According to an exemplary embodiment, the shelf assemblies 500 can be mounted into either the first plurality of tracks 508, the load retainer tracks 512, or a combination thereof. The shelf assemblies 500 are height adjustable and may be connected to any of the slots along the length of the first plurality of tracks 508 or the load retainer tracks 512. In the delivery vehicle 10 of FIG. 24, a total of four shelf assemblies 500 are positioned along the one of the outer walls 403 of the cargo compartment 402 and a total of two shelf assemblies 500 are positioned along the other outer wall 403 (not shown). The shelf assemblies 500 are arranged in horizontally aligned pairs along the length of the cargo compartment 402. In other embodiments, the number and/or arrangement of the shelf assemblies 500 within the cargo compartment 402 is different.

As shown in FIG. 25, each shelf assembly 500 includes a shelf, shown as tray 514; a frame mount portion, shown as connector 516; and a leveling element, shown as strap 518. The tray 514 is hingedly coupled to the tracks 502 (e.g., the first plurality of tracks 508) via the connectors 516 on either side of the tray 514. A forward end 532 of the tray 514, along both sides of the tray 514, is connected to straps 518. The straps 518 support the weight of the tray 514 and the weight of any parcels positioned on the tray 514. The straps 518 may be tightened (e.g., tensioned, etc.) to rotate the tray 514 upwards toward a ceiling (e.g., upper wall) of the cargo compartment 402 (e.g., to set a height of the tray 514 at a forward end 532 of the tray 514, to level the tray 514 with respect to the lower wall 21 of the cargo compartment 402, etc.).

The tray 514 is sized and/or shaped to accommodate parcels within the cargo compartment 402 and to substantially prevent movement of the parcels within the cargo compartment 402 during transit operations. As shown in FIG. 25, the tray 514 is a rectangular platform that includes a base wall 520 and a plurality of end walls 522 extending upwardly from an outer perimeter of the base wall 520, in substantially perpendicular orientation relative to the base wall 520. The end walls 522 together form an outer lip that substantially prevents parcels and cargo from sliding off of the shelf assemblies 500 while the delivery vehicle 10 is in motion. In other embodiments, the size and/or shape of the tray 514 may be different. For example, a base wall 520 of the tray 514 may curve upwardly at the forward end 532 to prevent the parcels from sliding across the base wall 520 while the delivery vehicle 10 is in motion (e.g., to urge parcels toward the outer wall 403 of the cargo compartment 402, etc.). In the embodiment of FIG. 25, the end walls 522 are formed by bending the edges of the base wall 520 at an approximately 90 degree angle and welding or otherwise connecting the end walls 522 together (e.g., via tabs that extend from either end of each end wall 522, etc.). As such, the end walls 522 and the base wall 520 are formed together as a single unitary body. In other embodiments, the end walls 522 may be formed as separate pieces from the base wall 520 and welded to the base wall 520 and/or fastened to the base wall 520 using screws, bolts, rivets, or another suitable mechanical fastener.

Figure 26:
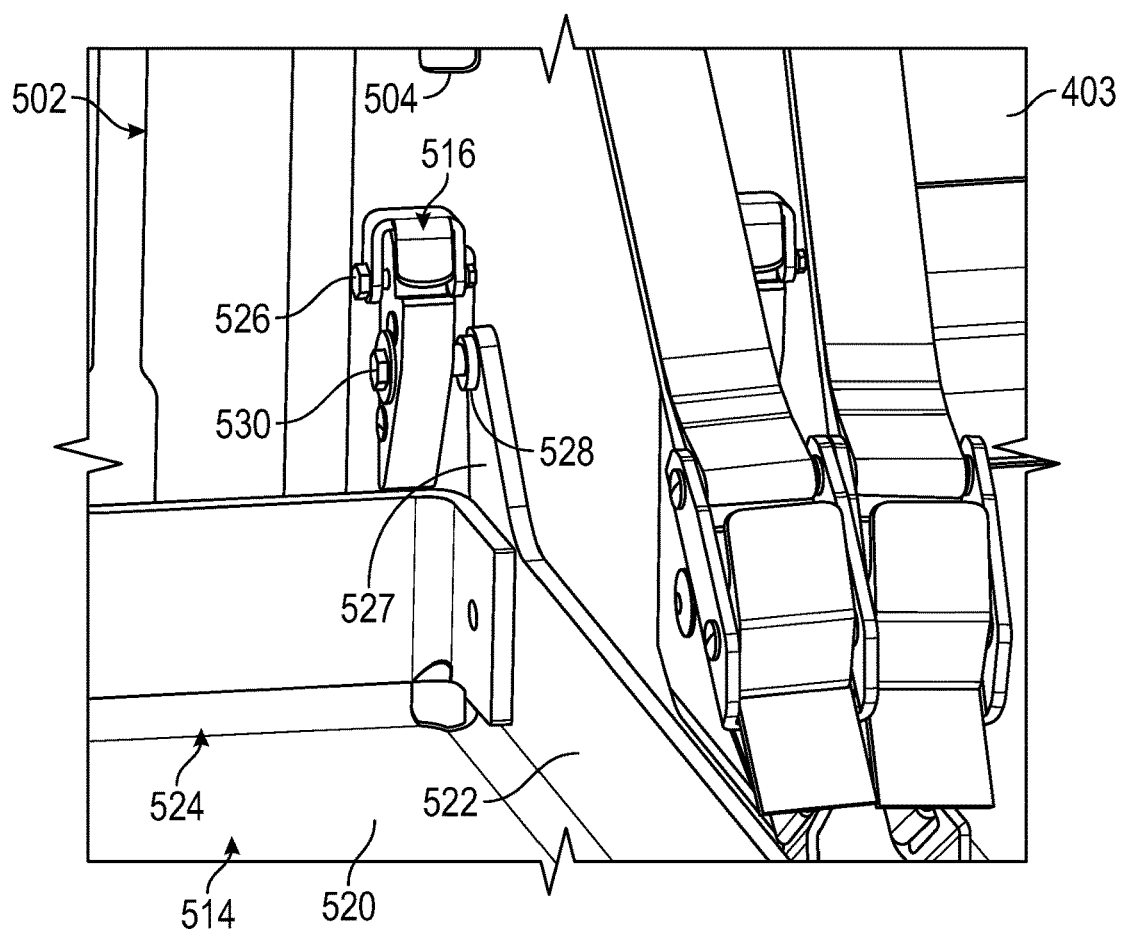
FIG. 26 is a detailed view of a frame mount portion of the cargo shelf assembly of FIG. 25, according to an exemplary embodiment.

As shown in FIG. 26, the tray 514 is hingedly coupled to the tracks 502 by the connectors 516 at both sides of the tray 514 along a back end 524 of the tray 514. The connectors 516 are detachably coupled to the track 502 via the slots 504. According to an exemplary embodiment, the connectors 516 are snap-in couplings (e.g., clips, etc.) that engage with a perimeter edge of the slots 504 (e.g., an upper and lower edge of the slots 504, opposing edges of the slots 504, etc.). As shown in FIG. 26, the connectors 516 also include a fastener 526 (e.g., a blot, screw, etc.) that prevents removal of the connector 516 from the track 502 without a separate tool (e.g., wrench, socket, etc.) to disengage the fastener 526 from the connector 516. Among other benefits, using a fastener 526 to lock the connector 516 to the track 502 prevents inadvertent removal of the connectors 516 by the operator of the delivery vehicle 10, thereby preventing the trays 514 and/or other components of the shelf assembly 500 from becoming misplaced or damaged. In other embodiments, the connectors 516 are snap-on clips, latches, or other quick-connect devices that can be disassembled without a separate tool.

As shown in FIG. 26, the end walls 522 at either side of the tray 514 include a mounting flange, shown as mounting leg 527, that engages the connector 516. The mounting leg 527 is integrally formed with the end wall 522 and extends upwardly from the end wall 522 at a location that is adjacent to the back end 524 of the tray 514. As shown in FIG. 26, each mounting leg 527 includes an opening 528 sized to receive a rotational coupling, shown as pin 530, of the connector 516 therein. The pin 530 rotatably couples the mounting leg 527 to the connector 516 such that the tray 514 may rotate upwardly toward a ceiling of the cargo compartment 402. The tray 514 is, therefore, rotatable between a stowed position (e.g., an upright position in which the tray 514 is raised into substantially parallel orientation relative to the outer wall 403) and an in-use position (e.g., a lowered position in which the back end wall 522 of the tray 514 is brought into contact with the tracks 502). As shown in FIG. 26, the mounting leg 527 engages (e.g., contacts) the connector 516 along a side surface of the connector 516 such that the connectors 516 are disposed inboard of the mounting legs 527. In other embodiments, the shape and/or position of the mounting legs 527 relative to the connectors 516 is different.

According to an exemplary embodiment, at least one of the tray 514 and the tracks 502 includes a bumper (e.g., a stop, a grommet, etc.) that is configured to prevent the tray 514 from damaging the outer wall 403 of the cargo compartment 402 in either the stowed or in-use position. In some embodiments, the position of the bumper is adjustable to allow a user to customize the location of the tray 514 in the stowed and/or in-use position. For example, the bumper may be threadably engaged to the tray 514 to facilitate repositioning of the bumper relative to the base wall 520.

As shown in FIG. 24, each shelf assembly 500 includes at least one strap 518. The straps 518 support the weight of the tray 514, and any parcels loaded onto the tray 514, in the in-use position. The straps 518 also facilitate leveling of the tray 514 (e.g., positioning the tray 514 in substantially parallel orientation relative to the lower wall 21 of the cargo compartment 402, orienting the tray 514 substantially horizontally, etc.). Additionally, the straps 518 facilitate raising the tray 514 from the in-use position to the stowed position. According to an exemplary embodiment, each shelf assembly 500 includes a pair of straps 518, with each strap 518 positioned on an opposing side of the tray 514. As shown in FIGS. 24 and 27-29, each strap 518 includes a track connector, shown as T-bar connector 536; a first strap portion, shown as first flexible tether 538; a second strap portion, shown as second flexible tether 539; an adjustable member or adjustor, shown as tension element 540; and a tray connector, shown as bracket 542. In other embodiments, each strap 518 may include additional, fewer, and/or different components.

Figure 27:
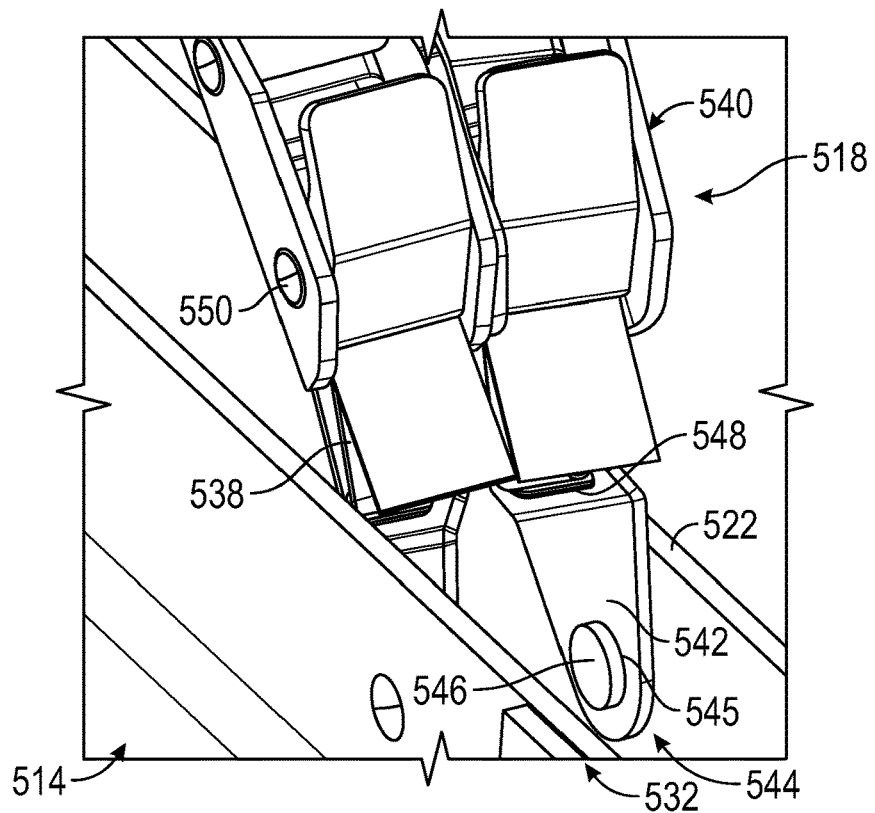
FIG. 27 is a detailed view of a lower strap portion of the cargo shelf assembly of FIG. 25, according to an exemplary embodiment.

As shown in FIG. 24, each strap 518 extends at an oblique angle between the track 502 and the tray 514. As shown in FIG. 27, a first end 544 of each strap 518 is mounted to the tray 514 by the bracket 542. The bracket 542 includes a first opening, shown as hole 545, that is sized to receive a fastener, shown as pin 546, therein to rotatably couple the bracket 542 to an end wall 522 of the tray 514. As shown in FIG. 27, the bracket 542 is rotatably coupled to a side end wall 522 of the tray 514 proximate to the forward end 532 of the tray 514. In other embodiments, the bracket 542 may be coupled to another portion of the tray 514 (e.g., the end wall 522 at an intermediate position between the forward end 532 and the back end 524, half way between the forward end 532 and the back end 524, etc.). The bracket 542 also includes a second opening, shown as slot 548, that is positioned on an opposing end of the bracket 542 relative to the hole 545. The slot 548 is sized to accommodate the first flexible tether 538, which couples the bracket 542 to the tension element 540. As shown in FIG. 27, the first flexible tether 538 is looped through the slot 548 and secured to (e.g., looped around, anchored to, hooked to, etc.) a lower pin 550 of the tension element 540.

Figure 28:
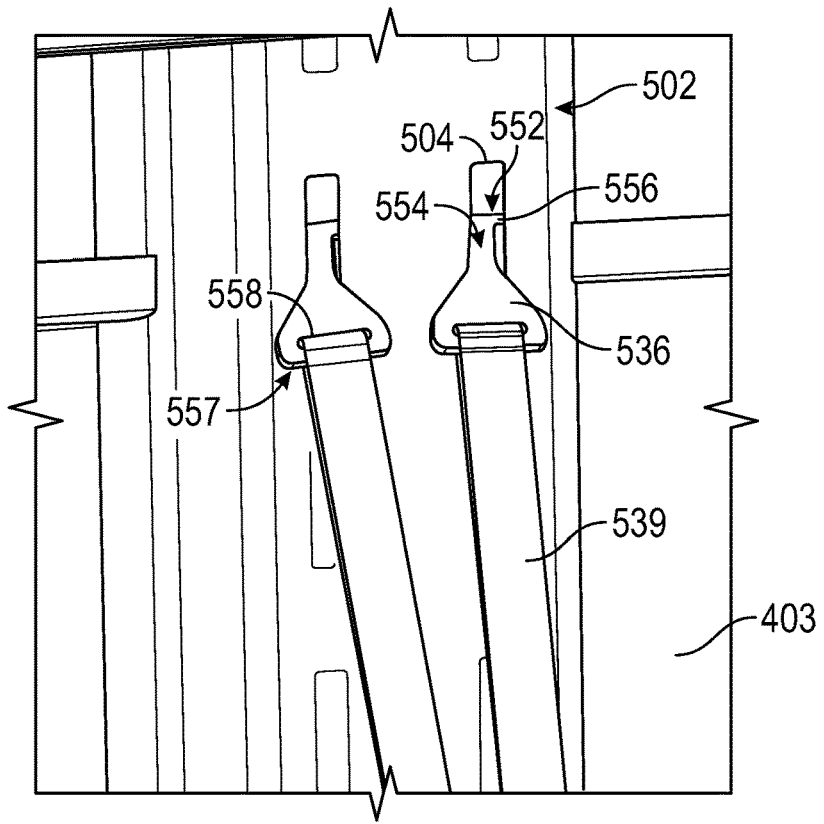
FIG. 28 is a detailed view of an upper strap portion of the cargo shelf assembly of FIG. 25, according to an exemplary embodiment.

As shown in FIG. 28, a second end 552 of each strap 518 is mounted to the tracks 502 by the T-bar connector 536. The T-bar connector 536 is detachably coupled to the tracks 502 and may be repositioned to other slots 504 within the tracks 502. A first end 554 of the T-bar connector 536 includes a "T" shaped extension 556 that is sized to be received within the slots 504. A second end 557 of the T-bar connector 536 includes an opening, shown as slot 558, that is sized to accommodate the second flexible tether 539. A user engages the T-bar connector 536 with the tracks 502 by aligning the "T" shaped extension 556 with the slots 504 and pressing the "T" shaped extension 556 into the hollow space between the tracks 502 and the outer wall 403 of the cargo compartment 402. The user then twists the T-bar connector 536 approximately 90 degrees (e.g., in a clockwise direction, in a counterclockwise direction) to reorient the "T" shaped extension 556 perpendicular to the slots 504 and engage the "T" shaped extension 556 with the side edges of the slots 504. The weight of the tray 514 and parcels draws the "T" shaped extension 556 against the tracks 502, which substantially prevents rotation of the T-bar connector 536 (e.g., prevents the T-bar connector 536 from disengaging the track 502 after being installed into the slot 504).

Figure 29:
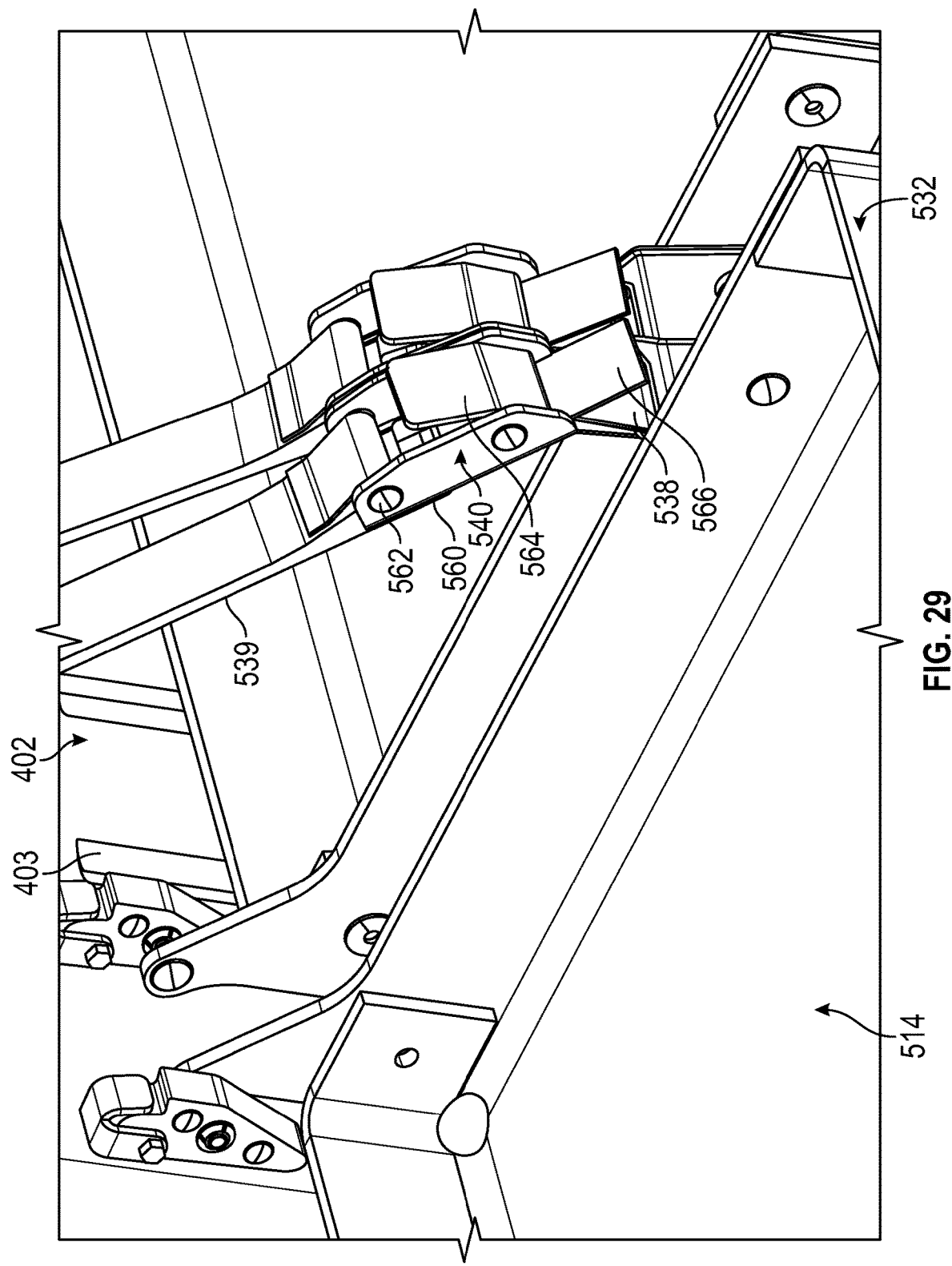
FIG. 29 is a detailed view of an adjustable portion of the cargo shelf assembly of FIG. 25, according to an exemplary embodiment.

The second flexible tether 539 connects the T-bar connector 536 to the tension element 540. As shown in FIG. 28, the second flexible tether 539 is looped around and slidably engaged to the T-bar connector 536 (e.g., slot 558) to facilitate repositioning and/or leveling of the tray 514. As shown in FIG. 29, a first end 560 of the second flexible tether 539 is secured to (e.g., looped around, anchored to, hooked to, etc.) an upper pin 562 of the tension element 540. According to an exemplary embodiment, the first flexible tether 538 and the second flexible tether 539 are made from a weather-resistant webbing (e.g., polyester webbing, etc.).

According to an exemplary embodiment, the tension element 540 is a cinch cam strap buckle that includes a manually repositionable toggle 564 (e.g., clamp, cam, buckle, etc.). The toggle 564 presses against the second flexible tether 539 to pinch the strap against a lower surface of the tension element 540 (e.g., a friction bar, etc.). The force applied to the second flexible tether 539 by the toggle 564 locks the second flexible tether 539 in position and prevents the second flexible tether 539 from retracting through the tension element 540. In other embodiments, the tension element 540 is a ratchet strap buckle or another type of adjustable strap buckle. As shown in FIG. 29, a second end 566 (e.g., free end) of the second flexible tether 539 passes through the toggle 564 toward the forward end 532 of the tray 514. The second end 566 of the second flexible tether 539 extends beyond the toggle 564 and away from the outer wall 403 of the cargo compartment 402. In order to raise the forward end 532 of the tray 514, a user pulls on the second end 566 of the second flexible tether 539 toward themselves (into the enclosed space defined by the cargo compartment 402) and away from the outer wall 403 of the cargo compartment 402. According to an exemplary embodiment, the second end 566 of the second flexible tether 539 includes a loop (e.g., the second flexible tether 539 is looped back onto itself) to facilitate user interaction with the second flexible tether 539 when raising and lowering the tray 514. Among other benefits, the arrangement and position of the second end 566 of the second flexible tether 539 provides a user-friendly and ergonomic mechanism for repositioning (e.g., leveling, raising, etc.) the tray 514.

Door Assembly

Referring to FIGS. 30-48 generally, the side door assembly 700 is shown in additional detail. As explained above, the side door assembly 700 includes the driver cab door 800 and the side cargo door 1000 that together extend along the right side 18 of the body 100 and selectively permit access into the delivery vehicle 10. The driver cab door 800 and the side cargo door 1000 are slidably coupled to body 100 and each independently movable along parallel guide rails having tracks that extend both above and below the right cab opening 204 and the side cargo opening 404. By sliding rather than rotating about hinges, the driver cab door 800 and the side cargo door 1000 provide significantly less interference for a person or object moving into or out of the delivery vehicle 10. For example, when the side cargo door 1000 is in the open position, a person or object has nearly unobstructed access to the entire side cargo opening 404. While traditional hinged doors may require a person or object to be moved into or out of the cargo compartment 402 at an angle, the side door assembly 700 avoids these problems by eliminating potential sources of interference. Additionally, the side door assembly 700 reduces the lateral footprint of the delivery vehicle 10. The reduced lateral footprint of the delivery vehicle 10 allows the improved transfer of items into and out of the cargo compartment 402 or the driver compartment 202 by allowing the delivery vehicle 10 to park closer to mailboxes and other parcel transfer points, for example. According to an exemplary embodiment, the side door assembly 700 is contained entirely between the front axle 60 and the rear axle 64. In addition, the overlapping nature of the driver cab door 800 and the side cargo door 1000 restricts use of the delivery vehicle 10 before each of the driver cab door 800 and the side cargo door 1000 within the side door assembly 700 have been returned to their respective closed and secured positions (e.g., if the side cargo door 1000 is open, the operator cannot open the driver cab door 800 to get into the cab 200 and, therefore, ensures the side cargo door 1000 is not left open inadvertently while driving).

Figure 30:
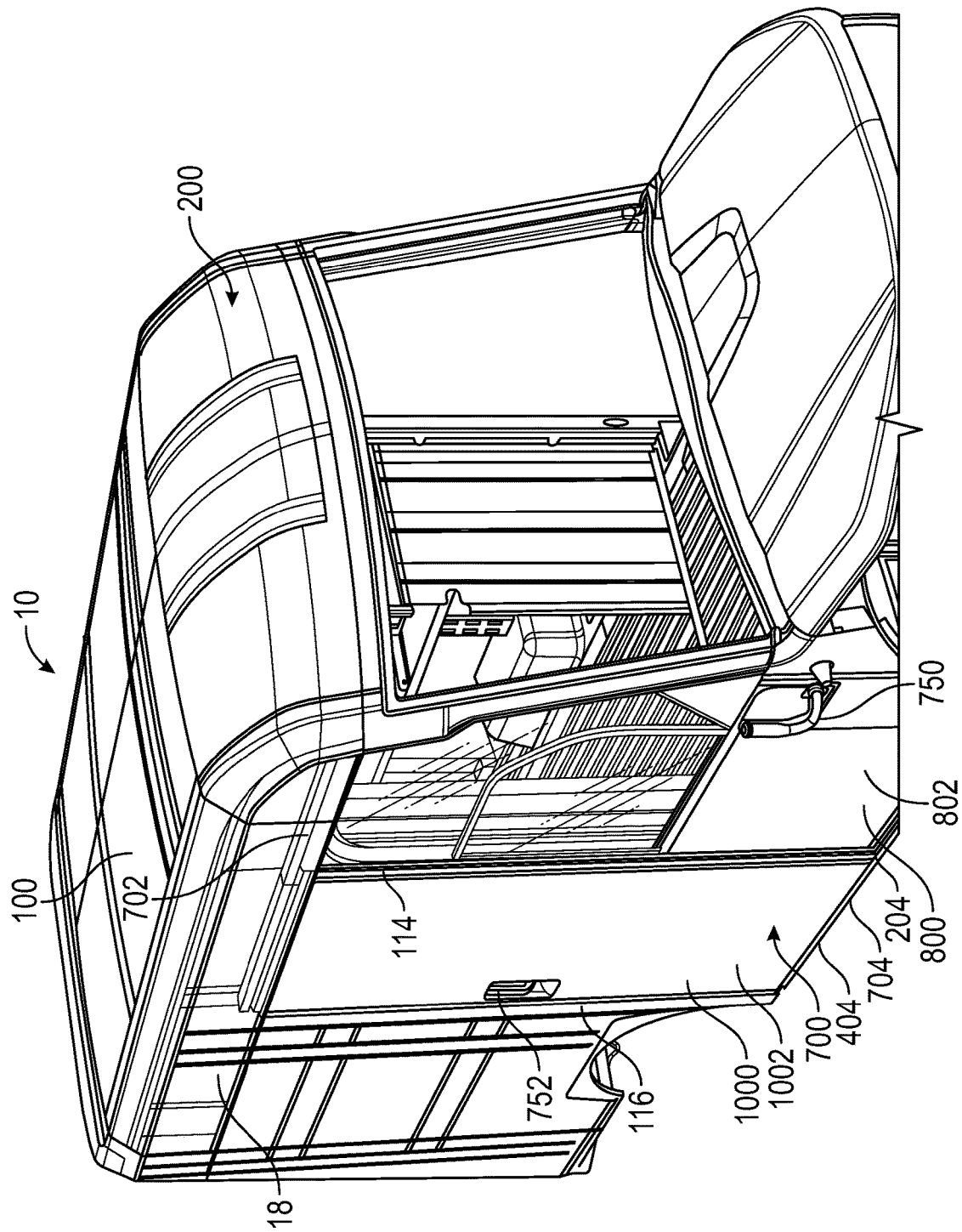
FIG. 30 is a front perspective view of the delivery vehicle of FIG. 1 having the side door assembly, according to an exemplary embodiment.
Figure 39:
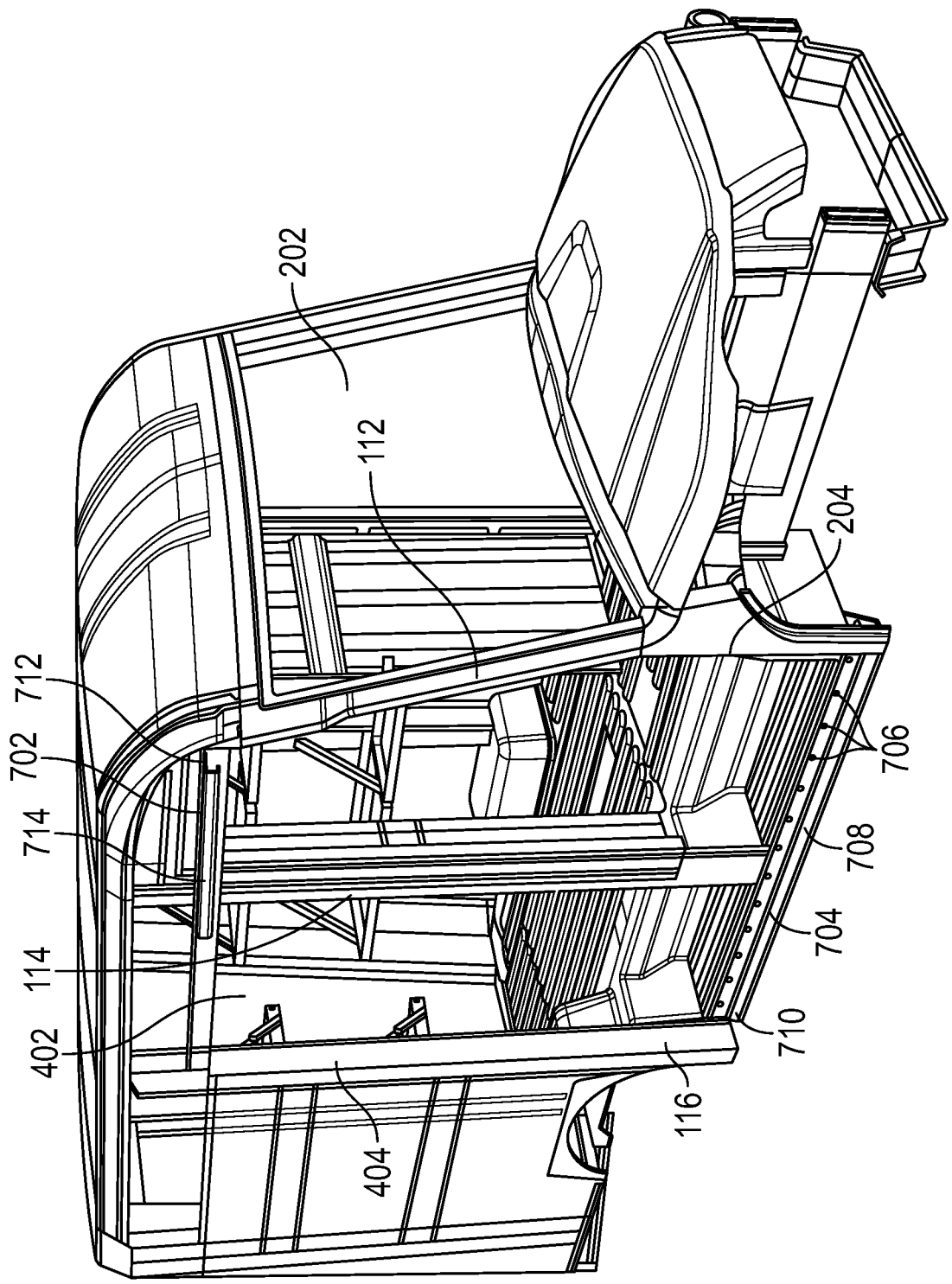
FIG. 39 is a front perspective view of the delivery vehicle of FIG. 30, detailing an initial step in an installation process to couple the side door assembly of FIG. 31 to the delivery vehicle, according to an exemplary embodiment.

Referring specifically to FIGS. 30-33, the configuration and operation of the side door assembly 700 is depicted. As explained above, the side door assembly 700 includes the driver cab door 800 and the side cargo door 1000 that are each slidably coupled to one or more guide rails 702, 704 that extend along the body 100 of the delivery vehicle 10. In some examples, a first guide rail 702 extends along the body 100, above and across each of the right cab opening 204 and the side cargo opening 404. The first guide rail 702 can be integrally formed within or otherwise mounted (e.g., fastened, welded, glued, etc.) to the body 100. As shown in FIGS. 30 and 39, the first guide rail 702 extends from the A-pillar 112, across the B-pillar 114, and to the C-pillar 116 on the right side 18 of the body 100. Similarly, the second guide rail 704 extends along the body 100, below and across each of the right cab opening 204 and the side cargo opening 404. As shown in FIG. 39, fasteners 706 can be used to mount the second guide rail 704 to steps 708, 710 that extend beneath and across the right cab opening 204 and the side cargo opening 404, respectively.

Figure 32:
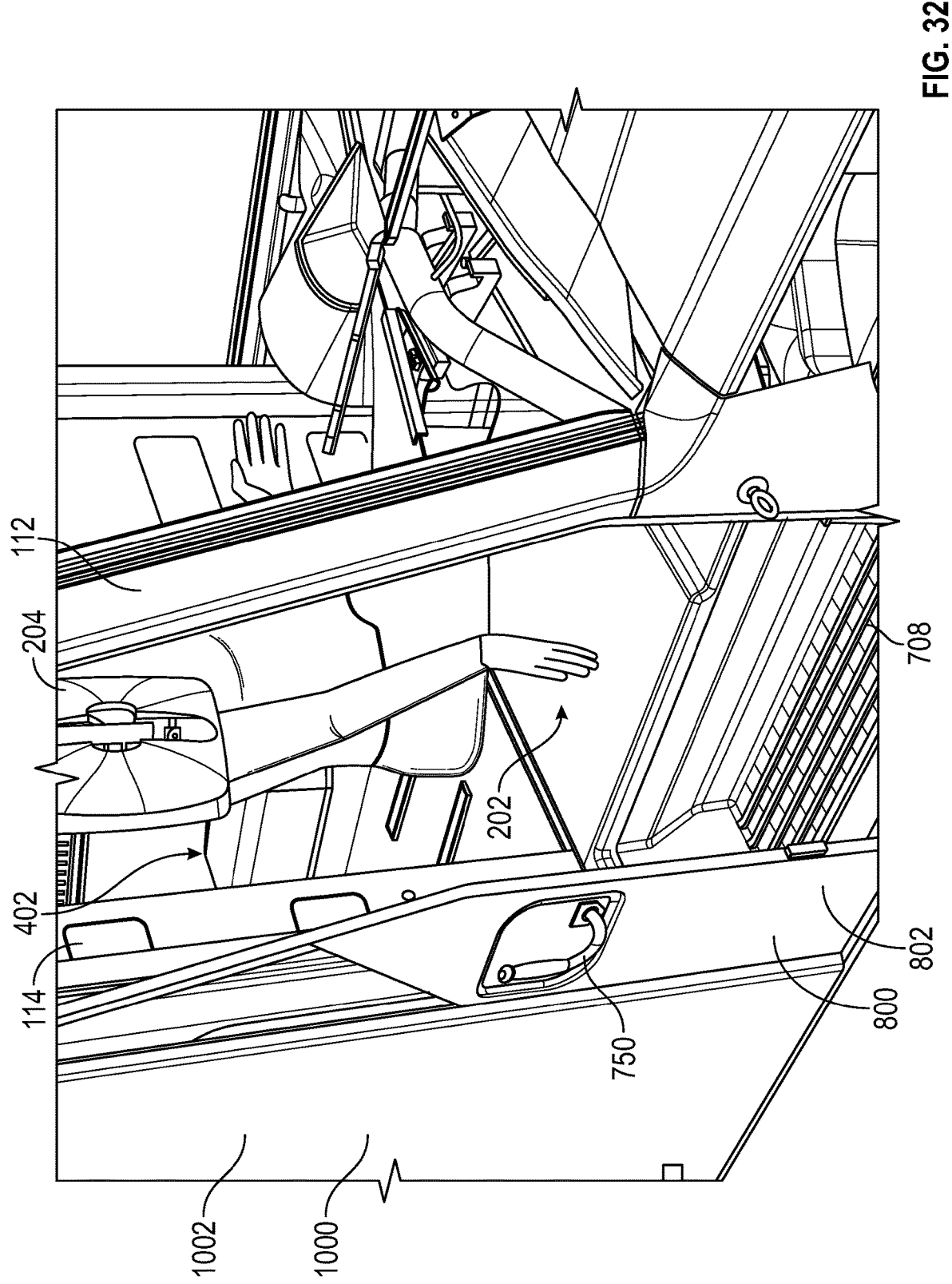
FIG. 32 is a front perspective view of the delivery vehicle of FIG. 30 with a front door of the side door assembly of FIG. 31 in an open position, according to an exemplary embodiment.
Figure 33:
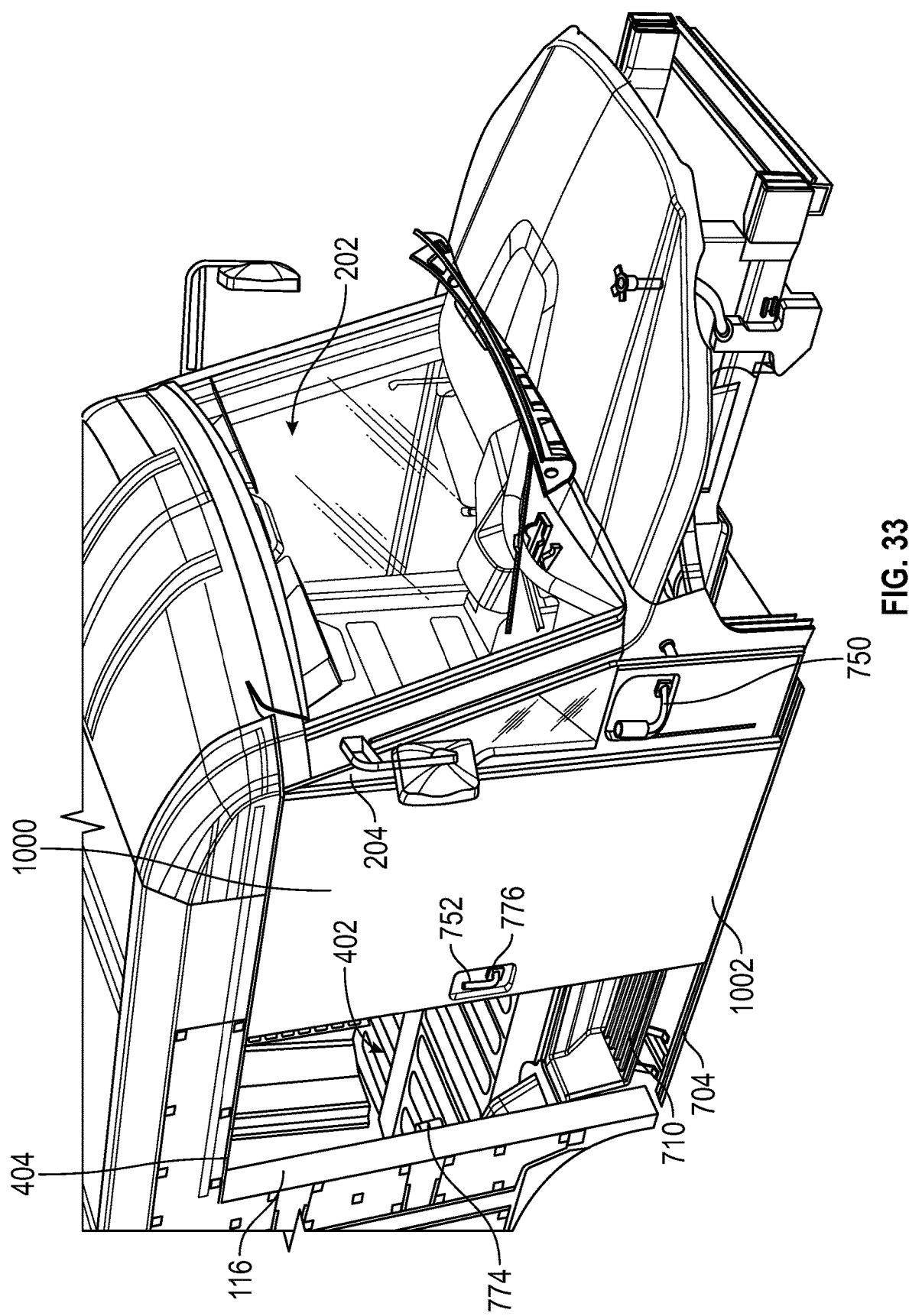
FIG. 33 is a front perspective view of the delivery vehicle of FIG. 30 with a rear door of the side door assembly of FIG. 31 in an open position, according to an exemplary embodiment.

The first guide rail 702 and second guide rail 704 collectively define the movement of the driver cab door 800 and the side cargo door 1000 relative to the body 100 and relative to the right cab opening 204 and side cargo opening 404. The first guide rail 702 and the second guide rail 704 define two parallel and laterally offset tracks 712, 714 to separately receive the driver cab door 800 and the side cargo door 1000 and allow relative motion between the driver cab door 800 and the side cargo door 1000 about parallel axes. As shown in FIGS. 30, 32, and 33, each of the driver cab door 800 and the side cargo door 1000 are movable between multiple positions. In FIG. 30, for example, the driver cab door 800 and the side cargo door 1000 are each in a "closed position." In the "closed" or first position, the driver cab door 800 extends across the right cab opening, from the B-pillar 114 to the A-pillar 112 to effectively seal off and cover the right cab opening 204 so that movement into and out of the driver compartment 202 is restricted.

The driver cab door 800 can be opened to allow a driver to enter or exit the driver compartment 202 of the body 100. To access the driver compartment 202, the driver cab door 800 can slide rearward along the first guide rail 702 and the second guide rail 704 toward an "open," or second position, as shown in FIG. 32. Because the driver cab door 800 and the side cargo door 1000 are received within separate and offset tracks 712, 714 within the guide rails 702, 704, the driver cab door 800 and the side cargo door 1000 can move independently of one another. As the driver cab door 800 is urged backward along the guide rails 702, 704, the door panel 802 no longer spans across the entire right cab opening 204. The driver cab door 800 can be moved rearward, behind the side cargo door 1000, until the driver cab door 800 engages a stop. In some examples, the stop is positioned within one or both of the first and second guide rails 702, 704. Alternatively, the stop can be created by interference between a handle assembly 750 and the side cargo door 1000. The stop prevents continued rearward movement of the driver cab door 800, and defines the fully open or second position. In the second position, the driver cab door 800 is offset from the right cab opening 204 but extends across at least a portion of the side cargo opening 404. In the second position, the door panel 802 is offset rearward so that at least half (e.g., about 70%) of the door panel 802 extends rearward of the B-pillar 114. In some examples, the stop includes a releasable locking mechanism that is coupled to the B-pillar 114 to hold the driver cab door 800 in the fully open position. As explained below, the locking mechanism can be unlocked by actuating the first handle assembly 750.

Like the driver cab door 800, the side cargo door 1000 can also be moved along the first and second guide rails 702, 704 between multiple positions. As shown in FIG. 30, the side cargo door 1000 is in a "closed" or third position. In the closed position, the side cargo door 1000 extends across the side cargo opening 404, from the B-pillar 114 to the C-pillar 116 to effectively seal off and cover the side cargo opening 404 so that movement into and out of the cargo compartment 402 is restricted. When the driver cab door 800 and the side cargo door 1000 are both in the closed position (e.g., the first and third positions), the side cargo door 1000 overlaps a portion (e.g., about 5%) of the driver cab door 800.

The side cargo door 1000 can also be opened to allow a driver or worker to enter or exit the cargo compartment 402 of the cargo body 400 through the side cargo opening 404. To access the cargo compartment 402, the side cargo door 1000 can slide forward along the first guide rail 702 and the second guide rail 704 toward an "open," or fourth position, as shown in FIG. 33. Because the driver cab door 800 and the side cargo door 1000 are received within separate and offset tracks 712, 714 within the guide rails 702, 704, the side cargo door 1000 can move independently of the driver cab door 800 forward, toward the front axle 60. As the side cargo door 1000 is urged forward along the guide rails 702, 704, a door panel 1002 of the side cargo door 1000 no longer spans across the entire side cargo opening 404, and instead extends across a portion of the right cab opening 204, which may already be covered by the driver cab door 800. The side cargo door 1000 can be moved forward, over the driver cab door 800, until the side cargo door 1000 engages a stop. In some examples, the stop is positioned within one or both of the first and second guide rails 702, 704. Alternatively, the stop can be created by interference between a handle assembly 750 and the side cargo door 1000. The stop prevents continued forward movement of the side cargo door 1000, and defines the fully open or fourth position. In the fourth position, the side cargo door 1000 is offset forward from the side cargo opening 404 but may extend across at least a portion of the side cargo opening 404. In the fourth position, the door panel 1002 is offset forward so that at least half (e.g., about 70%) of the door panel 1002 extends forward and beyond the B-pillar 114. In some examples, the stop includes a releasable catch mechanism that is mounted to one of the driver cab door 800 or the B-pillar 114 to prevent the side cargo door 1000 from transitioning away from the fourth, fully open position unless actuated (e.g., by the second handle assembly 752, explained below).

Figure 34:
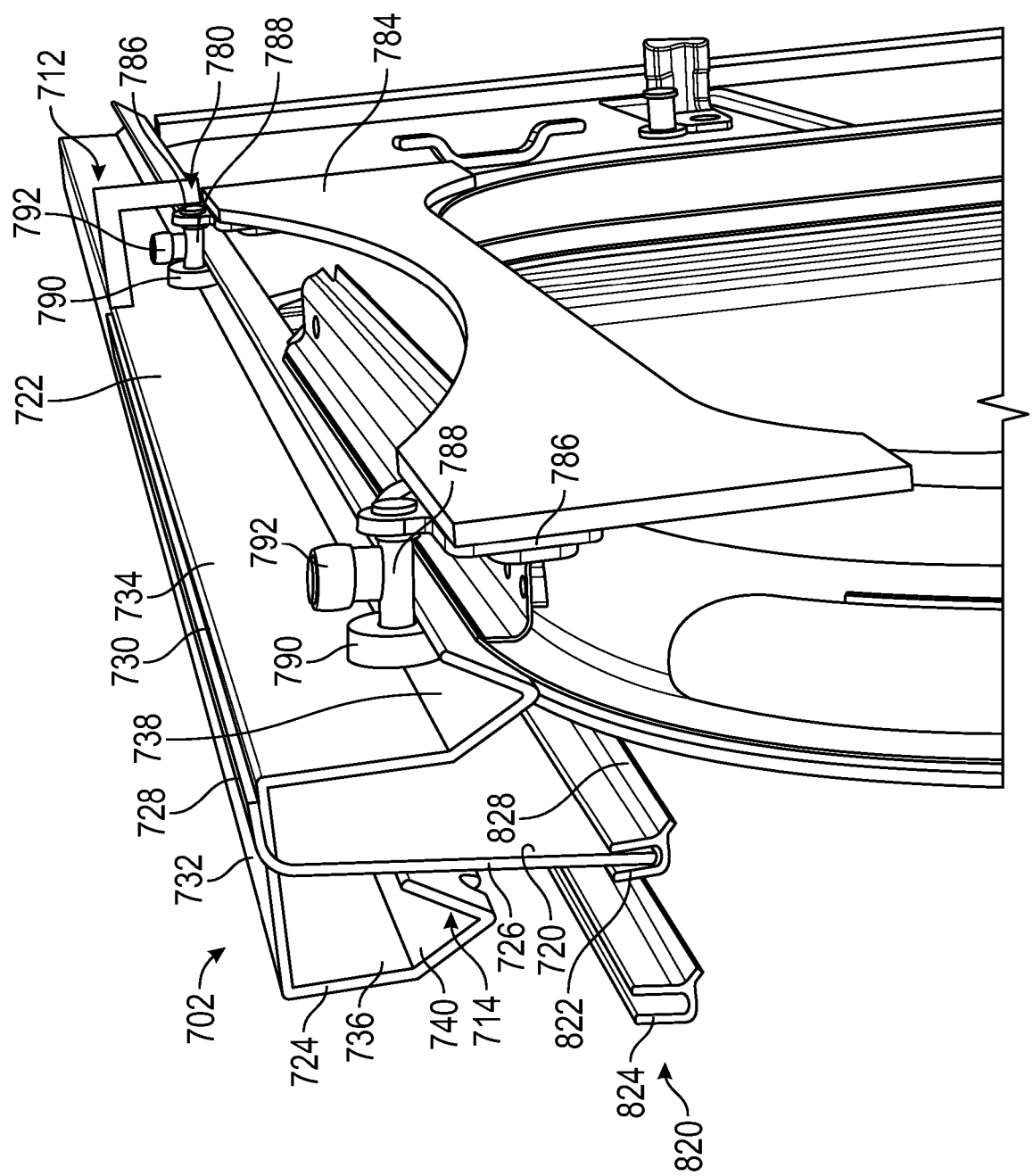
FIG. 34 is a front perspective view of an upper guide rail of the side door assembly of FIG. 31, according to an exemplary embodiment.
Figure 35:
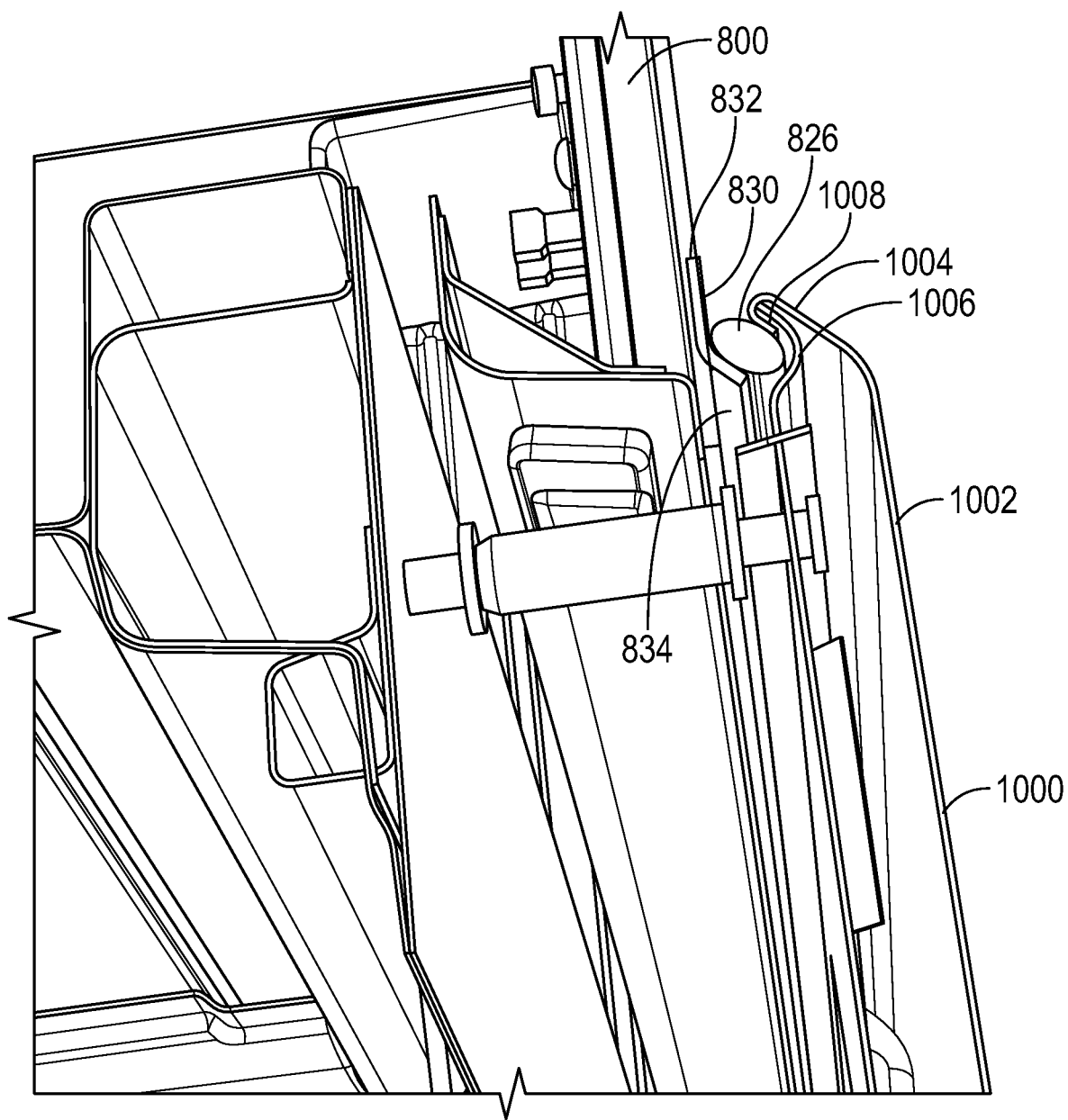
FIG. 35 is a top perspective view of the delivery vehicle of FIG. 8 with a roof of the delivery vehicle removed, detailing a sealing arrangement between the front door and the rear door of the side door assembly of FIG. 31, according to an exemplary embodiment.
Figure 36:
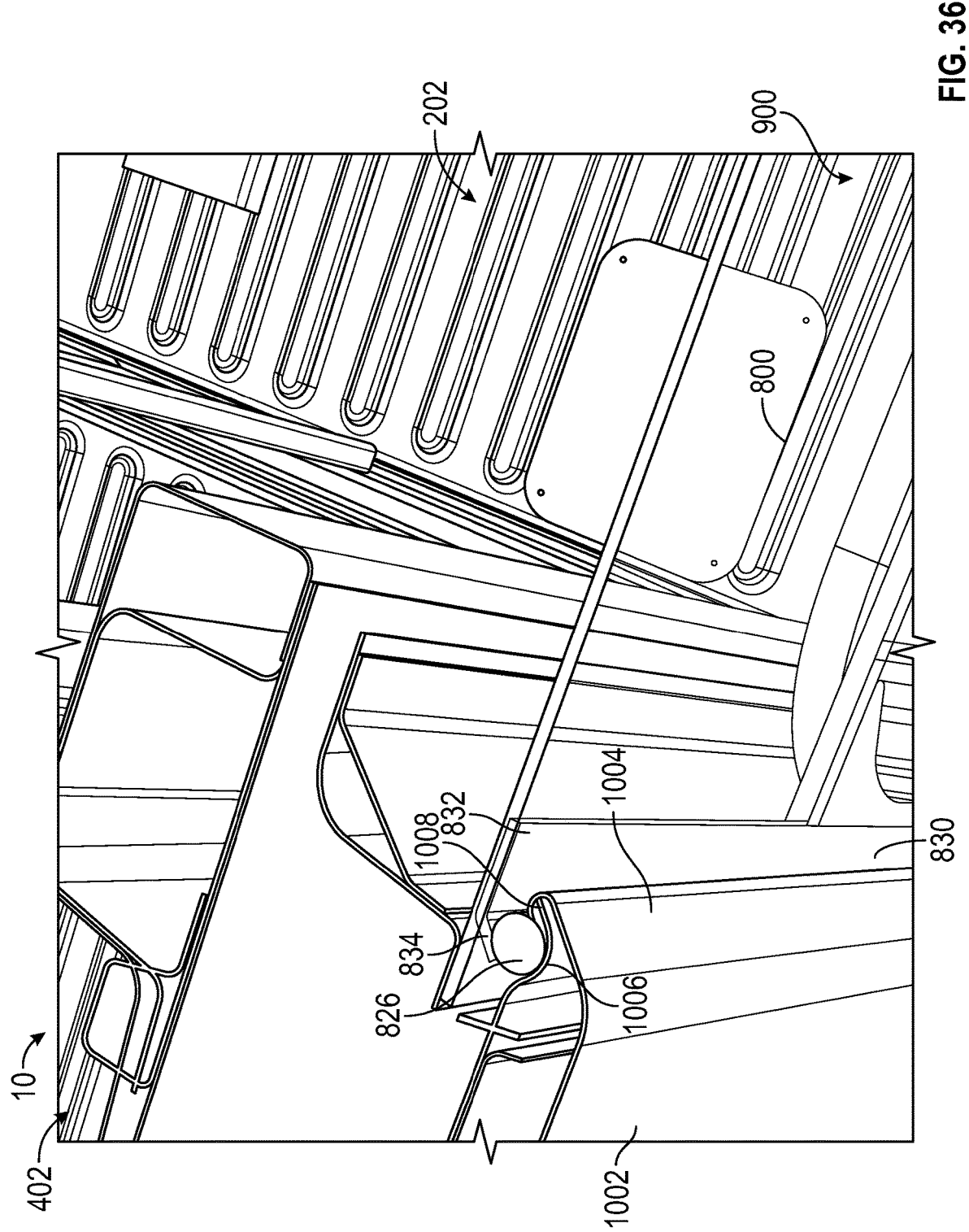
FIG. 36 is another top perspective view of the delivery vehicle of FIG. 30 with the roof of the delivery vehicle removed, once again detailing the sealing arrangement between the front door and the rear door of the side door assembly of FIG. 31, according to an exemplary embodiment.

Referring to FIG. 34, the first guide rail 702 is shown in additional detail. The first guide rail 702 generally includes a support partition 720 that receives and secures two angled members 722, 724 that together form the first track 712 and the second track 714. The support partition 720 has a flat guiding section 726 and a mounting flange 728 extending (e.g., perpendicularly) away from the guiding section 726. In some examples, the mounting flange 728 defines apertures (not shown) that can be used to secure the support partition 720 and first guide rail 702, more generally, to the body 100. In some examples, the mounting flange 728 can also be used to couple the angled members 722, 724 to the support partition 720.

The angled members 722, 724 each generally include a flat upper surface 730, 732, a wall 734, 736 extending perpendicularly away from the flat upper surface 730, 732, and a V-shaped trough 738, 740 extending inward from an end of the wall 734, 736 opposite the flat upper surface 730, 732. In some examples, the wall 734 of the first angled member 722 is taller (e.g., the wall 734 extends downward further) than the wall 736 of the second angled member 724. Accordingly, the v-shaped trough 738 of the first angled member 722 sits lower than the v-shaped trough 740 of the second angled member 724. The flat upper surface 730, 732, the wall 734, 736, and the v-shaped trough 738, 740 each extend an entire length of the respective angled member 722, 724.

The v-shaped troughs 738, 740 and the walls 734, 736 define the first track 712 and the second track 714, and allow the driver cab door 800 and the side cargo door 1000 to slide along the body 100. Each of the driver cab door 800 and the side cargo door 1000 include roller assemblies 780, 782 that are received within and movable along the tracks 712, 714. As shown in FIG. 34, a first roller assembly 780 coupled to the driver cab door 800 is received within the v-shaped trough 738 of the first angled member 722. The first roller assembly 780 includes a mounting plate 784 that extends upward from a top of the door panel 802. The mounting plate 784 supports eyelet plates 786. The eyelet plates 786 each receive a roller shaft 788 that includes a wheel 790 positioned at a distal end thereof. The wheel 790 is configured to roll within the v-shaped trough 738. The sloped edges of the v-shaped trough 738 direct the wheel 790 and the first roller assembly 780, more generally, within the first track 712. In some examples, a secondary wheel 792 extends upwardly from the driver cab door 800. The secondary wheel 792 rolls along the wall 734, and rotates about an axis perpendicular to an axis of the wheel 790. Similar structures can be used on the top of the side cargo door 1000 to interact with the second track 714. Additionally, similar roller assemblies 780, 782 can be coupled to the bottoms of the driver cab door 800 and the side cargo door 1000 to interact with the second guide rail 704.

With additional reference to FIGS. 34-37, a sealing arrangement 820 within the side door assembly 700 is shown in additional detail. The sealing arrangement 820 is generally formed of one or more resilient seals 822, 824, 826 that extend along the external edges and interfaces formed between different components of the side door assembly 700. For example, the seal 822 partially surrounds and extends along a length of the support partition 720. The seal 822 includes a lip 828 that can interact with the driver cab door 800, for example, to restrict or prevent fluid flow between the first guide rail 702 and the driver cab door 800 which may otherwise reach the driver compartment 202.

In some examples, the sealing arrangement 820 includes a main fluid seal 826 positioned between the driver cab door 800 and the side cargo door 1000. A seal carrier 830 is coupled to a rearward edge of the door panel 802, and extends along at least a portion of the height (e.g., the entire height) of the driver cab door 800. The seal carrier 830 includes a mounting portion 832 and a retainer portion 834. The mounting portion 832 is defined by a flat, flange-like surface that extends along the driver cab door 800. The mounting portion 832 can be adhesively coupled to the driver cab door 800, for example. In some embodiments, the mounting portion 832 extends along both the door panel 802 and the window assembly 900 of the driver cab door 800. The retainer portion 834 angles away from the mounting portion 832 and the driver cab door 800 to form an angled seat. The main fluid seal 826 can be adhesively coupled to the seal carrier 830 and extends along one or more of the retainer portion 834 and the mounting portion 832.

When each of the driver cab door 800 and the side cargo door 1000 are in the closed positions, the main fluid seal 826 is compressed between the driver cab door 800 and the side cargo door 1000. To receive and interact with the main fluid seal 826, the side cargo door 1000 includes a resilient nose 1004 and pocket 1006 defining a forward portion of the door panel 1002. The nose 1004 bends inwardly, away from the generally flat outer surface of the door panel 1002 and toward the driver cab door 800. In some examples, the nose 1004 extends approximately parallel (e.g., within about 20 degrees) to the retainer portion 834 of the seal carrier 830. The pocket 1006 is formed behind the nose 1004, and is configured to receive and interface with a portion of the main fluid seal 826. The nose 1004 is at least partially defined by a cantilevered segment 1008 that is bent into the door panel 1002. When the driver cab door 800 and the side cargo door 1000 are urged toward (or secured in) their closed positions, the main fluid seal 826 is received within the pocket 1006 of the door panel 1002 and the retainer portion 834 of the seal carrier 830. The main fluid seal 826 is compressed by the cantilevered segment 1008 and the nose 1004, generally, which causes the main fluid seal 826 to expand between the driver cab door 800 and the side cargo door 1000 so that fluid is restricted from passing into the body 100 through the interface formed between the driver cab door 800 and the side cargo door 1000 within the side door assembly 700. The placement of the main fluid seal 826 is such that the main fluid seal 826 does not inhibit rearward motion of the driver cab door 800 toward the open position or forward motion of the side cargo door 1000 toward the open position.

Figure 31:
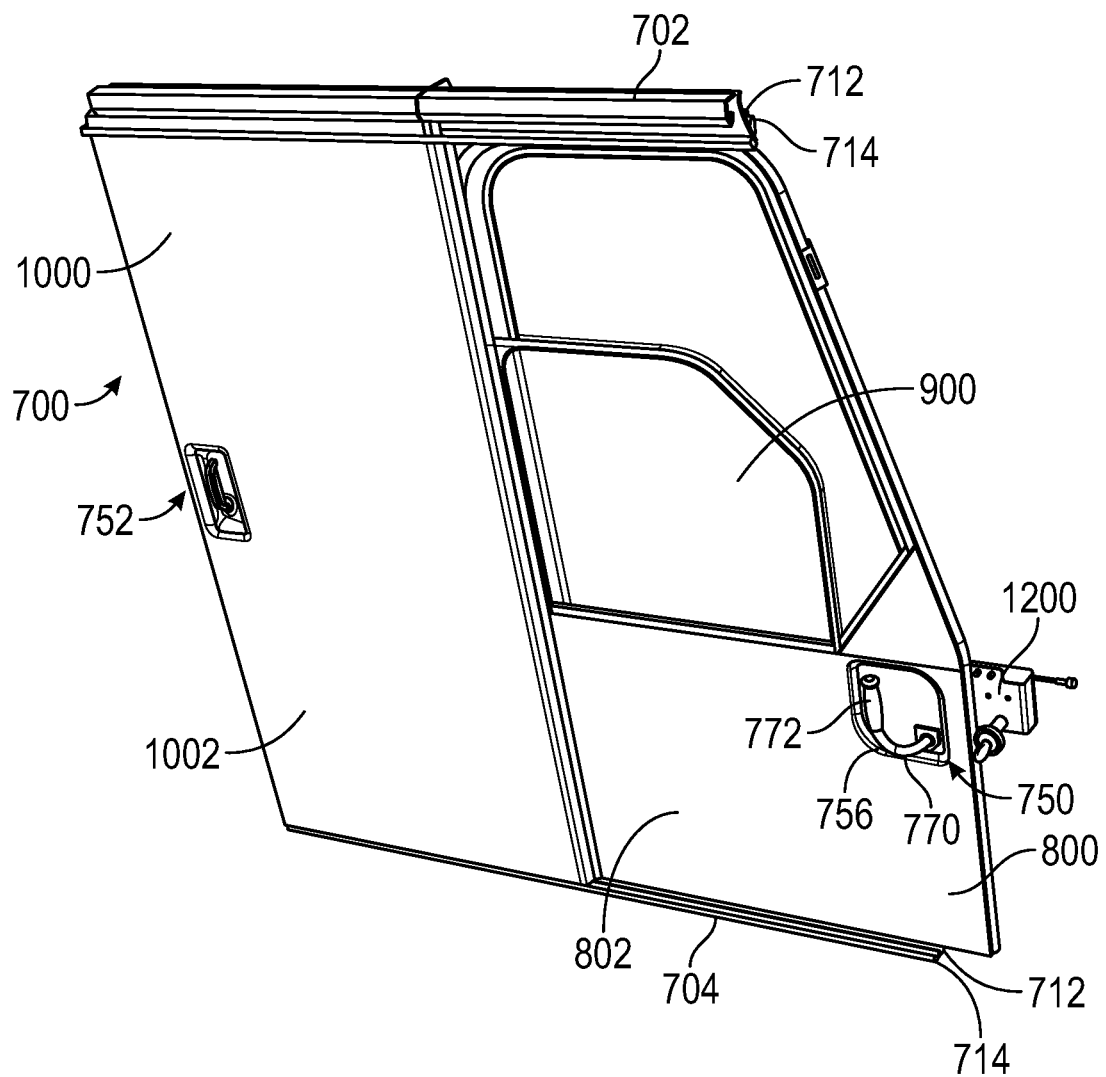
FIG. 31 is a front perspective view of the side door assembly of the delivery vehicle of FIG. 30, according to an exemplary embodiment.
Figure 37:
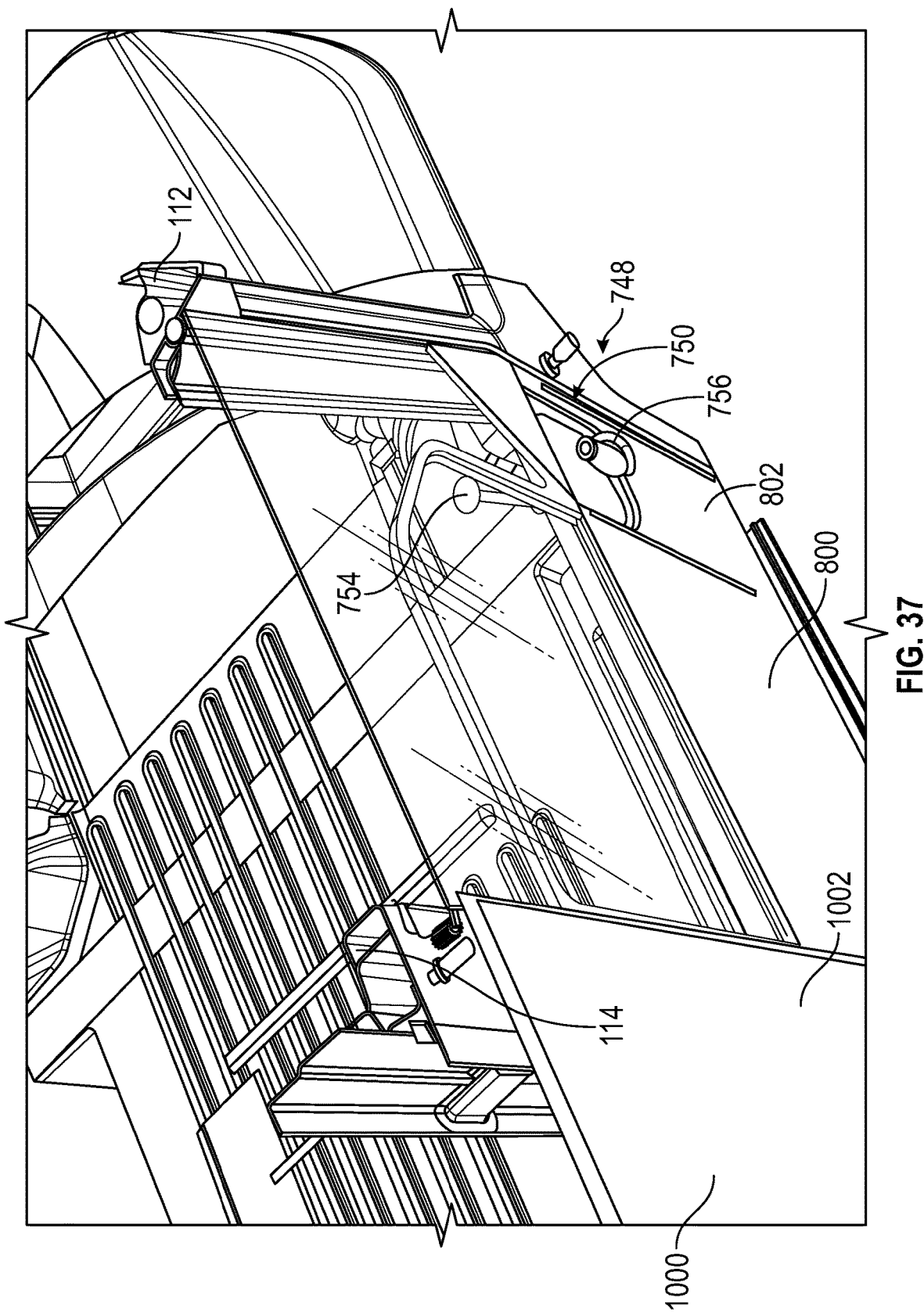
FIG. 37 is another top perspective view of the delivery vehicle of FIG. 30 with the roof of the delivery vehicle removed, detailing an opening mechanism between the front door and the rear door of the side door assembly of FIG. 31, according to an exemplary embodiment.
Figure 38:
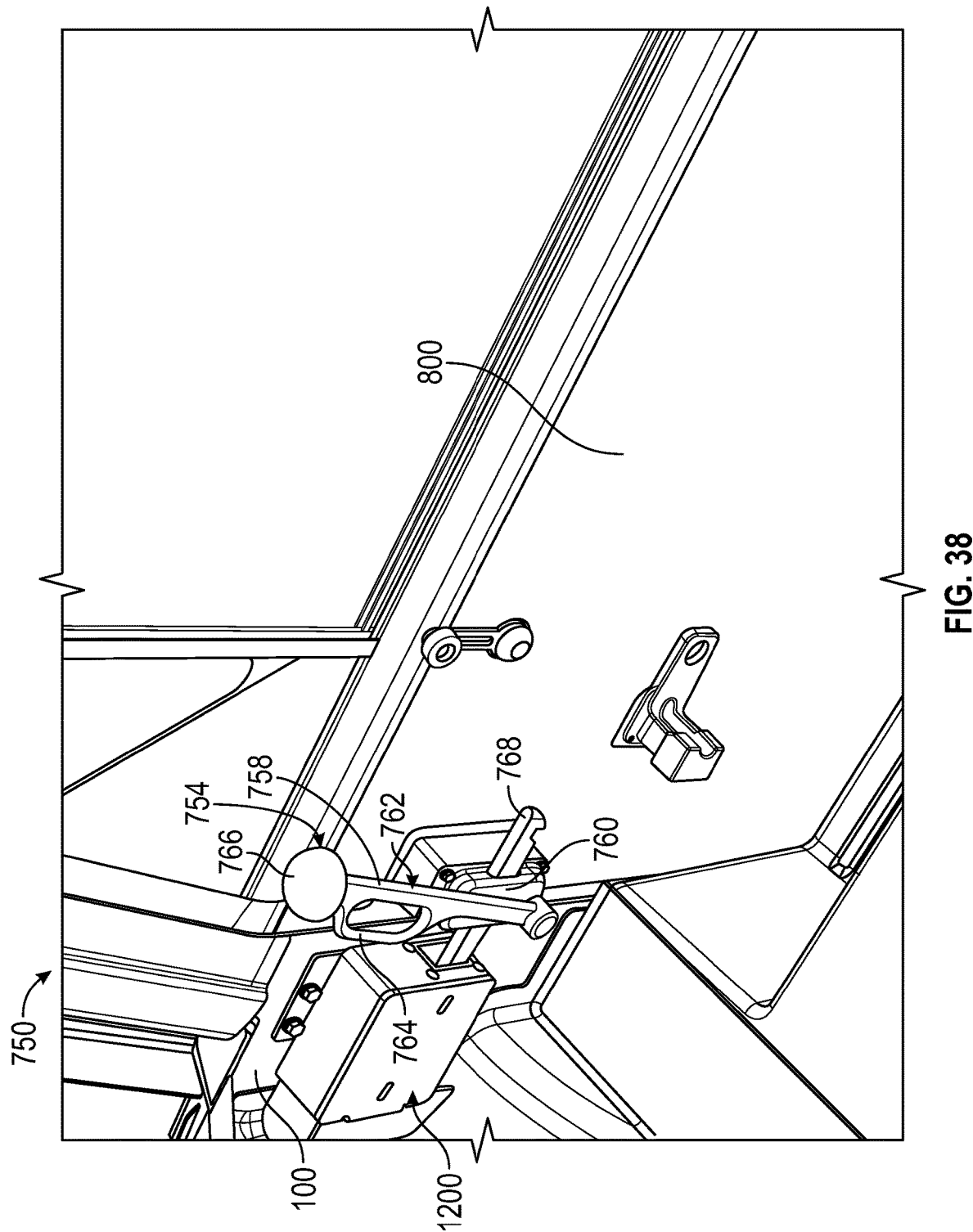
FIG. 38 is an interior perspective view of the delivery vehicle of FIG. 30, detailing a handle assembly of the opening mechanism of FIG. 37, according to an exemplary embodiment.

Referring now to FIGS. 31, 37, and 38, the side door assembly 700 includes an opening mechanism 748 including two handle assemblies, a first handle assembly 750 and a second handle assembly 752. The first handle assembly 750 is coupled to the driver cab door 800 proximate a forward edge of the door panel 802 and includes an interior handle 754 and an exterior handle 756. As shown in FIG. 38, the interior handle 754 includes a lever 758 that rotates relative to a latching mechanism 760 mounted along an inside of the door panel 802. The lever 758 is rotatably mounted to the latching mechanism 760 on a proximal end and includes a gripping portion or section 762 including a finger loop 764 and a thumb rest 766 formed on a distal end thereof. Rotation of the lever 758 (e.g., by applying a rearward force using the gripping section 762) relative to the latching mechanism 760 releases and decouples a locking latch 768 of the door locking assembly 1200 from the latching mechanism 760. With the locking latch 768 released from the latching mechanism 760, the driver cab door 800 can slide away from the closed, first position to the second, open position. Urging the driver cab door 800 forward from the second, open position toward the first, closed position can urge the locking latch 768 into engagement with the latching mechanism 760 to releasably secure the driver cab door 800 in the closed position. In some examples, the door locking assembly 1200 can be selectively locked in a way that prevents the locking latch 768 from decoupling with the latching mechanism 760. Because the door locking assembly 1200 is mounted to the body 100 rather than to the driver cab door 800, the selective coupling formed between the door locking assembly 1200 and the latching mechanism 760 prevents rearward movement of the driver cab door 800 relative to the body 100 to secure the driver cab door 800 in the first, closed position.

The exterior handle 756 can also be coupled to the latching mechanism 760. In some examples, the exterior handle 756 includes an arcuate handle shaft, shown as handle shaft 770, extending away from a front portion of the door panel 802. The handle shaft 770 can include a grip 772 formed on a distal end of the handle shaft 770, away from the coupling formed between the handle shaft 770 and the latching mechanism 760. Rotation of the exterior handle 756 relative to the driver cab door 800 can similarly cause rotation of the latching mechanism 760, which again releases and decouples the locking latch 768 of the door locking assembly 1200 and releases the door panel 802. Once decoupled from the door locking assembly 1200, the driver cab door 800 can be slid rearward toward the second, open position about the first guide rail 702 and the second guide rail 704. The first handle assembly 750 is positioned forward along the door panel 802 so that the first handle assembly 750 is positioned forward of the side cargo door 1000 when the side cargo door 1000 is in its open, fourth position.

The second handle assembly 752 is coupled to the side cargo door 1000. As shown in FIGS. 30 and 31, the second handle assembly 752 is positioned proximate the rear edge of the side cargo door 1000 and is vertically (i.e., upwardly) offset from the first handle assembly 750. As shown in FIG. 33, a latching mechanism 774 mounted to the inside of the C-pillar 116 selectively couples with the second handle assembly 752 to restrict forward movement of the side cargo door 1000 from the third, closed position to the fourth, open position. When unlocked, rotating an external lever 776 of the second handle assembly 752 decouples the second handle assembly 752 from the latching mechanism 774 so that the side cargo door 1000 can slide forward, about the first guide rail 702 and the second guide rail 704.

The components and structure of the side door assembly 700 allows the side door assembly 700 to be installed onto the body 100 of the delivery vehicle 10 in a much faster and easier way than traditional door assemblies. With reference now to FIGS. 39-48, a rapid assembly process is described in detail.

During an initial step in the build of the delivery vehicle 10 shown in FIG. 39, the first guide rail 702 and the second guide rail 704 are installed. As explained above, the first guide rail 702 extends above and across each of the right cab opening 204 and the side cargo opening 404. The first guide rail 702 is mounted to (e.g., fastened, welded, glued, etc.) the body 100 so that the first guide rail 702 extends from the A-pillar 112, across the B-pillar 114, and to the C-pillar 116 on the right side 18 of the body 100. The second guide rail 704 is installed in a similar manner. The second guide rail 704 extends below and across each of the right cab opening 204 and the side cargo opening 404, and spans the distance from the A-pillar 112, across the B-pillar 114, and to the C-pillar 116. The second guide rail 704 can be mounted to the steps 708, 710 and the B-pillar 114 using several fasteners 706. In some examples, the second guide rail 704 can act as an intermediate or lower step that allows a driver or worker to step on the second guide rail 704 prior to climbing onto either of the steps 708, 710 or into the cargo compartment 402 and/or the driver compartment 202. As detailed in FIG. 39, when the first guide rail 702 is initially installed, each of the first (and inner) track 712 and the second (and outer) track 714 may extend along only a portion of the length of the first guide rail 702.

Figure 40:
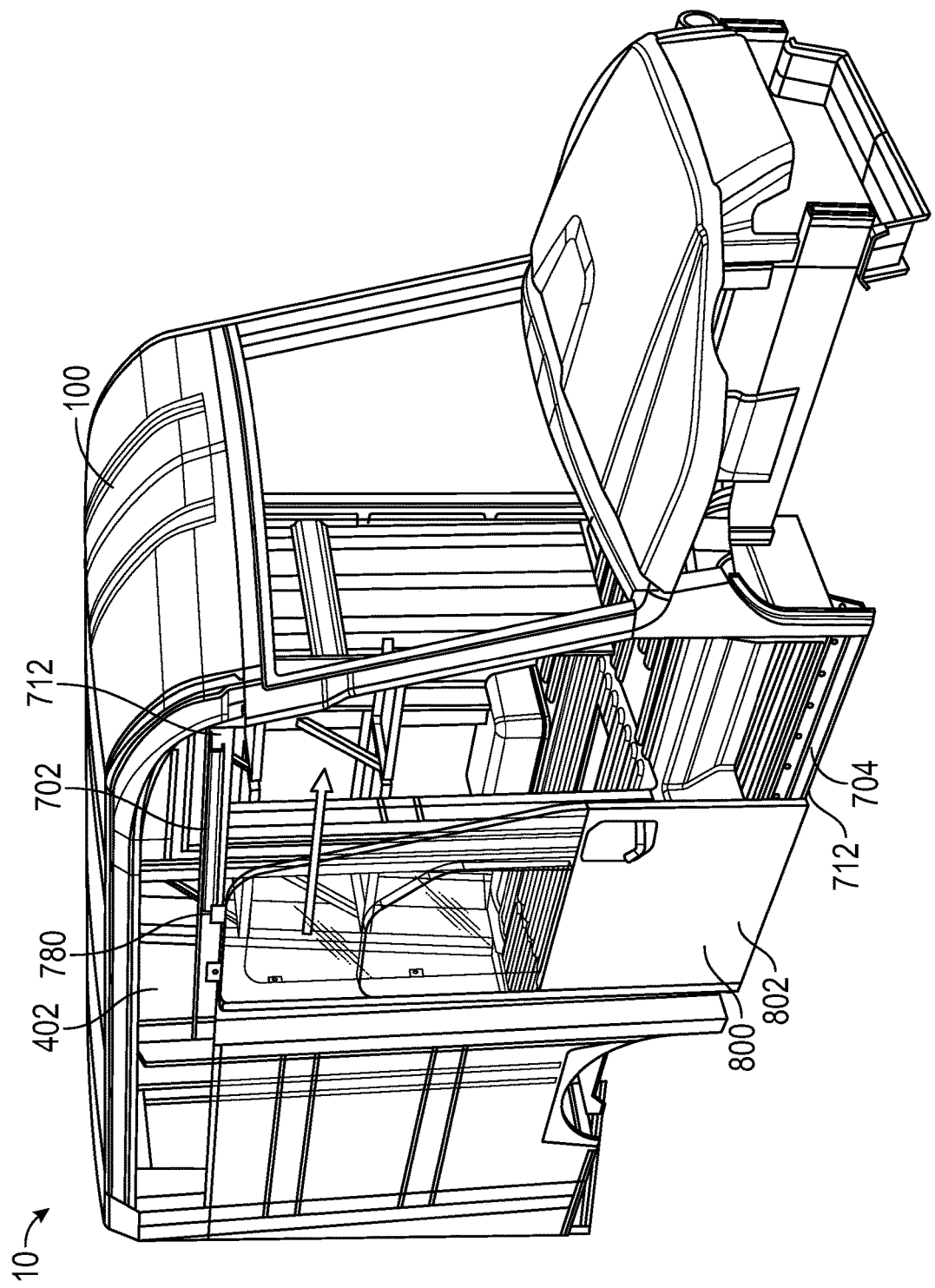
FIG. 40 is a front perspective view of the delivery vehicle of FIG. 30, detailing a front door installation step in the installation process to couple the front door of the side door assembly of FIG. 31 to the delivery vehicle, according to an exemplary embodiment.

After the guide rails 702, 704 have been installed onto the body 100, the driver cab door 800 can be installed onto the first tracks 712 of the first guide rail 702 and the second guide rail 704, as shown in FIG. 40. The driver cab door 800 is initially loaded onto the guide rails 702, 704 near the side cargo opening 404. Because the first and second tracks 712, 714 do not yet extend the entirety of the guide rails 702, 704, the upper portion of the driver cab door 800 can be raised above first guide rail 702 initially during install. The driver cab door 800 can extend into the cargo compartment 402, which allows an assembler to position the bottom of the door panel 802 within the first track 712 of the second guide rail 704. With the lower roller assembly 780 of the door panel 802 received within the first track 712 of the second guide rail 704, the driver cab door 800 can be slid forward. As the driver cab door 800 slides forward along the guide rails 702, 704, the upper roller assembly 780 of the door panel 802 enters and begins to travel within the shortened first track 712 of the first guide rail 702. The driver cab door 800 can be pushed forward, to the first, closed position.

Figure 42:
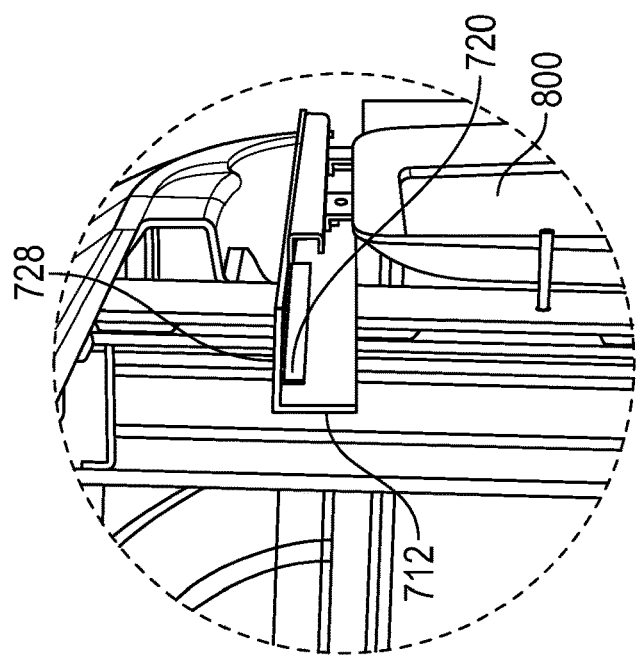
FIG. 42 is a detailed view of the guide rail extension step taken from FIG. 41, according to an exemplary embodiment.
Figure 41:
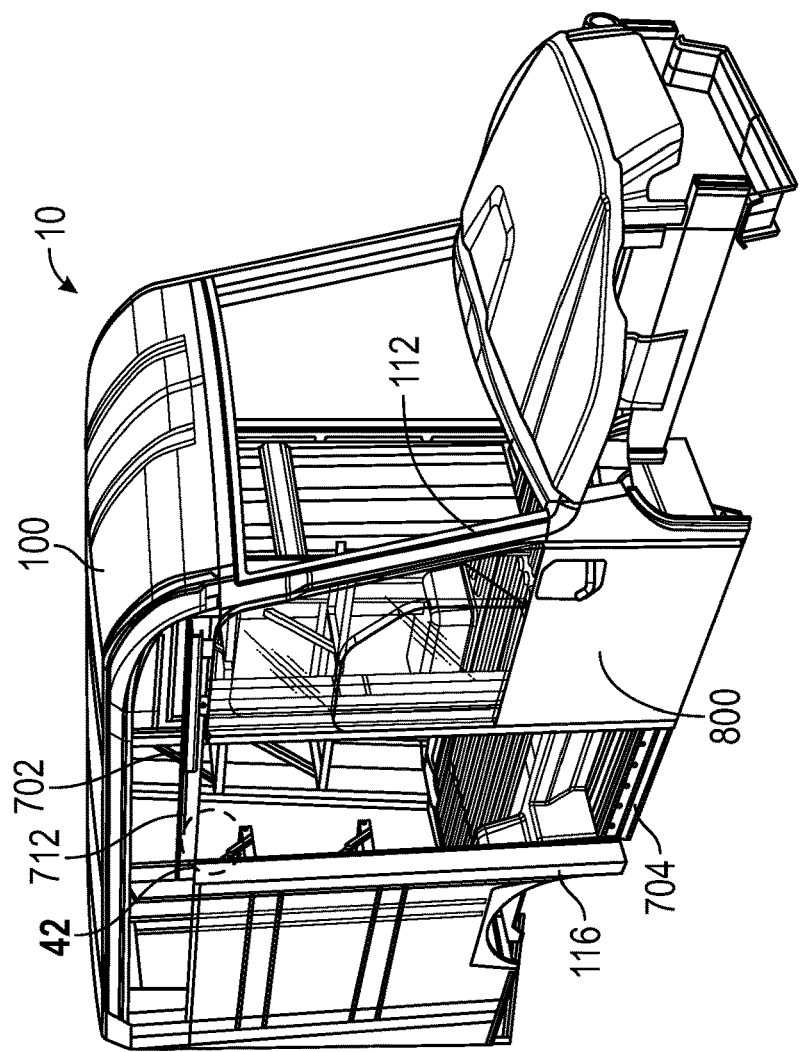
FIG. 41 is a front perspective view of the delivery vehicle of FIG. 30, detailing a partial guide rail extension step in the installation process to couple the side door assembly of FIG. 31 to the delivery vehicle, according to an exemplary embodiment.

With the driver cab door 800 installed and moved to the first, closed position, the remaining pieces of the first track 712 can be installed into the first guide rail 702. As depicted in FIGS. 41 and 42, the remaining pieces of the first track 712 may be the support partition 720 and the first angled member 722 (seen in FIG. 34). In some examples, the mounting flange 728 of the support partition 720 is used to mount each of the support partition 720 and first angled member 722 to the first guide rail 702 and to the body 100, generally. With the support partition 720 and the first angled member 722 installed onto the first guide rail 702, the first track 712 is complete, thereby allowing full sliding motion of the driver cab door 800 between the fully open and fully closed positions.

Figure 43:
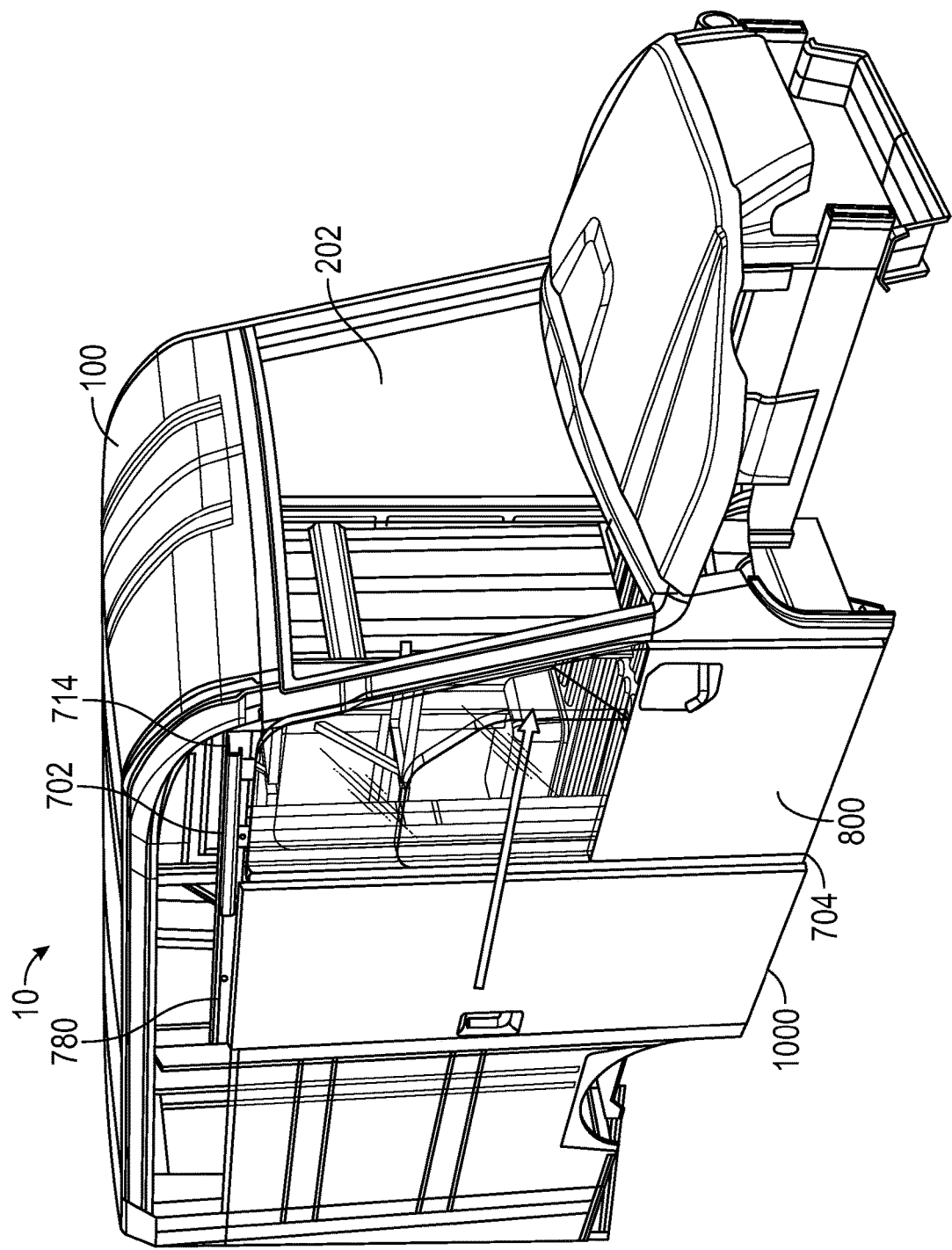
FIG. 43 is a front perspective view of the delivery vehicle of FIG. 30, detailing a rear door installation step in the installation process to couple the rear door of the side door assembly of FIG. 31 to the delivery vehicle, according to an exemplary embodiment.

Once the first track 712 has been fully assembled on the first guide rail 702, the side cargo door 1000 can be installed, as depicted in FIG. 43. Like the installation of the driver cab door 800, the side cargo door 1000 is initially loaded onto the guide rails 702, 704 near the side cargo opening 404. Because the second track 714 does not yet extend the entirety of the guide rails 702, 704, the upper portion of the side cargo door 1000 can be raised above first guide rail 702 initially during install. The side cargo door 1000 can extend into the cargo compartment 402, which allows an assembler to position the bottom of the door panel 1002 within the second track 714 of the second guide rail 704. With the lower roller assembly 780 of the door panel 1002 received within the second track 714 of the second guide rail 704, the side cargo door 1000 can be slid forward. As the side cargo door 1000 slides forward along the guide rails 702, 704, the upper roller assembly 780 of the door panel 1002 enters and begins to travel within the shortened second track 714 of the first guide rail 702, and overlaps the driver cab door 800.

Figure 44:
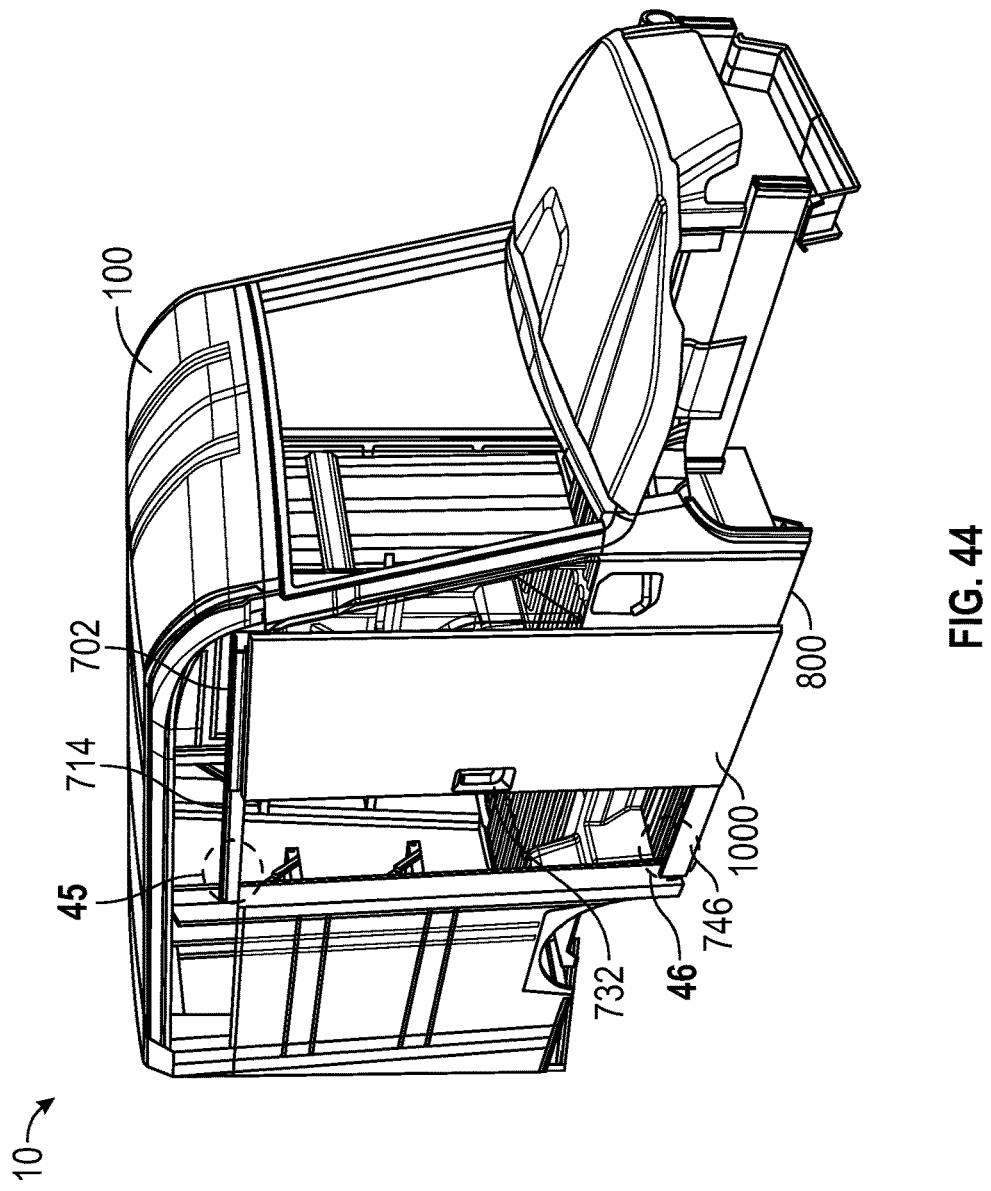
FIG. 44 is a front perspective view of the delivery vehicle of FIG. 30, detailing a second partial guide rail extension step in the installation process to couple the side door assembly of FIG. 31 to the delivery vehicle, according to an exemplary embodiment.

The side cargo door 1000 is then slid forward within the second tracks 714 until it reaches the stop at the open, fourth position, shown in FIG. 44. As indicated above, the side cargo door 1000 can include a releasable catch mechanism that is mounted to one of the driver cab door 800 or the B-pillar 114 to prevent the side cargo door 1000 from transitioning away from the fourth, fully open position unless actuated (e.g., by the second handle assembly 752, explained above).

Figure 45:
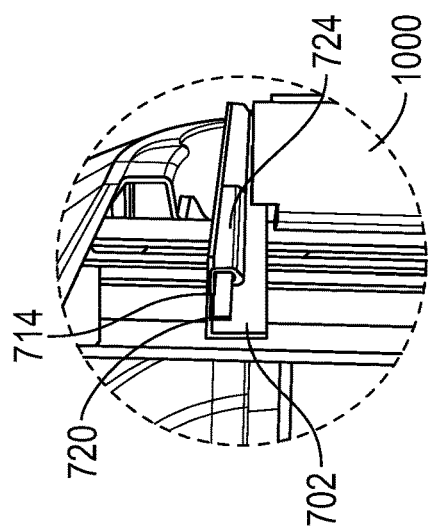
FIG. 45 is a detailed view of the second partial guide rail extension step taken from FIG. 44, according to an exemplary embodiment.
Figure 46:
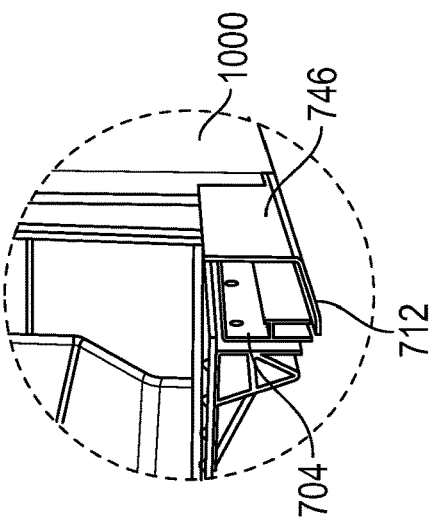
FIG. 46 is a detailed view of a lower guide rail extension step taken from FIG. 44, according to an exemplary embodiment.

With the side cargo door 1000 secured in the fourth, open position, the remaining portions of the second track 714 can be installed onto each of the guide rails 702, 704. As depicted in FIGS. 44-46, additional guiding components can be secured to the guide rails 702, 704. For example, the second angled member 724 can be coupled to the support partition 720 or directly to the first guide rail 702 to extend the second track 714 along a full length of the first guide rail 702. With the second angled member 724 installed, the top roller assembly 780 of the side cargo door 1000 can move the side cargo door 1000 between the fully-open, fourth position and the fully-closed, third position within the second track 714. As shown in FIG. 46, a spacer plate 746 can be installed along the rear section of the second guide rail 704. The spacer plate 746 can extend across a portion of the second guide rail 704 to protect the second guide rail 704 from being inadvertently stepped on or damaged. In some examples, the spacer plate 746 shields the lower roller assembly 780 of the driver cab door 800 and separates the two tracks 712, 714 of the second guide rail 704. With the spacer plate 746 and the second angled member 724 installed, the side cargo door 1000 can be slid rearward to the third, closed position shown in FIG. 47. To release the side cargo door 1000 from the fully open position, a user can actuate the second handle assembly 752.

Figure 47:
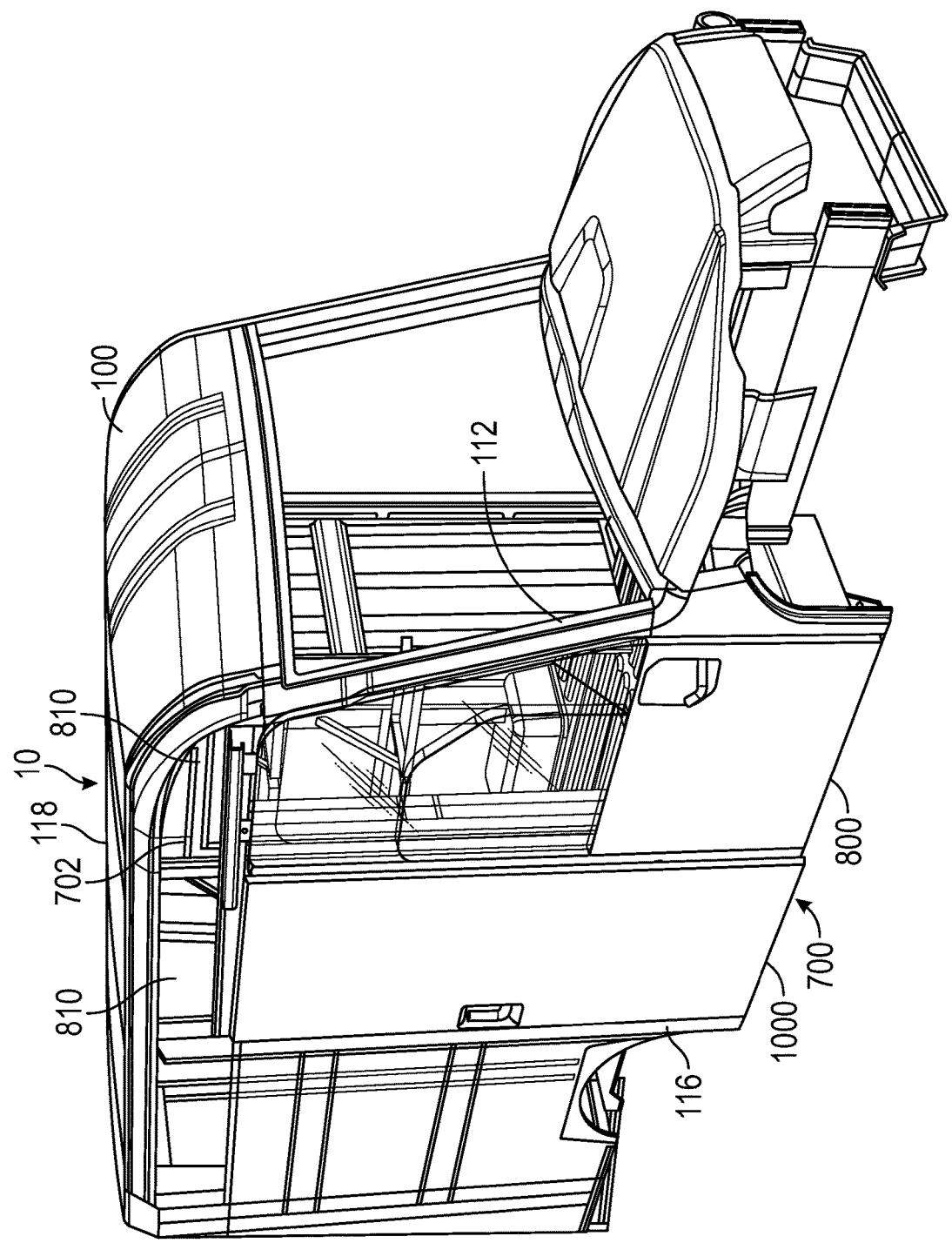
FIG. 47 is a front perspective view of the delivery vehicle of FIG. 30, detailing a rear door movement step in the installation process to couple the side door assembly of FIG. 31 to the delivery vehicle, according to an exemplary embodiment.
Figure 48:
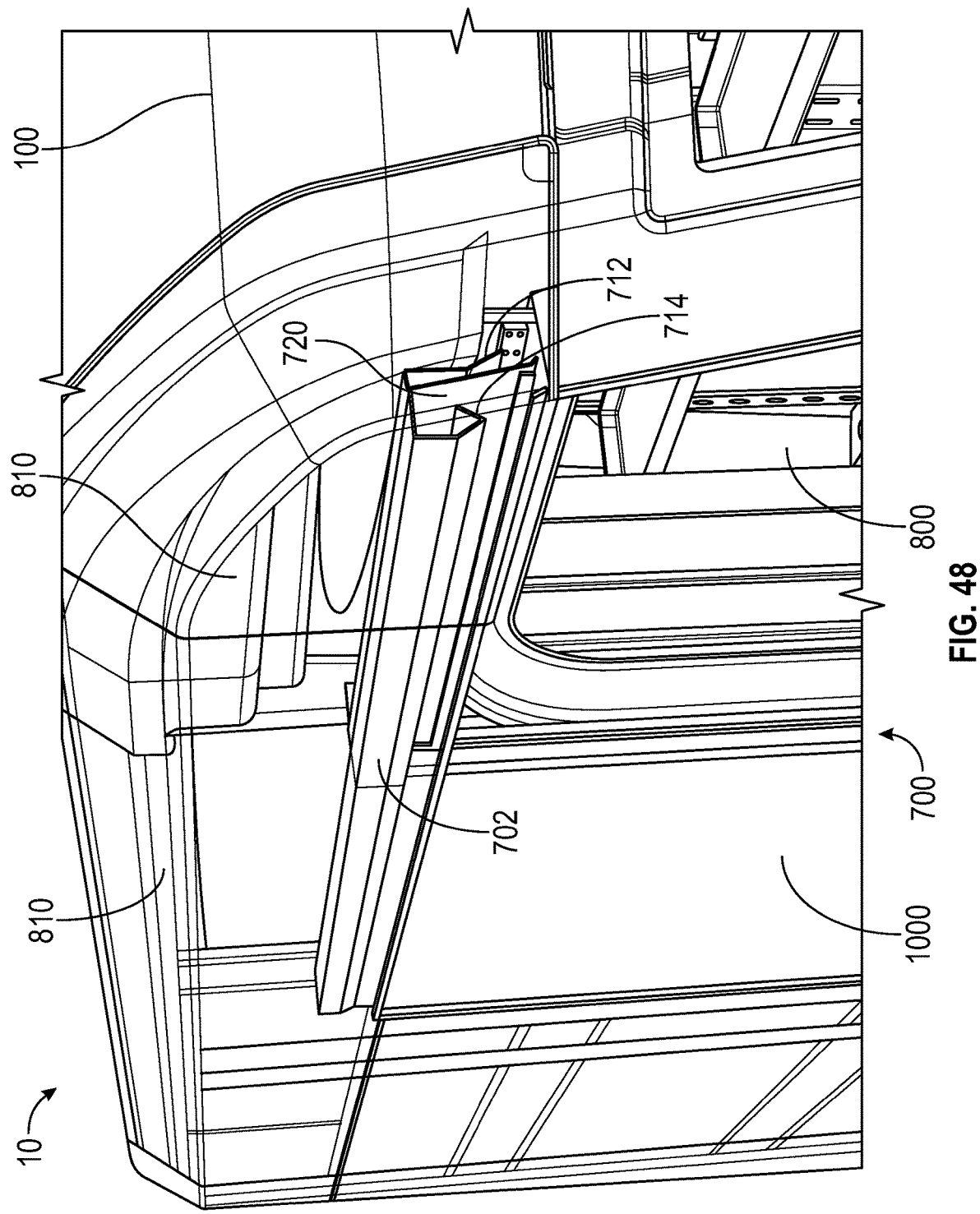
FIG. 48 is a front perspective view of the delivery vehicle of FIG. 30, detailing a guard plate coupling step in the installation process to couple a guard plate of the side door assembly of FIG. 31 to the delivery vehicle, according to an exemplary embodiment.
Figure 49:
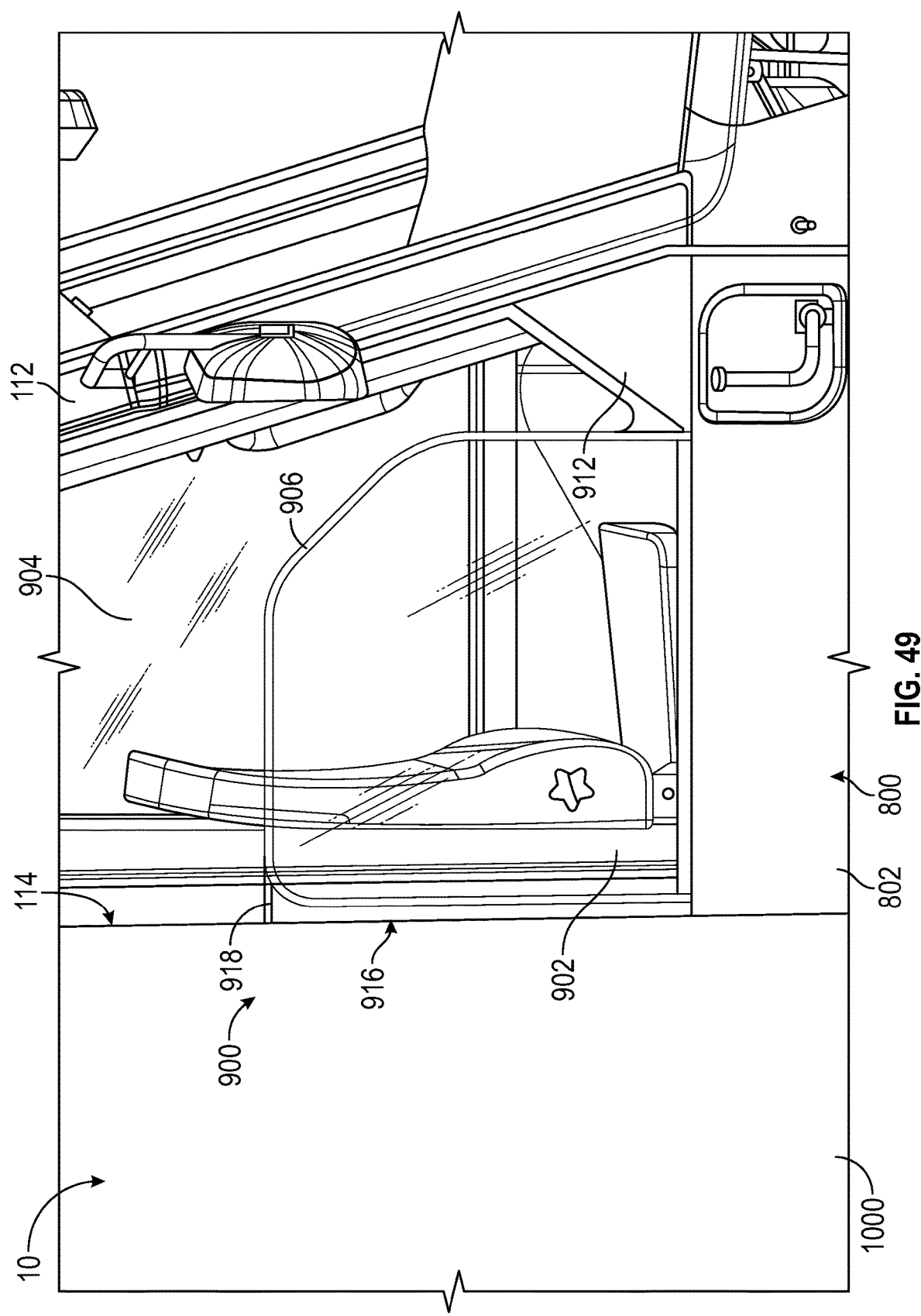
FIG. 49 is a side view of a window assembly of the delivery vehicle of FIG. 1, according to an exemplary embodiment.
Figure 50:
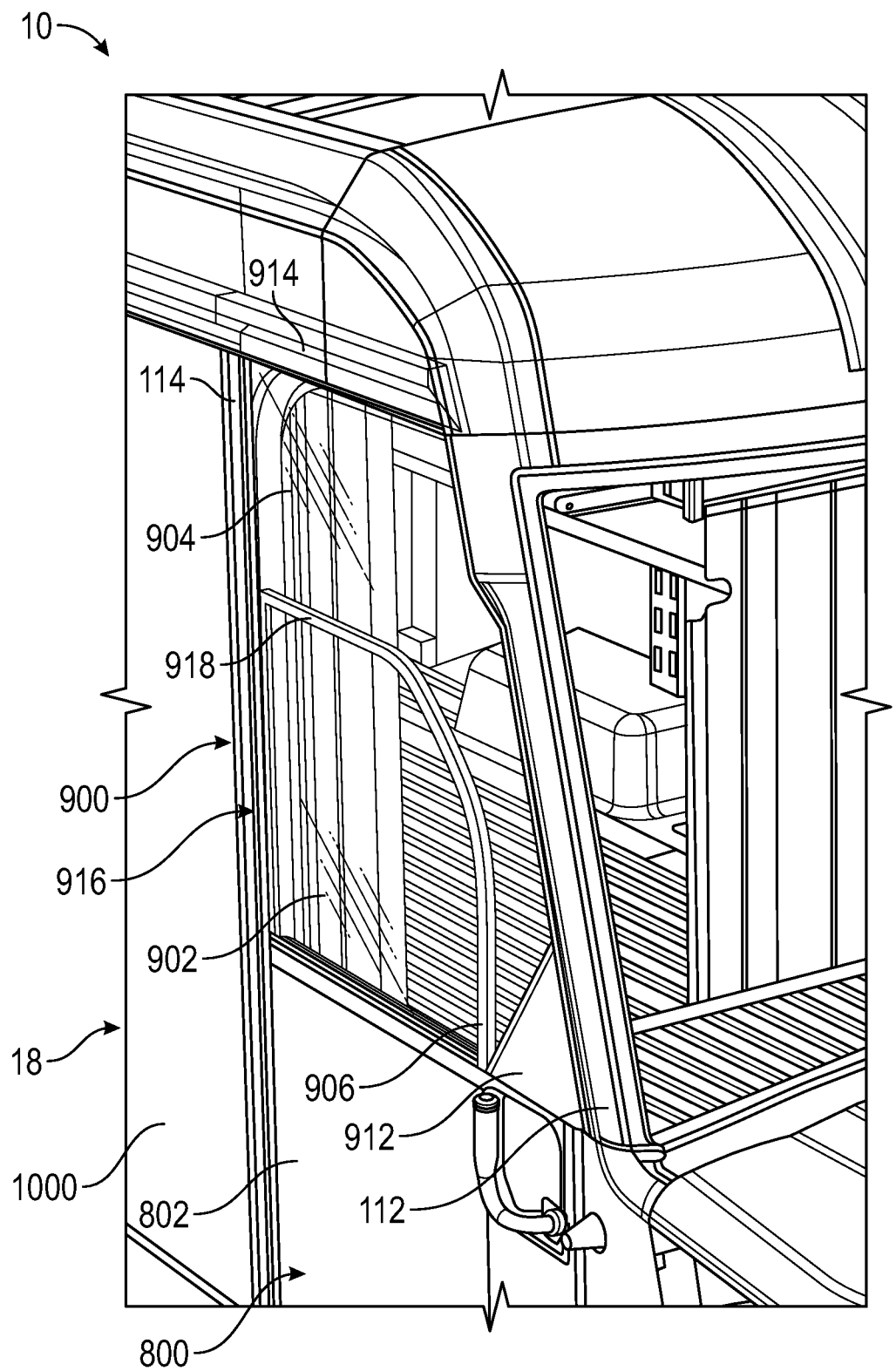
FIG. 50 is a perspective view of the window assembly of FIG. 49, according to an exemplary embodiment.

Finally, with each of the driver cab door 800 and the side cargo door 1000 installed, guide rail covers 810 can be secured to the body 100. As shown in FIGS. 47 and 48, the guide rail covers 810 extend above the first guide rail 702 and overhang at least a portion of the driver cab door 800 and the side cargo door 1000. The guide rail covers 810 can help provide additional sealing and further restrict the travel of unwanted liquids or contaminants into the cargo compartment 402 or the driver compartment 202. In some examples, the guide rail covers 810 are curved or flat panels that are bolted or otherwise secured to one or more of the A-pillar 112, B-pillar 114, or C-pillar 116. In some examples, the guide rail covers 810 can extend to and be coupled with a roof 118 of the body 100.

Using the above-described delivery vehicle 10 and the side door assembly 700, various advantages over conventional delivery vehicles are achieved. The sliding nature of the side door assembly 700 increases the clearance relative to the right cab opening 204 and the side cargo opening 404, and maximizes the available space for moving into and out of the driver compartments 202 and the cargo compartment 402 of the delivery vehicle 10. The overlapping design of the side door assembly 700 restricts and helps to avoid operating the delivery vehicle 10 with the side cargo door 1000 ajar, since the driver will be largely obstructed from traveling into the driver compartment 202 when the side cargo door 1000 is open. As explained above, the side door assembly 700 is much easier to install into the delivery vehicle 10 than other conventional door mechanisms.

Window Assembly

Referring particularly to FIGS. 49-57, the window assembly 900 is shown in greater detail, according to an exemplary embodiment. The window assembly 900 can be positioned or configured for a driver's side or a passenger side of the delivery vehicle 10 (e.g., the right side 18 of the delivery vehicle 10 or the left side 20 of the delivery vehicle 10), or both. While the window assembly 900 is positioned on the right side 18 of the delivery vehicle 10 in the exemplary embodiment shown in FIGS. 49-57, it should be understood that the window assembly 900 may be symmetrically positioned on an opposite side of the delivery vehicle 10 (e.g., on the left side 20 of the delivery vehicle 10) or on both the left side 20 and the right side 18 of the delivery vehicle 10.

The window assembly 900 includes a first window, a first portion, a translatable window, etc., shown as movable window 902, and a second window, a second portion, a stationary window, etc., shown as fixed window 904. The movable window 902 can be configured to roll, translate, rotate, pivot, etc., or otherwise move relative to the fixed window 904. The movable window 902 and the fixed window 904 can be manufactured from a same or similar material (e.g., glass, plexi-glass, plastic, etc.) that at least partially allows light to transfer through. For example, the movable window 902 and/or the fixed window 904 can be transparent, translucent, opaque, etc. In some embodiments, one or both of the movable window 902 and the fixed window 904 are tinted on an exterior surface so that the operator can view exterior landscape, objects, environment, etc., through the movable window 902 and/or the fixed window 904 but prevent, limit, or otherwise obscure a view of the operator or interior of the cab 200 from outside the cab 200.

As shown in FIGS. 49-53 and 57, the movable window 902 and the fixed window 904 are coupled with the door panel 802. The fixed window 904 is fixedly coupled (e.g., mounted, secured, fastened, sealed, etc.) with the door panel 802 such that the fixed window 904 does not translate, rotate, or pivot relative to the door panel 802. The movable window 902 is translatably coupled with the door panel 802 (e.g., along one or more tracks, through an inner volume of the door panel 802, etc.) so that the movable window 902 can translate relative to the door panel 802 and the fixed window 904. The movable window 902 may be transitionable between a first position (e.g., a closed position as shown in FIGS. 49-53) and a second position (e.g., an open position) or a position partially between the first position and the second position (e.g., a partially open or a partially closed position). When the movable window 902 is in the second position, an aperture or opening is formed so that the operator can access the exterior environment (e.g., to deliver packages, mail, etc.). When the movable window 902 is in the first position, access to the external environment or area surrounding the delivery vehicle 10 is limited by the movable window 902. The movable window 902 can be transitioned between the first position and the second position by an electric motor (e.g., a window motor) or a crank mechanism that is driven by the operator or a user.

As shown in FIGS. 49-54, the fixed window 904 is fixedly coupled along a forwards or front edge with one of the A-pillars 112. The fixed window 904 can also be fixedly coupled along a corresponding edge of the driver cab door 800 with a panel 912 that is positioned proximate the A-pillar 112 (e.g., when the driver cab door 800 is closed). The fixed window 904 fixedly couples along a rear or opposite edge of the driver cab door 800 proximate the B-pillar 114 (e.g., when the driver cab door 800 is closed). The fixed window 904 is fixedly coupled along an upper edge with an upper frame member 914. In this way, the fixed window 904 extends between the A-pillar 112, the B-pillar 114, and the upper frame member 914 (e.g., when the driver cab door 800 is closed). The fixed window 904 may seal along at least a portion of its perimeter through seal 910.

The fixed window 904 defines an aperture, an opening, a passage, a hole, etc., shown as opening 916. The opening 916 can have a shape corresponding to a shape of the movable window 902. The opening 916 is defined by an interior edge 918 of the fixed window 904 that extends from the rear edge of the driver cab door 800 to the panel 912 or the door panel 802 proximate the front end of the driver cab door 800.

The movable window 902 and the fixed window 904 are sealingly coupled with each other (e.g., when the movable window 902 is in the first position) through a rail, an annular member, a rim member, a division bar, etc., shown as seal 906. The seal 906 extends along the interior edge 918 of the fixed window 904 between the rear end of the driver cab door 800 and the panel 912 or the door panel 802. The movable window 902 may seal with the fixed window 904 through the seal 906 when the movable window 902 is in the first position. The seal 906 can be fixedly coupled with the fixed window 904 so that the movable window 902 translates into and out of engagement with the seal 906.

Figure 51:
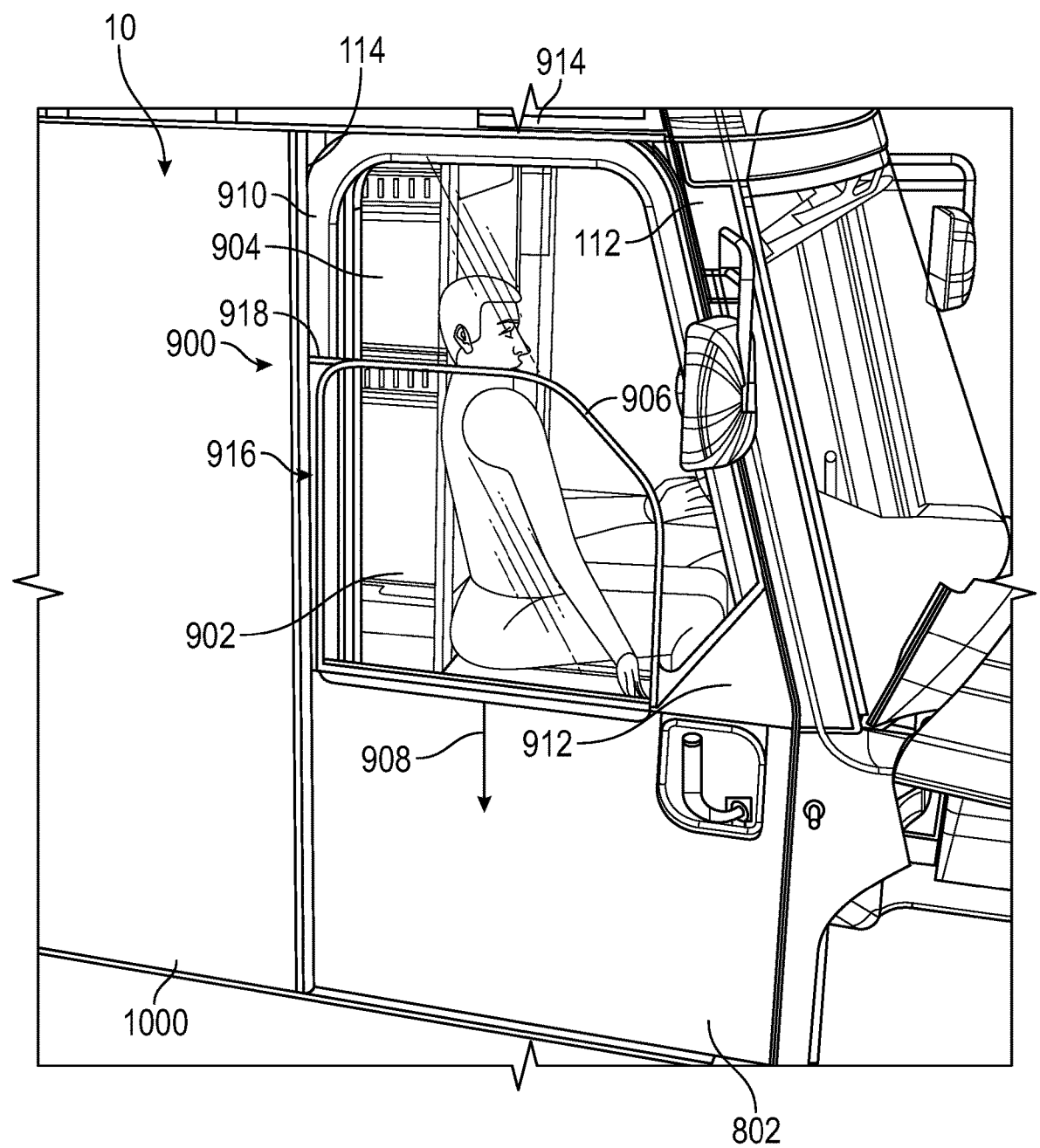
FIG. 51 is a perspective view of the window assembly of FIG. 49, showing a movable window translatable in a direction, according to an exemplary embodiment.
Figure 52:
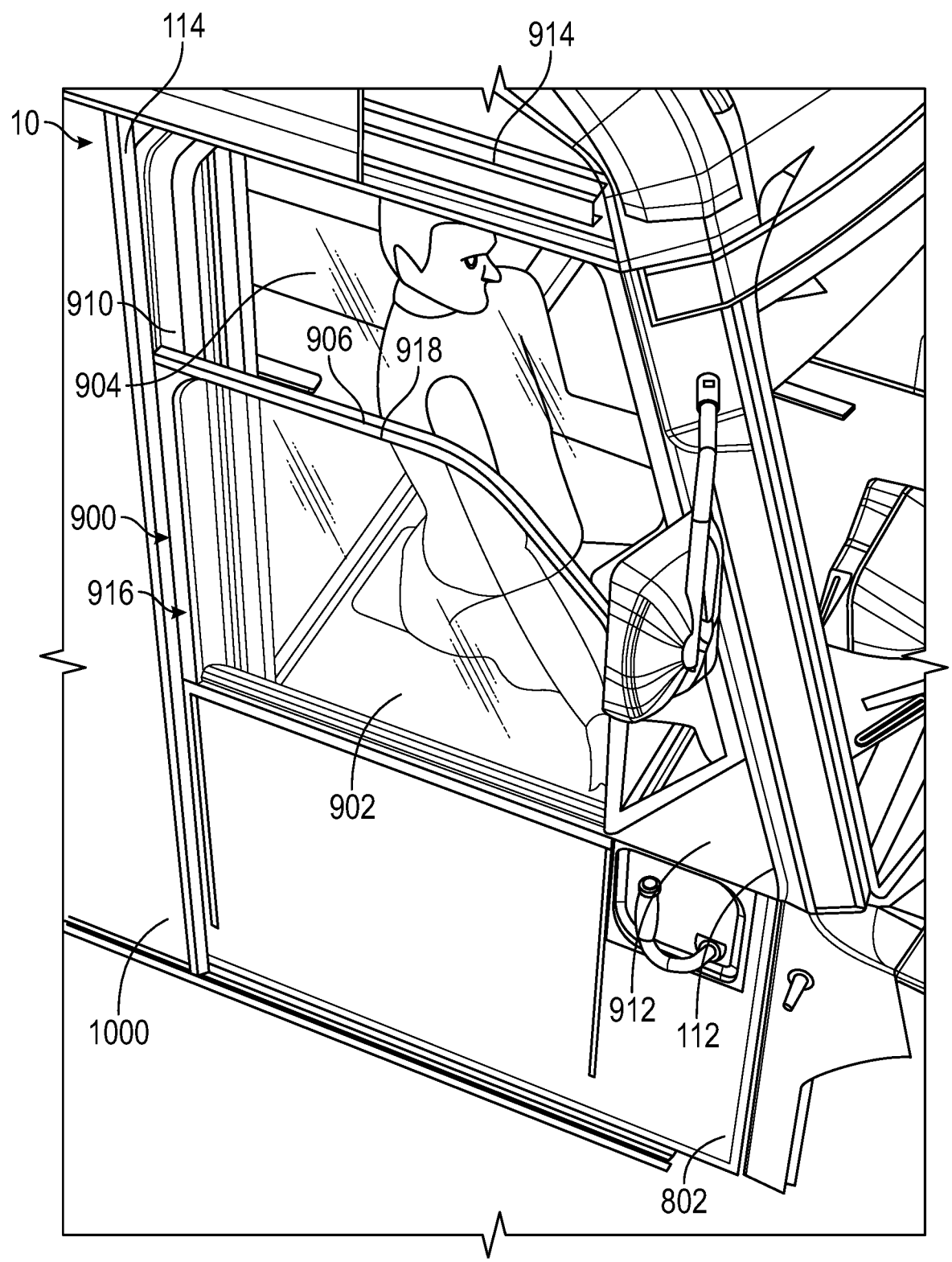
FIG. 52 is a perspective view of the window assembly of FIG. 49, according to an exemplary embodiment.
Figure 53:
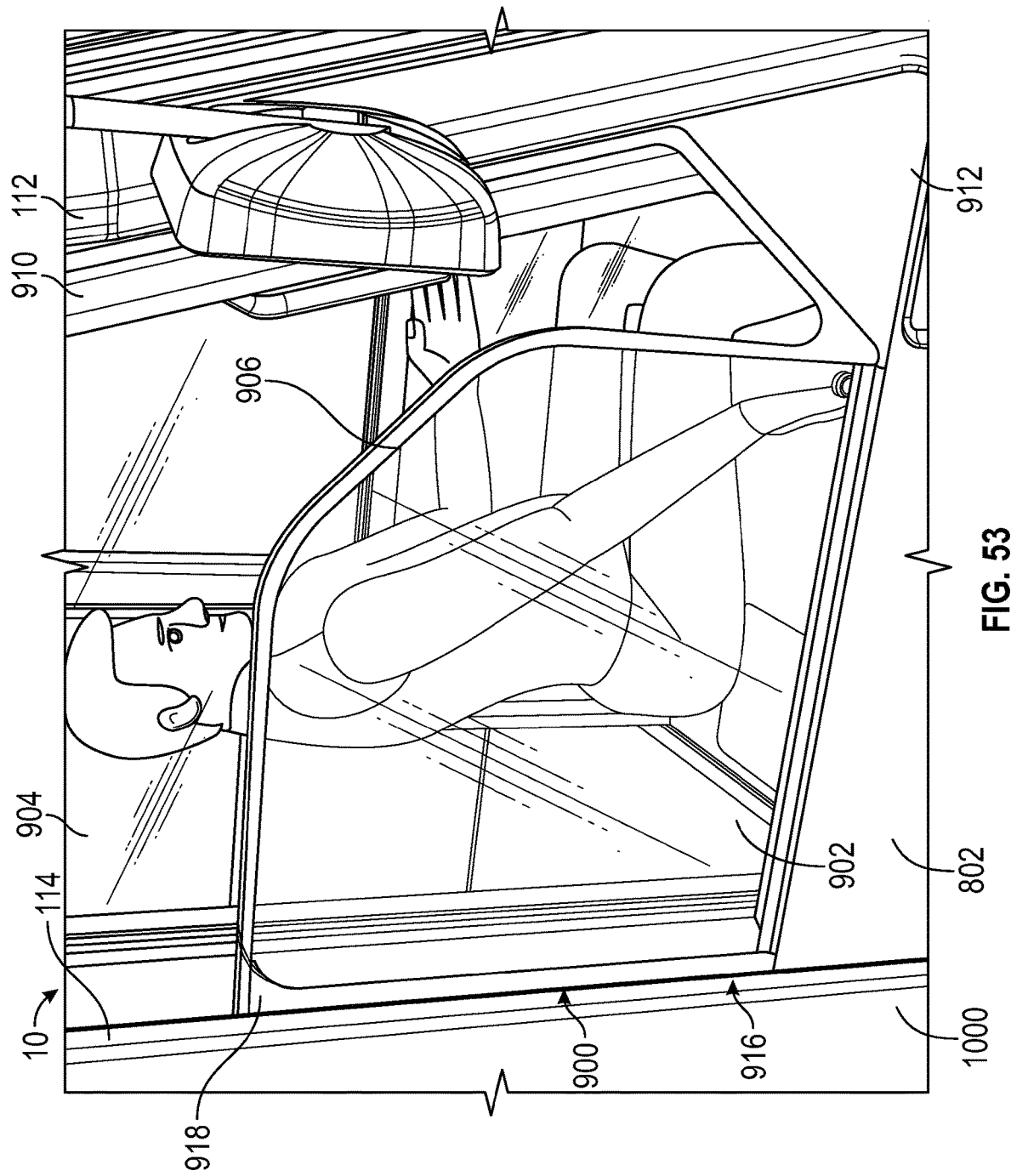
FIG. 53 is a perspective view of the window assembly of FIG. 49 including a seal positioned between a movable window and a fixed window of the window assembly, according to an exemplary embodiment.

As shown in FIG. 51, the movable window 902 may transition out of the first position (as shown in FIG. 51) to the second position by translating in a direction 908 relative to fixed window 904. The direction 908 may be a substantially downwards direction so that the movable window 902 translates into the door panel 802. The door panel 802 can receive the movable window 902 as the movable window 902 translates into the second position. When the movable window 902 moves in the direction 908, the movable window 902 translates out of engagement with the seal 906.

Figure 54:
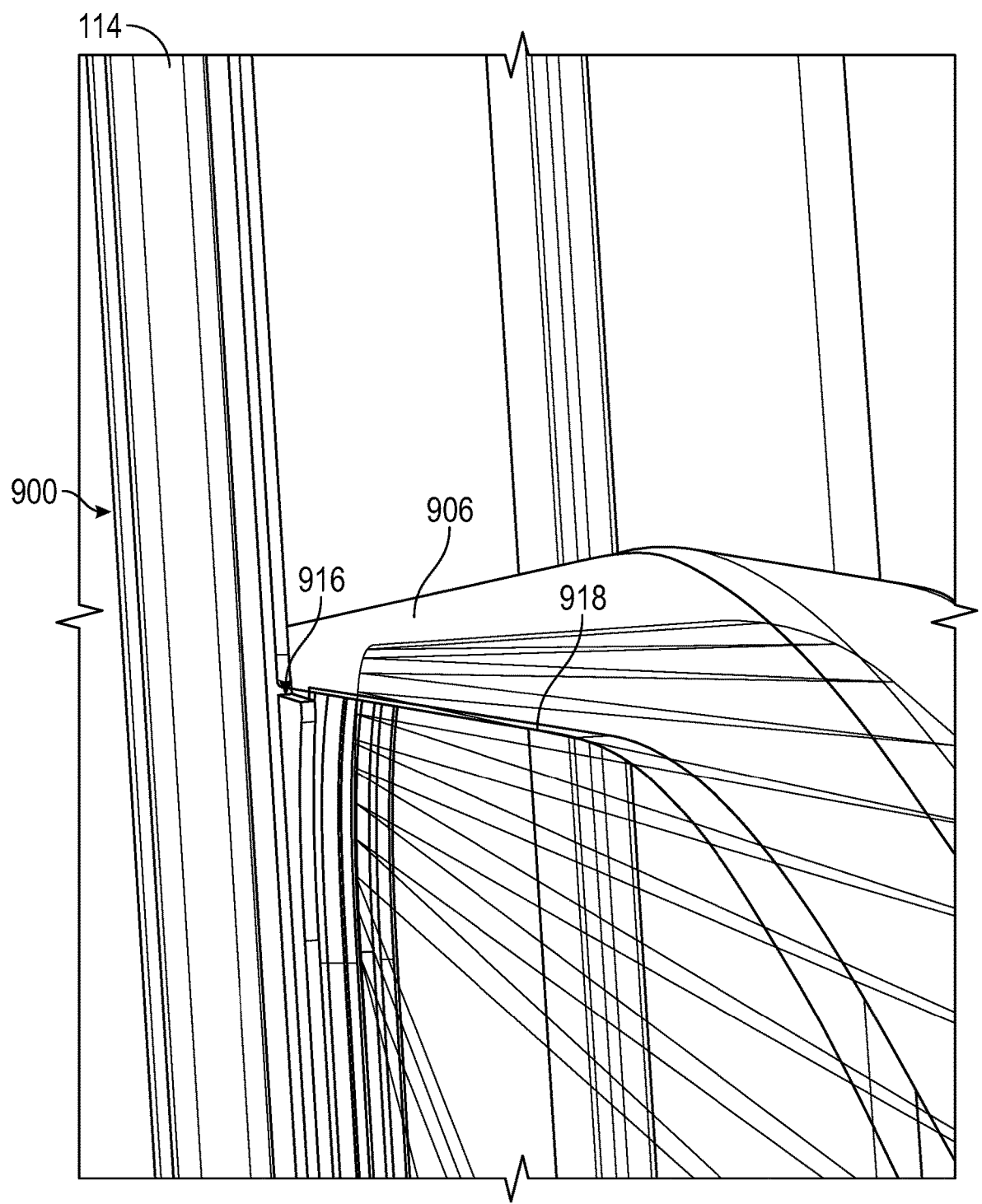
FIG. 54 is a detailed perspective view of the seal of FIG. 53, according to an exemplary embodiment.
Figure 55:
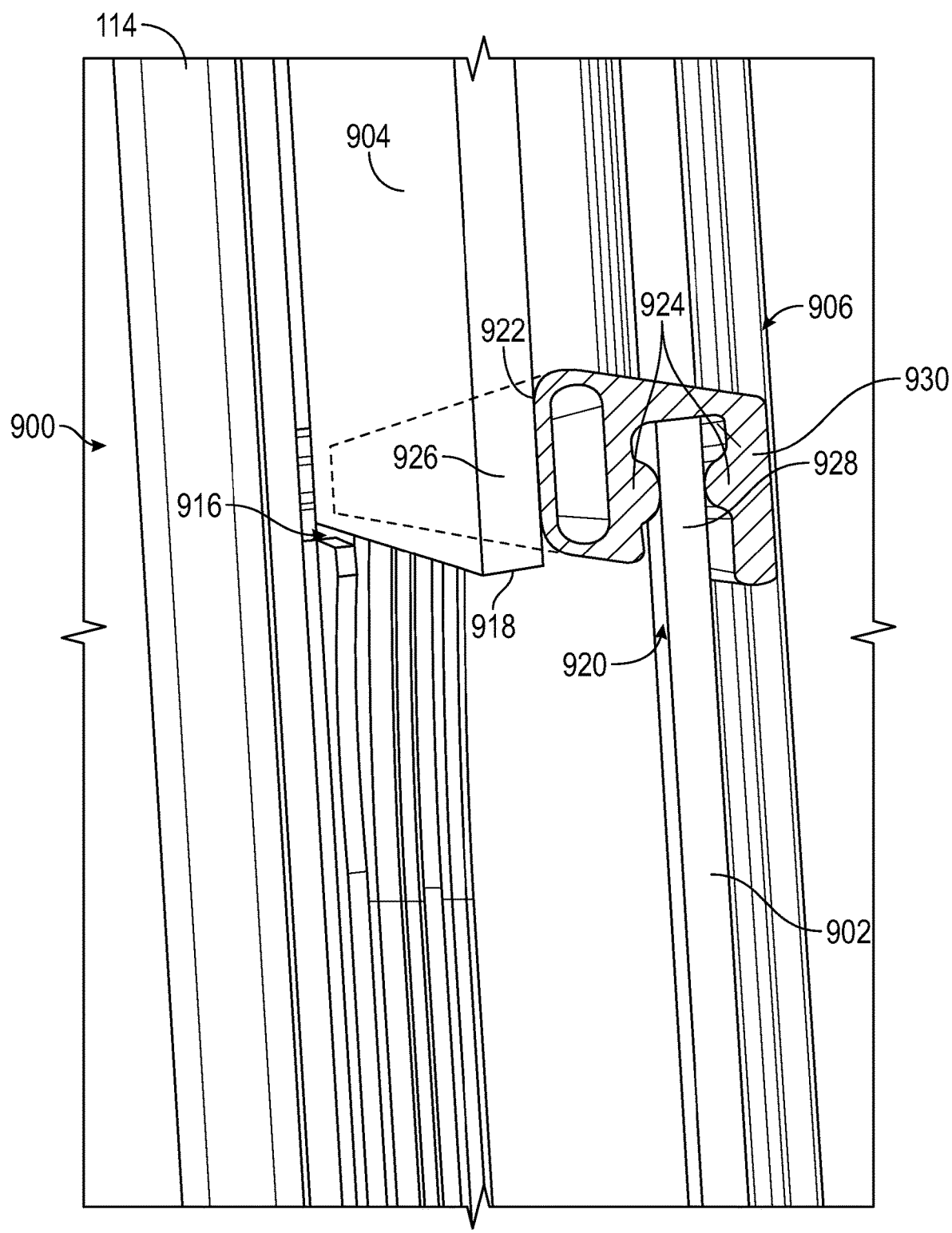
FIG. 55 is a detailed perspective cross-sectional view of the seal of FIG. 53, according to an exemplary embodiment.
Figure 56:
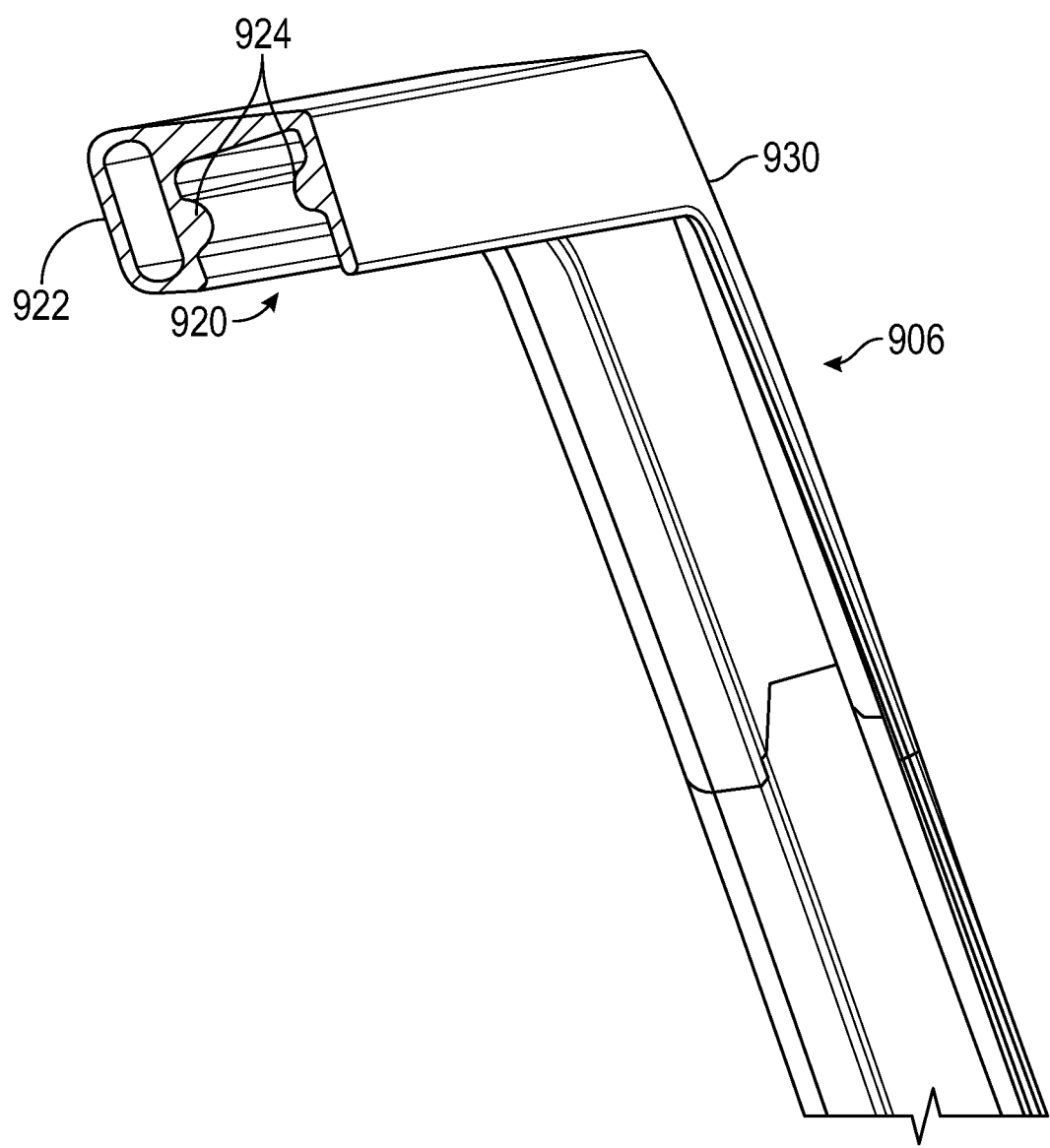
FIG. 56 is a perspective cross-sectional view of the seal of FIG. 53, according to an exemplary embodiment.

Referring particularly to FIGS. 54-56, the seal 906 is shown in greater detail, according to an exemplary embodiment. The seal 906 includes a body 930. The body 930 of the seal 906 defines a groove, a channel, a recess, a track, etc., shown as interior channel 920. The interior channel 920 is configured to receive a corresponding portion, edge, area, etc., of the movable window 902 as the movable window 902 translates between the first position and the second position. When the movable window 902 translates into the first position, an upper portion 928 of the movable window 902 translates into the interior channel 920 to seal the movable window 902 with the fixed window 904. The body 930 defines one or more sealing members, protrusions, ribs, etc., shown as sealing portions 924. The sealing portions 924 are positioned within the interior channel 920. The sealing portions 924 extend inwards so that when the movable window 902 is translated into the first position, the sealing portions 924 engage opposite surfaces of the upper portion 928 of the movable window 902. The sealing portions 924 engage the opposite surfaces of the upper portion 928 to seal the movable window 902 with the fixed window 904. Advantageously, the movable window 902 is selectably sealable with the fixed window 904 as the movable window 902 translates between the first position and the second position. The sealing portions 924 and the interior channel 920 can extend along substantially an entire length of the body 930.

An exterior surface 922 of the body 930 may sealingly couple with a corresponding portion or surface 926 of the fixed window 904. In some embodiments, an adhesive is applied to one or both of the exterior surface 922 of the body 930 and/or a corresponding interior surface 926 of the fixed window 904.

Figure 57:
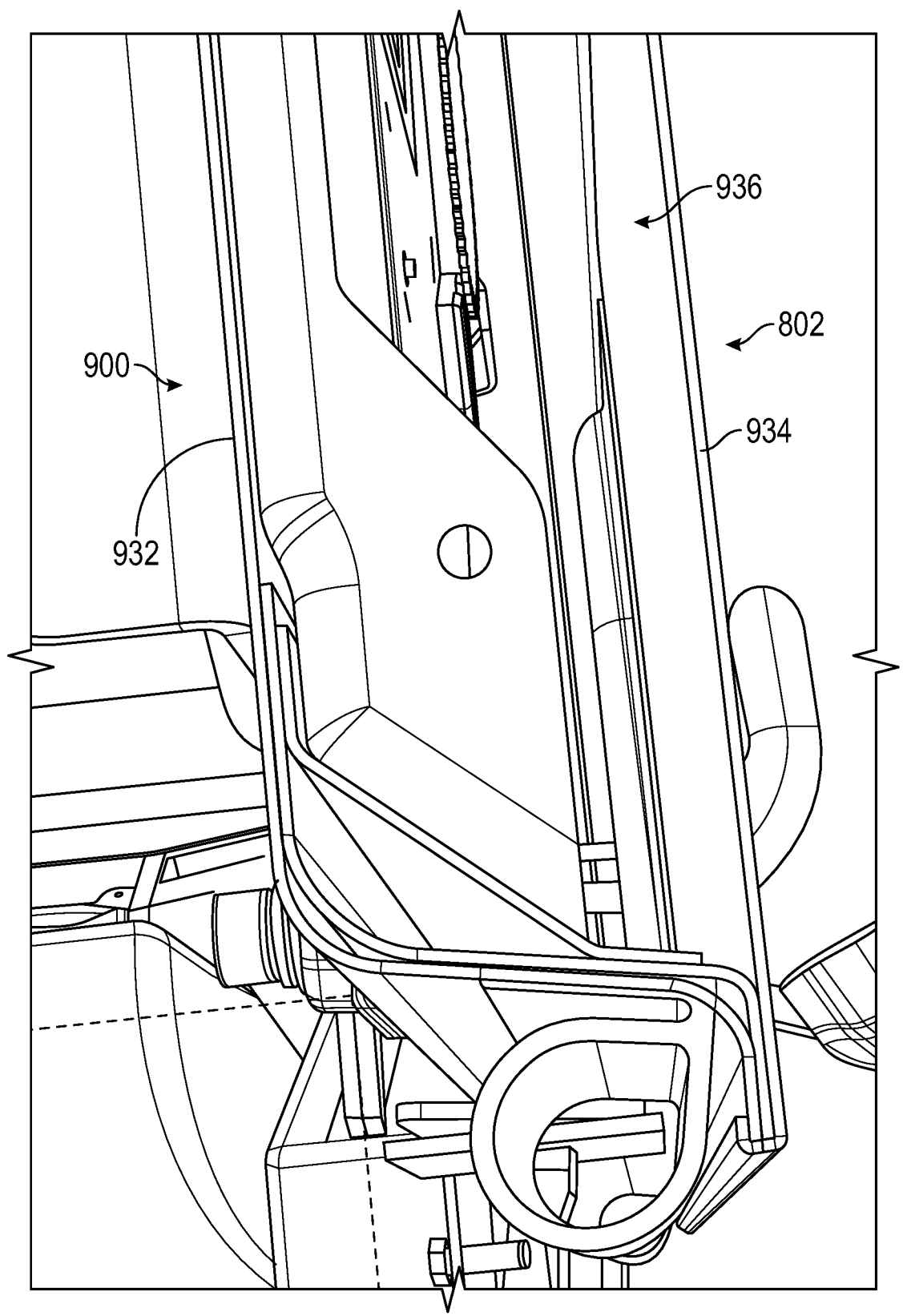
FIG. 57 is a perspective view of a portion of a door panel configured to receive the movable window of the window assembly of FIG. 49, according to an exemplary embodiment.

Referring particularly to FIG. 57, the movable window 902 may be translatable into the second position. When the movable window 902 is translated into the second position relative to the fixed window 904, the movable window 902 translates into an inner volume 936 of the door panel 802. The door panel 802 includes a first member 932 and a second member 934 (e.g., a pair of sidewalls) that are positioned apart from each other and define the inner volume 936. The movable window 902 can translate into the inner volume 936 of the door panel 802 when driven or repositioned into the second position.

Advantageously, the fixed window 904 and the movable window 902 provide a wider field of view for the operator for increased viewing area of areas external to the delivery vehicle 10. In some embodiments, the seal 906 has a less than 3 degree of visibility obstruction (e.g., due to a width of the seal 906). The fixed window 904 and the movable window 902 as shown in FIGS. 49-57 can provide an improved visibility relative to traditional windows (e.g., up to a 135 degrees of visibility or a viewing area of 135 degrees, etc.).

Door Locking Assembly

Referring to FIGS. 7 and 58-62, the door locking assembly 1200 (e.g., a locking cylinder assembly) is shown according to an exemplary embodiment. The door locking assembly 1200 is configured to selectively prevent a door (e.g., the driver cab door 800, the side cargo door 1000, another door of the delivery vehicle 10, etc.) from moving out of the closed position (e.g., toward the open position). Specifically, the door locking assembly 1200 is configured to receive a key or opener, shown as key 1202. One or more keys 1202 may be distributed among one or more authorized users. When the key 1202 is fully inserted into the door locking assembly 1200, the door locking assembly 1200 may be reconfigured between (a) a locked configuration in which the door locking assembly 1200 prevents the corresponding door from moving away from the closed position and (b) an unlocked configuration in which the door locking assembly 1200 permits free movement of the door between the closed position and the open position. Specifically, when the key 1202 is inserted into a key aperture 1204 of the door locking assembly 1200, a portion of the door locking assembly 1200 is configured to rotate between a locked position (e.g., a locked orientation) corresponding to the locked configuration and an unlocked position (e.g., an unlocked orientation) corresponding to the unlocked configuration. The key 1202 moves into the door locking assembly 1200 along and rotates about a longitudinal axis 1206. In some embodiments, the door locking assembly 1200 is generally radially symmetrical about the longitudinal axis 1206.

In some situations, unauthorized users will attempt to access to the interior of the delivery vehicle 10 (e.g., the driver compartment 202 or the cargo compartment 402) without a key 1202. This type of intrusion may take the form of a user applying a force or torque on the door locking assembly 1200 in an attempt to break a component of the door locking assembly 1200 and gain access to the interior of the delivery vehicle 10. By way of example, a user may attempt to insert a torque transmission device, such as a screwdriver, into the key aperture 1204. The user may then attempt to apply a torque to the door locking assembly 1200 until the door locking assembly 1200 fails and moves to the unlocked orientation. By way of another example, a user may attempt to grasp an exterior surface of the door locking assembly 1200 (e.g., using a pair of pliers). The user may then attempt to apply a torque to the door locking assembly 1200 until the door locking assembly 1200 fails and moves to the unlocked orientation. As described in further detail herein, the delivery vehicle 10 includes a series of features that resist these and other methods of unauthorized access to the interior of the delivery vehicle 10.

As shown in FIG. 7, the door locking assembly 1200 is coupled (e.g., directly) to the cab 200 and positioned on the right side of the delivery vehicle 10. The door locking assembly 1200 is positioned forward of the driver cab door 800 and at approximately the same height as the door panel 802. The door locking assembly 1200 is positioned below and approximately in line with the A-pillar 112. The door locking assembly 1200 is positioned below all of the windows of the delivery vehicle 10. In some embodiments, the door locking assembly 1200 is positioned near waist height of a user standing on the ground adjacent the delivery vehicle 10. In other embodiments, the door locking assembly 1200 is otherwise positioned along the body 100. By way of example, the door locking assembly 1200 may be coupled to the driver cab door 800, the side cargo door 1000, or the cargo body 400.

Figure 61:
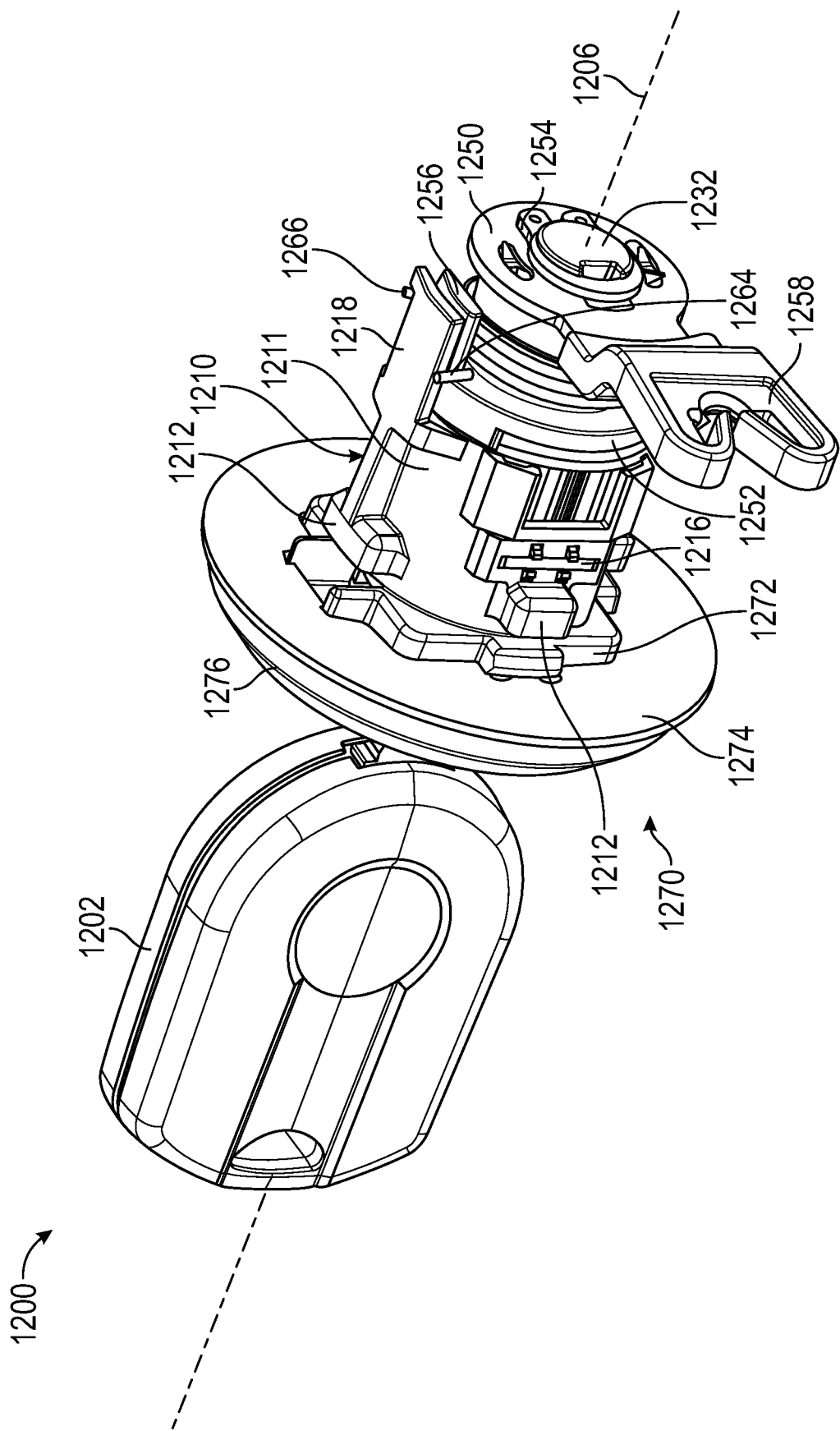
FIGS. 61 and 62 are perspective views of the door locking assembly of FIG. 59, according to an exemplary embodiment.
Figure 62:
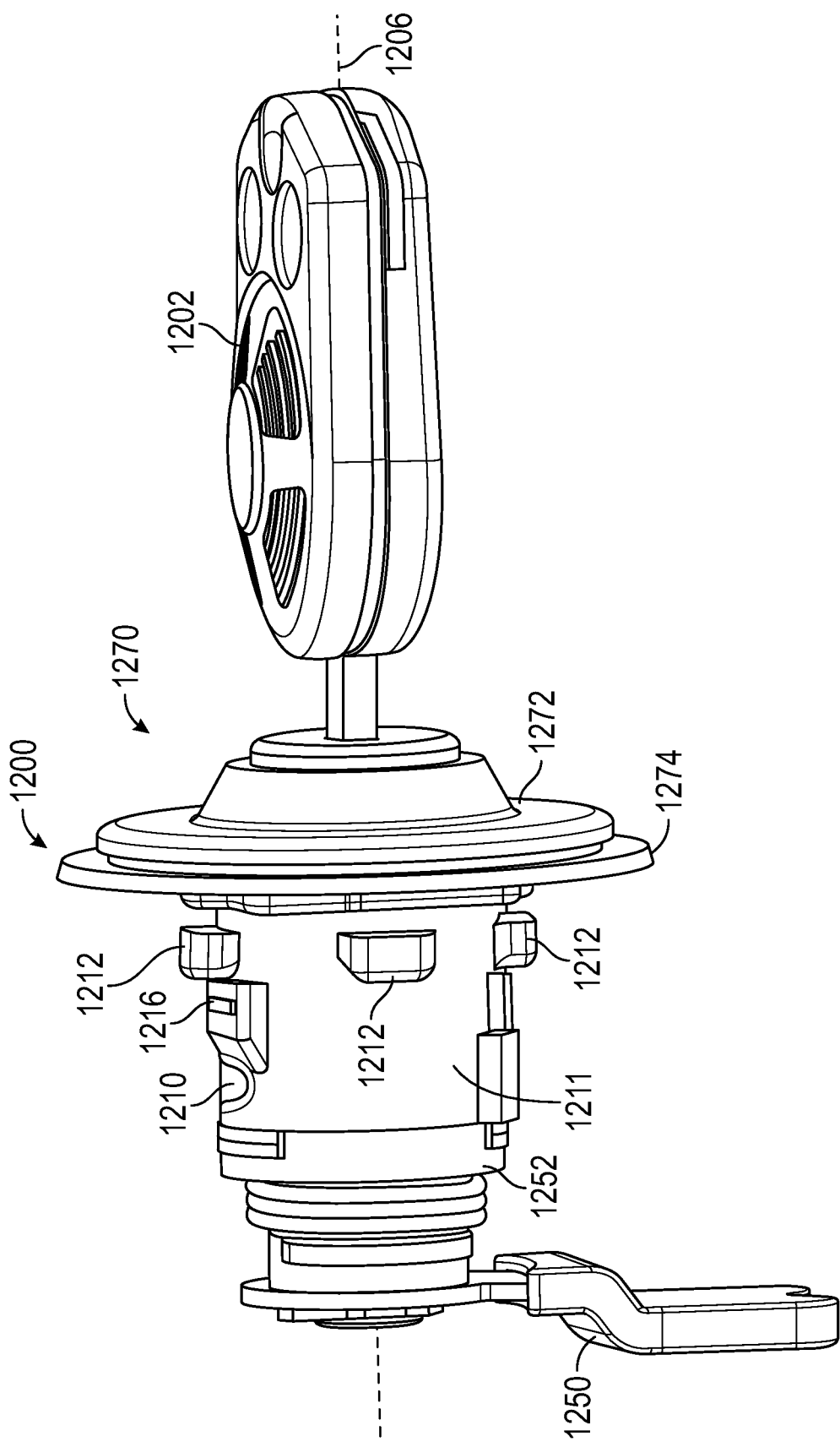
Figure 63:
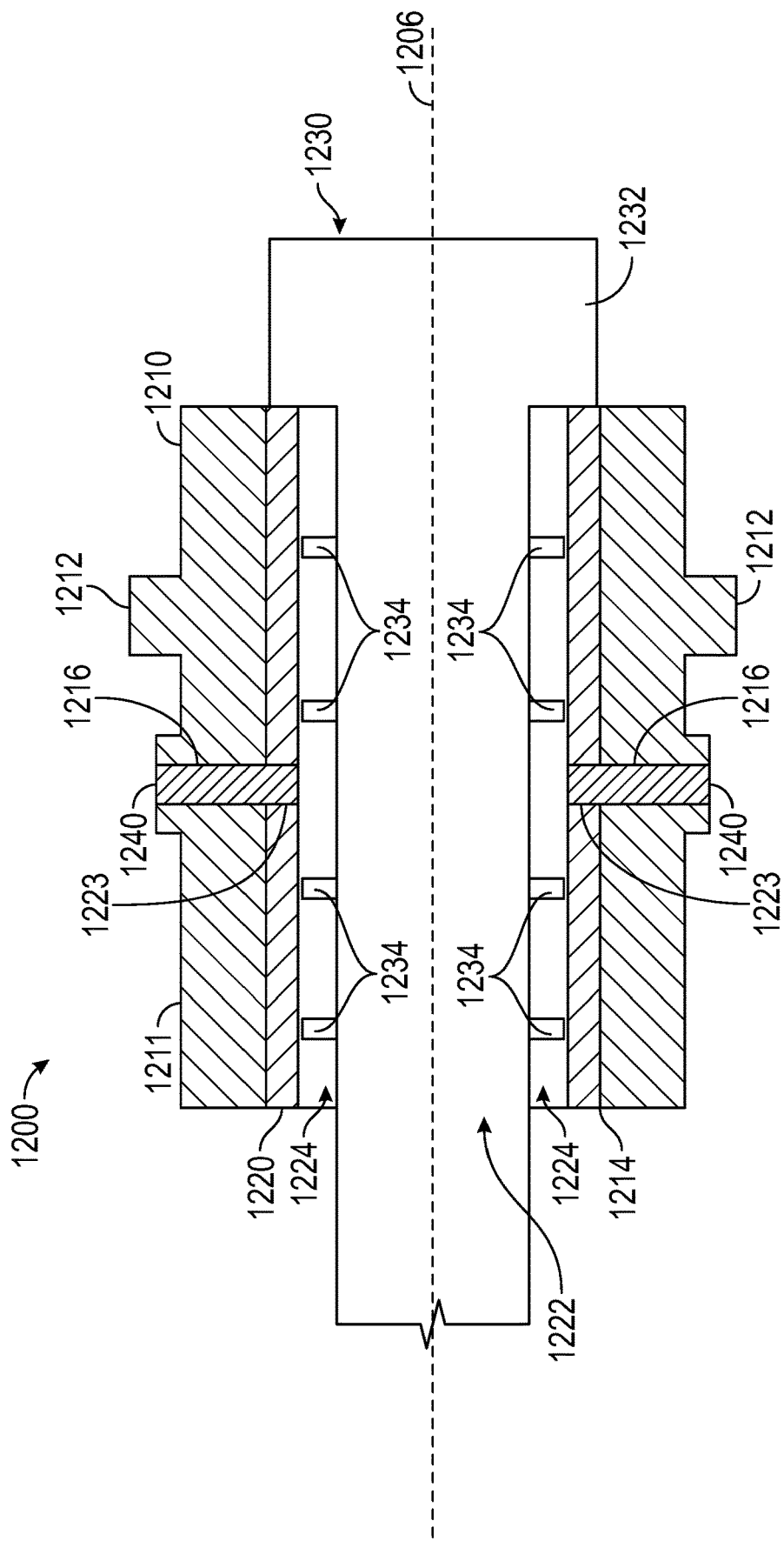
FIG. 63 is a partial side section view of the door locking assembly of FIG. 59, according to an exemplary embodiment.
Figure 65:
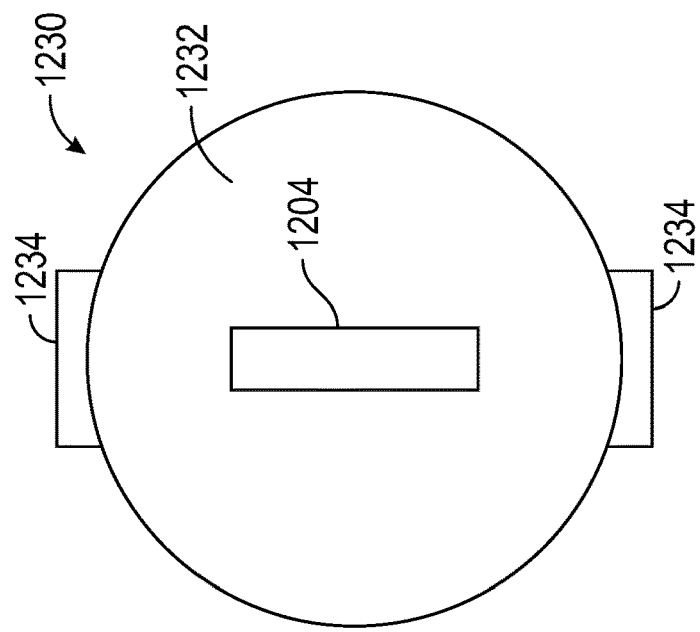
FIG. 65 is a front view of a core assembly of the door locking assembly of FIG. 59, according to an exemplary embodiment.
Figure 64:
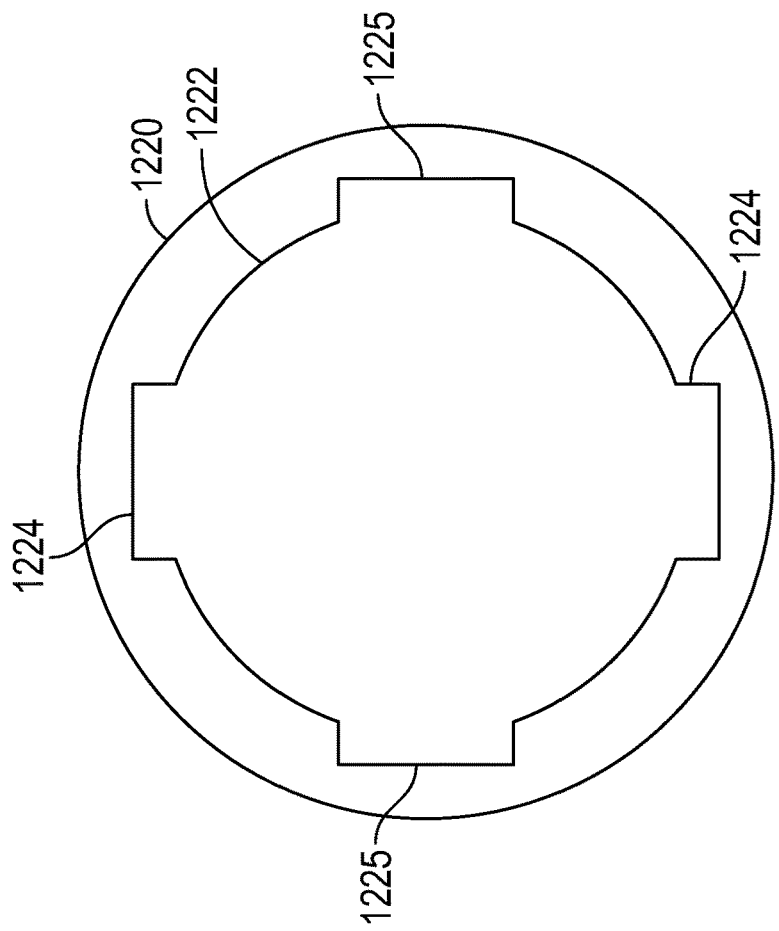
FIG. 64 is a front view of a sleeve of the door locking assembly of FIG. 59, according to an exemplary embodiment.
Figure 66:
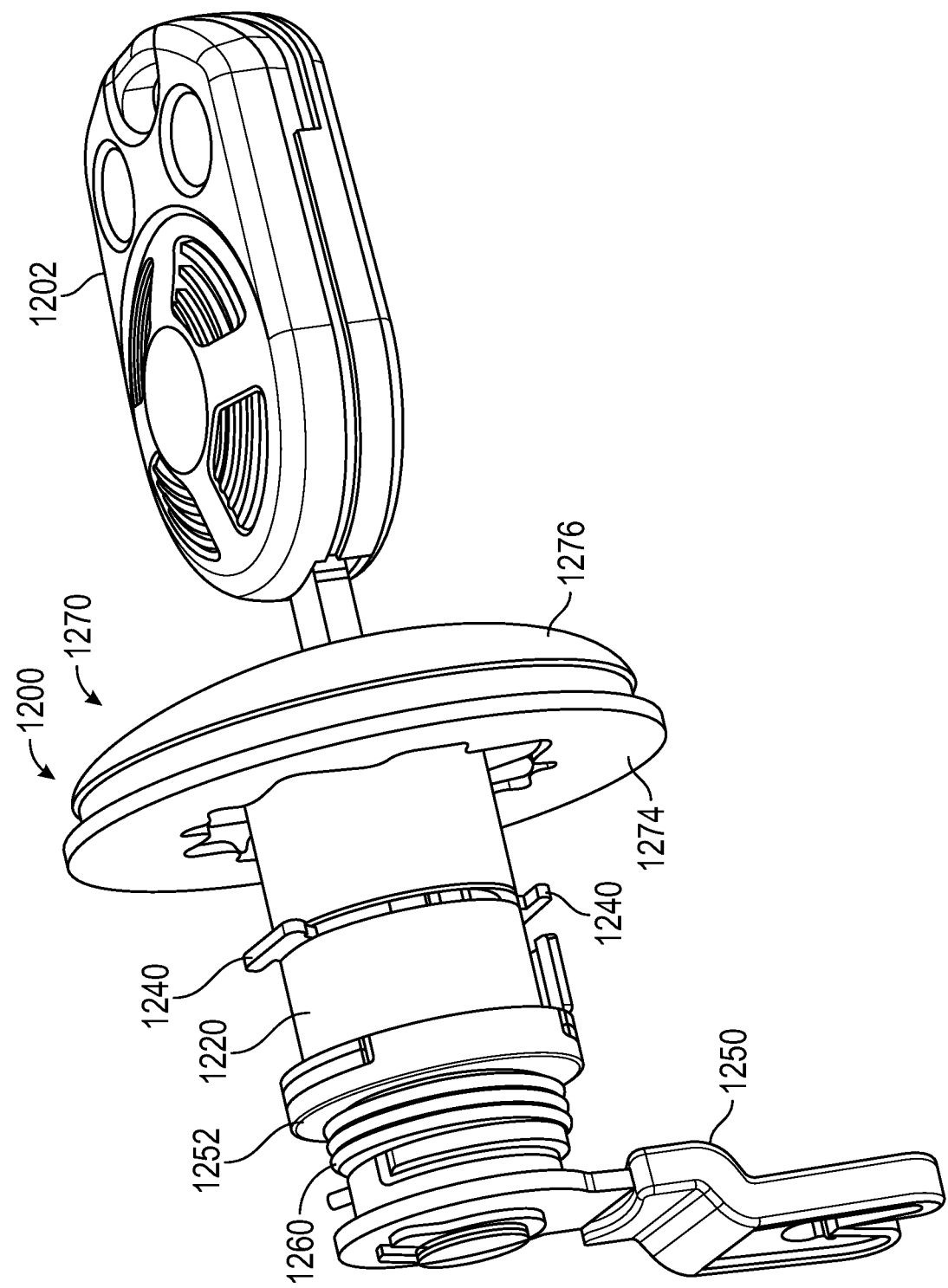
FIGS. 66-69 are perspective views of the door locking assembly of FIG. 59, according to an exemplary embodiment.
Figure 67:
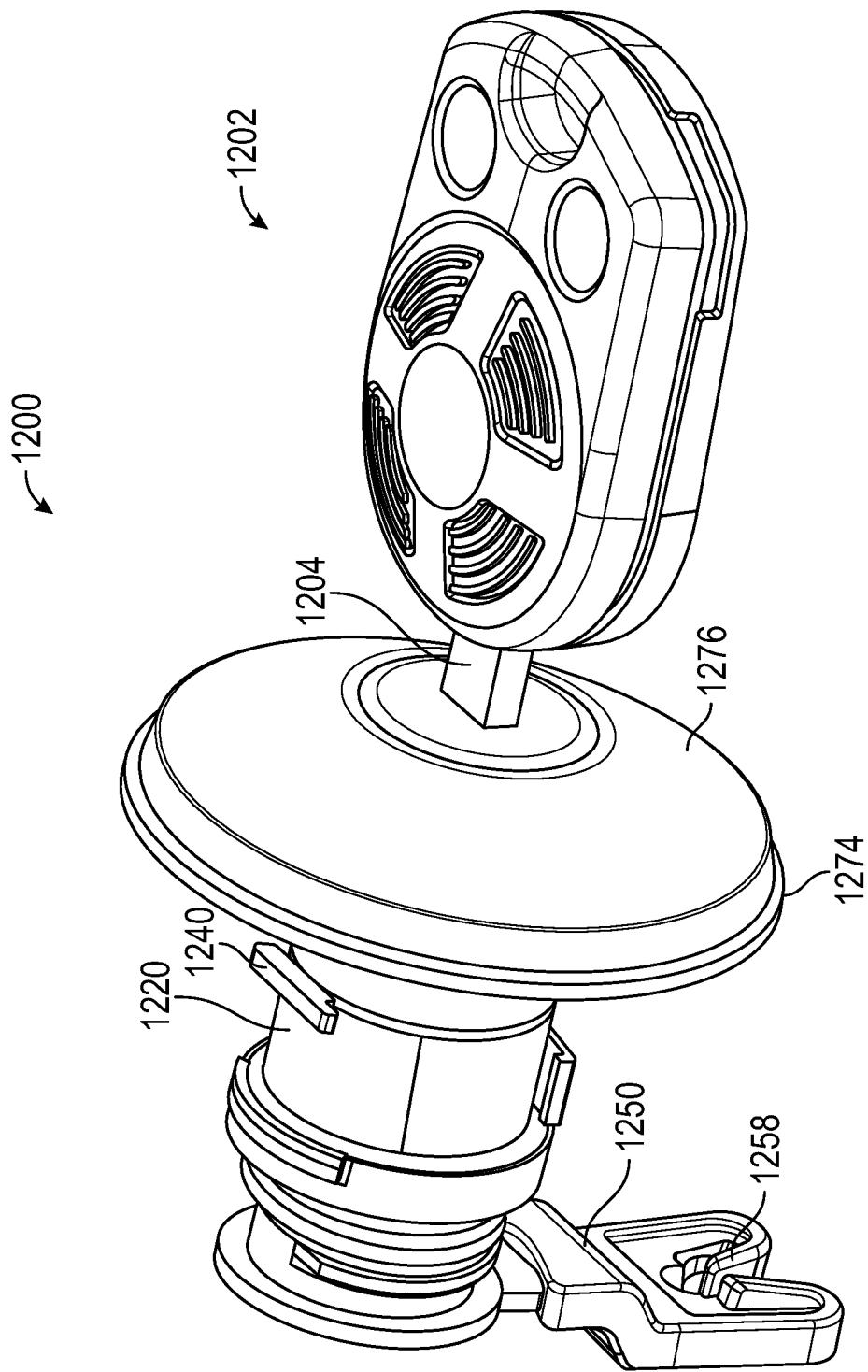
Figure 68:
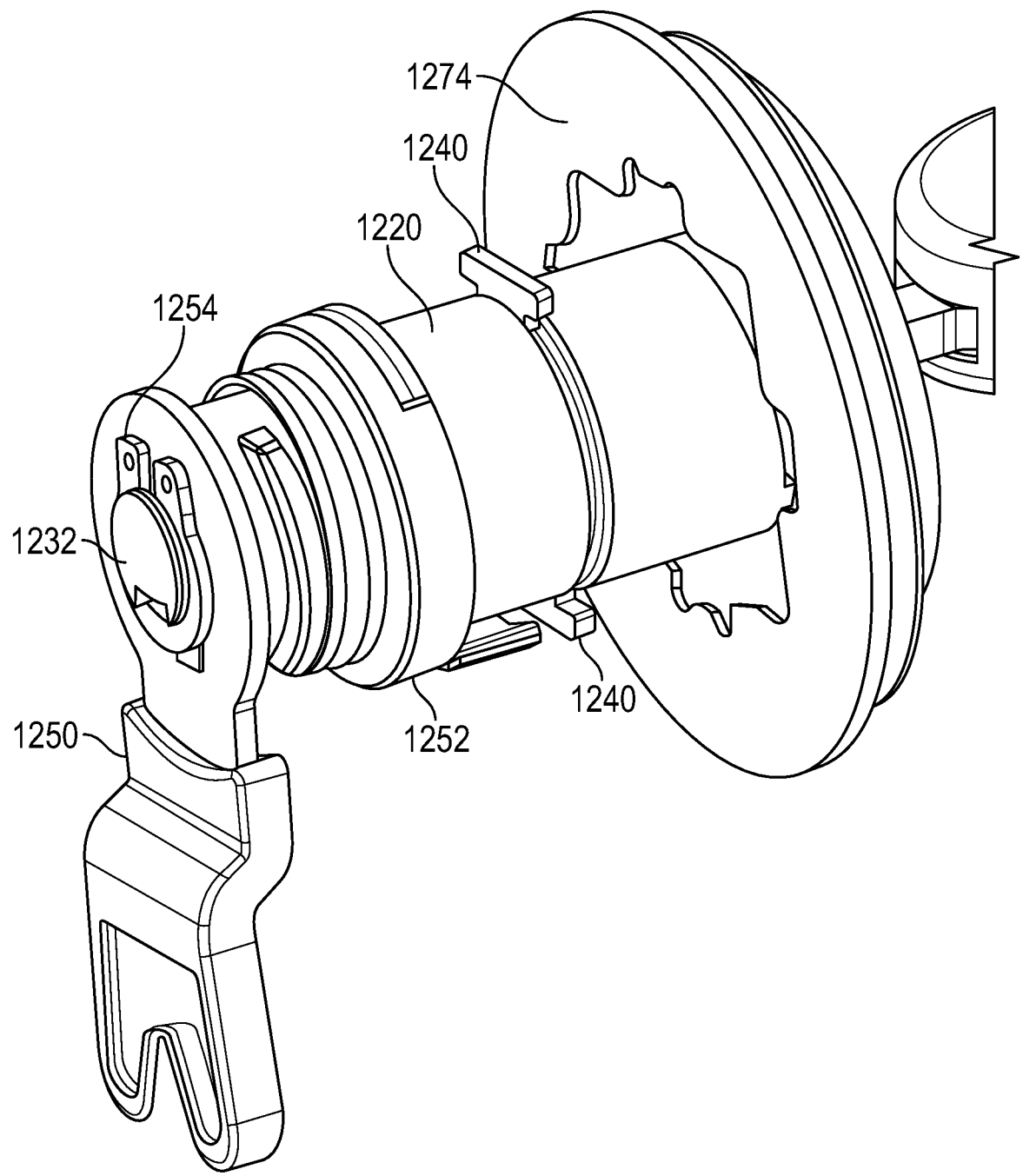
Figure 69:
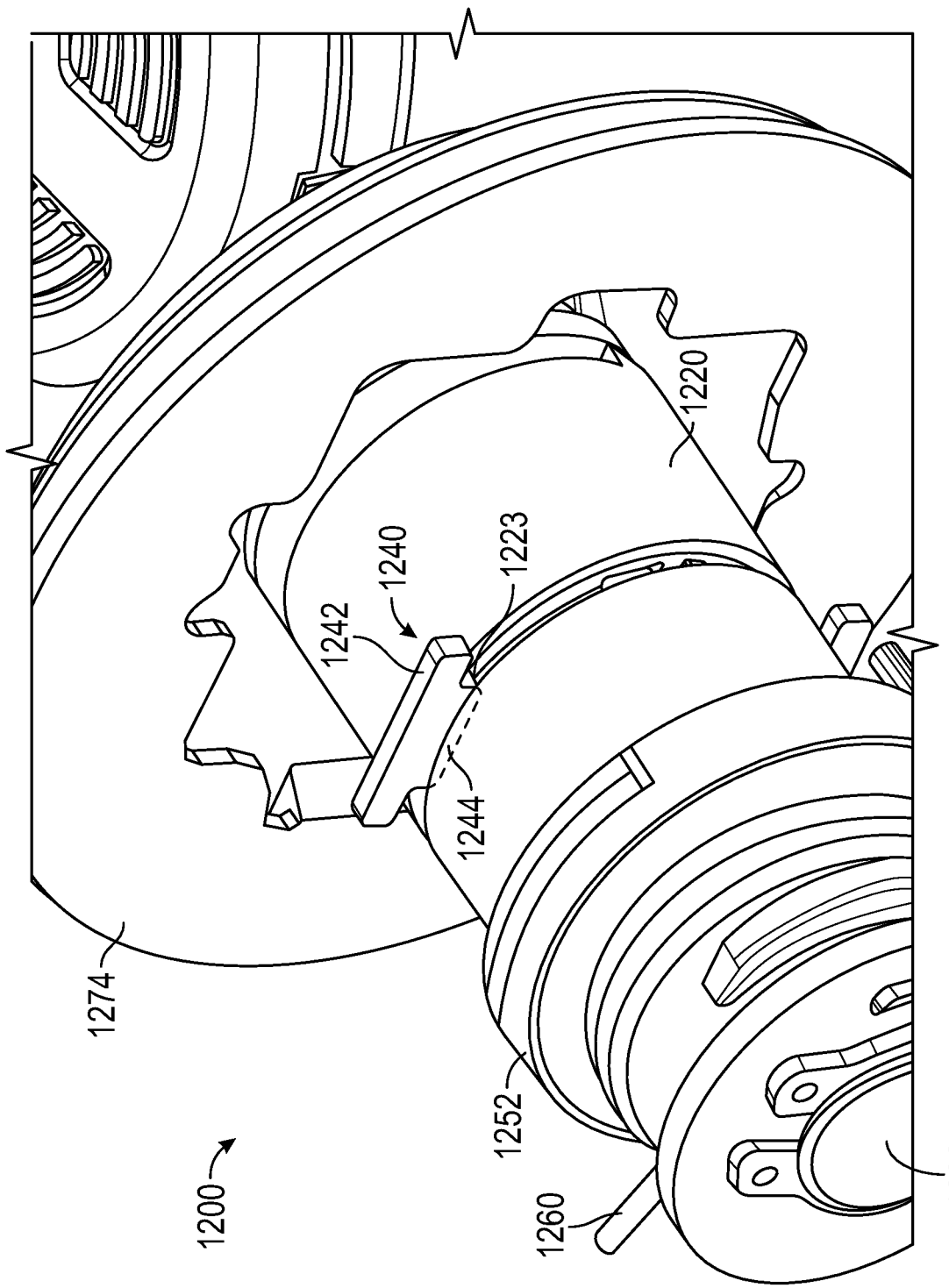
Figure 70:
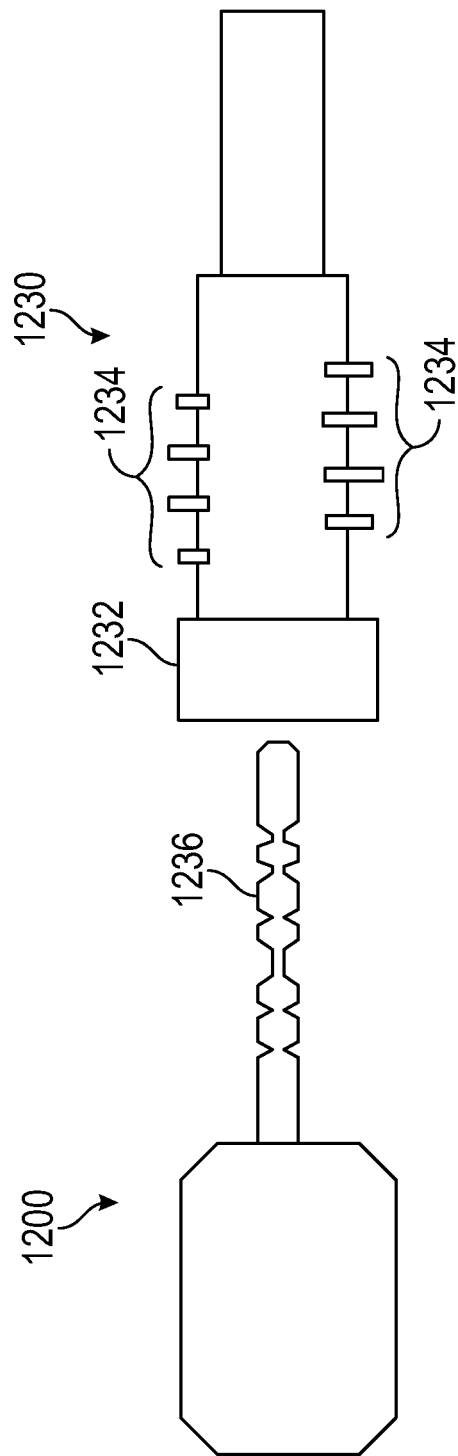
FIGS. 70 and 71 are side views of the core assembly of FIG. 65 in various states of engagement with a key, according to an exemplary embodiment.
Figure 71:
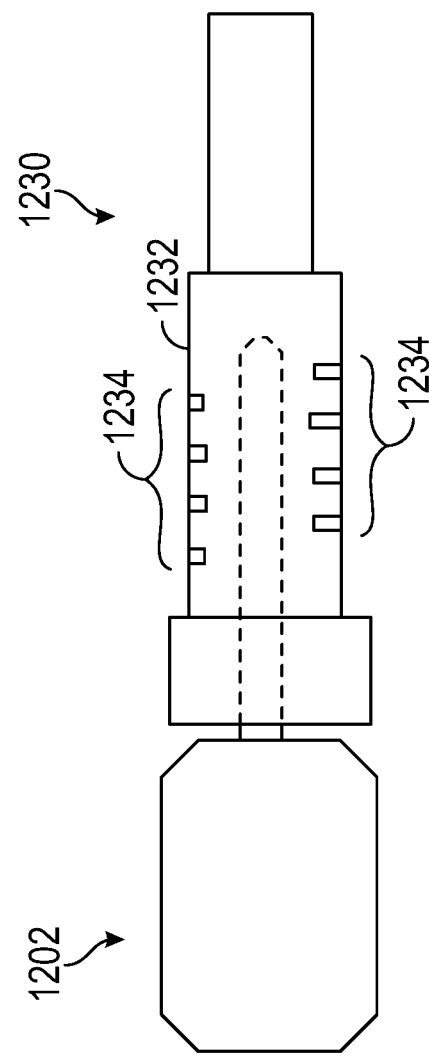

Referring to FIGS. 61-63, the door locking assembly 1200 includes a housing or outer component, shown as lock body 1210. The lock body 1210 is coupled to the body 100 of the delivery vehicle 10. Specifically, the lock body 1210 is fixedly coupled (e.g., fastened) to the body 100 such that relative movement between the lock body 1210 and the body 100 is limited (e.g., prevented). The lock body 1210 includes a cylindrical portion, shown as main body 1211, that is substantially centered about the longitudinal axis 1206. Extending radially outward from the main body 1211 are a series of protrusions or projections, shown as mounting protrusions 1212. The mounting protrusions 1212 are fixedly coupled to (e.g., integrally formed with, fastened to, adhered to, etc.) the main body 1211. The mounting protrusions 1212 are configured to engage the body 100 to limit rotation of the lock body 1210 about the longitudinal axis 1206 and movement of the lock body 1210 along the longitudinal axis 1206 relative to the body 100. The main body 1211 defines a longitudinal aperture, shown as lock body aperture 1214. The lock body aperture 1214 extends longitudinally through the main body 1211 and is approximately centered about the longitudinal axis 1206. The main body 1211 further defines a pair of radial apertures or shear member apertures, shown as retaining pin apertures 1216. As shown, the retaining pin apertures 1216 are diametrically opposed to one another and extend from an outer surface of the main body 1211 to the lock body aperture 1214. A protrusion, shown as spring bar 1218, is fixedly coupled to the main body 1211. The spring bar 1218 is offset from the longitudinal axis 1206 and extends longitudinally rearward from the main body 1211.

Referring to FIGS. 63-69, the door locking assembly 1200 further includes a sleeve or spacer (e.g., a tumbler engagement sleeve), shown as sleeve 1220. The sleeve 1220 is substantially cylindrical and substantially centered about the longitudinal axis 1206. The sleeve 1220 is received within the lock body aperture 1214. In some embodiments, an outer diameter of the sleeve 1220 is slightly smaller than an inner diameter of the lock body aperture 1214 to provide a slip fit between the sleeve 1220 and the lock body 1210, limiting movement of the sleeve 1220 perpendicular to the longitudinal axis 1206. The sleeve 1220 defines a longitudinal aperture, shown as sleeve aperture 1222. The sleeve aperture 1222 extends longitudinally through the sleeve 1220 and is approximately centered about the longitudinal axis 1206. The sleeve aperture 1222 is configured to receive a tumbler assembly, shown as core assembly 1230. The sleeve 1220 further defines a pair of radial apertures or shear member apertures, shown as retaining pin apertures 1223. As shown, the retaining pin apertures 1223 are diametrically opposed to one another and extend from an outer surface of the sleeve 1220 to the sleeve aperture 1222.

Extending radially outward from the sleeve aperture 1222 are two sets of grooves or recesses, shown as unlock grooves 1224 and lock grooves 1225. As shown, the sleeve 1220 includes two unlock grooves 1224 arranged diametrically opposed from one another and two lock grooves 1225 arranged diametrically opposed from one another. In other embodiments, the sleeve 1220 defines more or fewer grooves (e.g., only one unlock groove 1224 and one lock groove 1225, no unlock grooves 1224, etc.). The unlock grooves 1224 and the lock grooves 1225 extend longitudinally along the length of the sleeve aperture 1222. The unlock grooves 1224 and/or the lock grooves 1225 may be continuous along their length and/or have a constant cross-sectional area long their length. In other embodiments, the unlock grooves 1224 and/or the lock grooves 1225 include multiple segments arranged along the length of the sleeve 1220.

Referring to FIGS. 63, 65, 70, and 71, the core assembly 1230 is shown according to an exemplary embodiment. The core assembly 1230 is configured to be selectively fixed relative to the sleeve 1220. Specifically, when the key 1202 is not fully inserted or the wrong key is inserted into the core assembly 1230, the core assembly 1230 is configured to limit (e.g., prevent) rotation of the core assembly 1230 relative to the sleeve 1220. When the key 1202 configured for use with the core assembly 1230 is fully inserted, the key 1202 can be rotated to freely rotate the core assembly 1230 relative to the sleeve 1220, moving the door locking assembly 1200 between the locked configuration and the unlocked configuration.

The core assembly 1230 includes a main body, shown as core cylinder 1232, that extends longitudinally through the door locking assembly 1200. A series of wafers or pins, shown as tumblers 1234, are slidably coupled to the core cylinder 1232. The tumblers 1234 are configured to move radially relative to the core cylinder 1232 between an extended position, shown in FIG. 70, and a retracted position, shown in FIG. 71. In the extended position, the tumblers 1234 extend into the unlock grooves 1224 or the lock grooves 1225 such that the tumblers 1234 engage the sleeve 1220 to limit rotation of the core assembly 1230 relative to the sleeve 1220. In the retracted position, the tumblers 1234 are retracted into the core cylinder 1232 and out of the unlock grooves 1224 or the lock grooves 1225, permitting free rotation of the core assembly 1230 relative to the sleeve 1220. The grooves are positioned such that the tumblers 1234 engage the unlock grooves 1224 when the door locking assembly 1200 is in the unlocked configuration and the tumblers 1234 engage the lock grooves 1225 when the door locking assembly 1200 is in the locked configuration.

The key aperture 1204 extends at least partially through the core cylinder 1232 such that the key 1202 can be inserted into the core cylinder 1232. When the key 1202 is inserted into the key aperture 1204, a surface, shown as profile 1236, of the key 1202 engages the tumblers 1234, causing the tumblers 1234 to move relative to the core cylinder 1232. The tumblers 1234 vary in size such that the amount of movement required to move the tumblers 1234 to a position flush to the outer surface of the core cylinder 1232 varies between each tumbler 1234. Accordingly, the tumblers 1234 and the profile 1236 are correspondingly shaped and sized such that the tumblers 1234 move to their respective retracted positions when the key 1202 is fully inserted. In some embodiments, the tumblers 1234 are biased radially outward (e.g., by one or more springs) to extend radially beyond the circumference of the core cylinder 1232. This biasing force biases the tumblers 1234 into engagement with the unlock grooves 1224 of the sleeve 1220.

Figure 72:
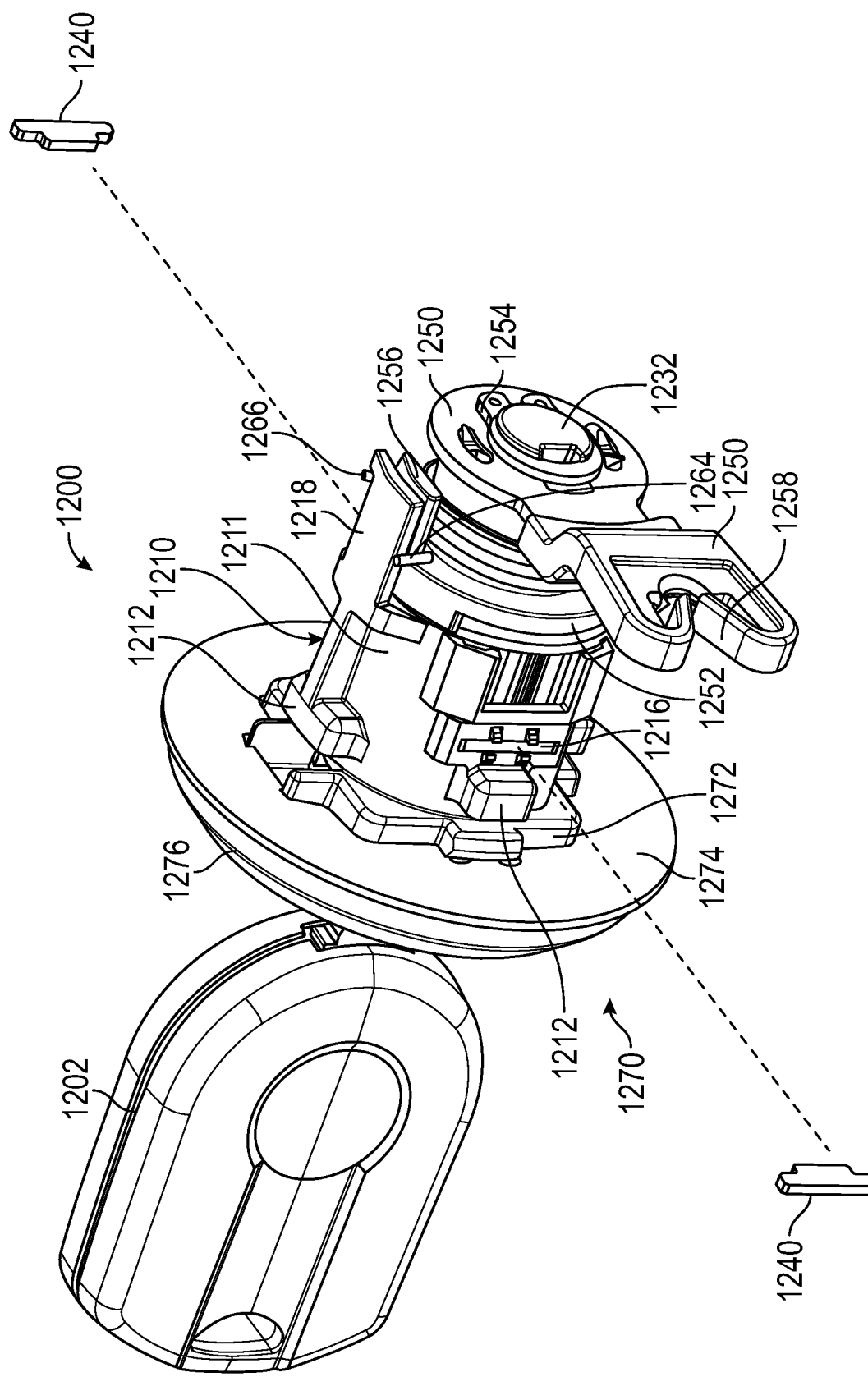
FIG. 72 is an exploded perspective view of the door locking assembly of FIG. 59, according to an exemplary embodiment.
Figure 74:
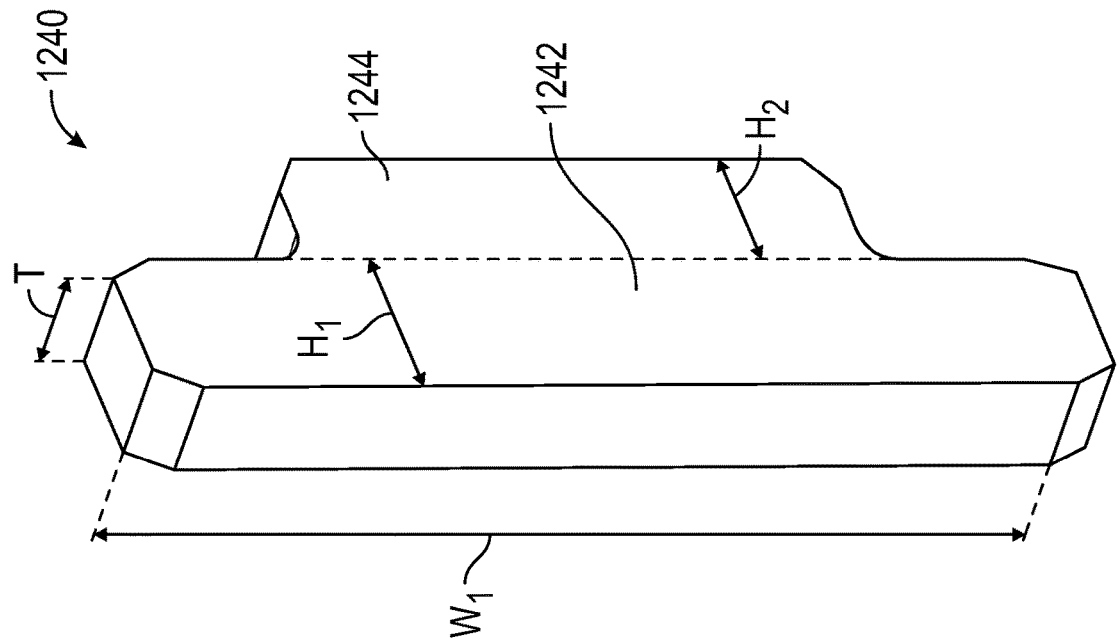
FIGS. 73 and 74 are perspective views of a retaining pin of the door locking assembly of FIG. 59, according to an exemplary embodiment.
Figure 73:
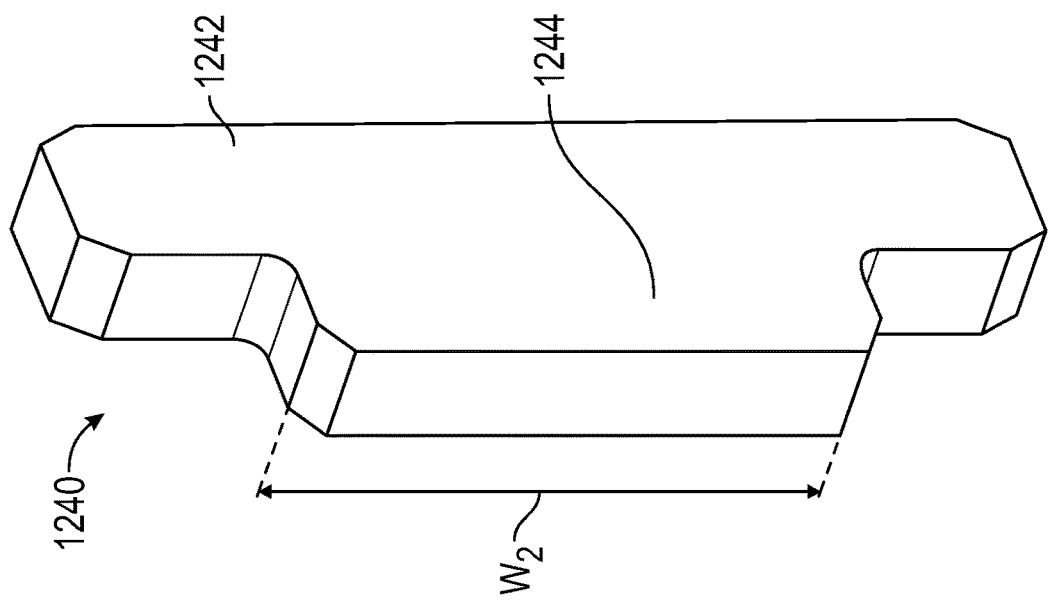
Figure 75:
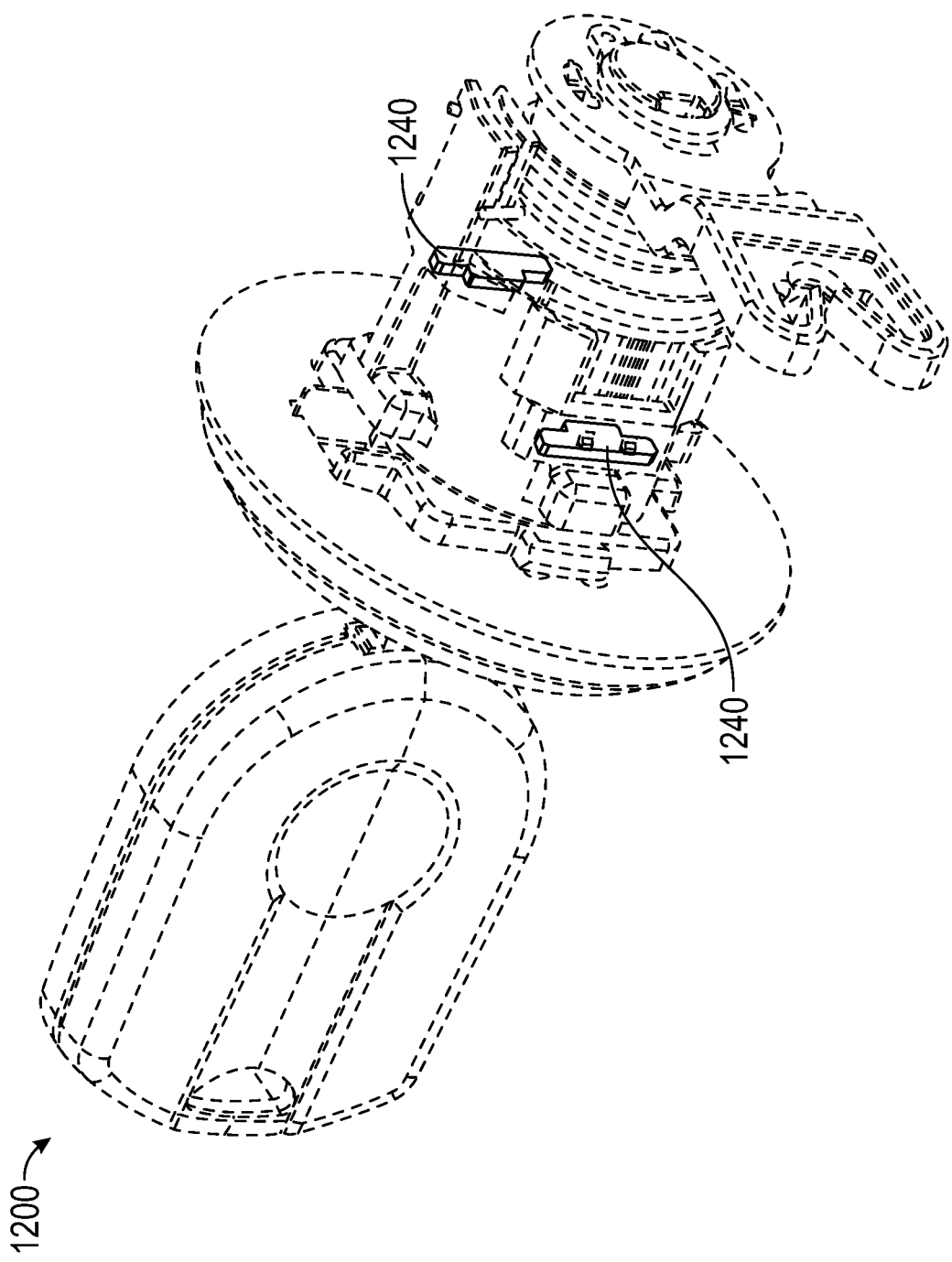
FIG. 75 is a perspective view of the door locking assembly of FIG. 59, according to an exemplary embodiment.

Referring to FIGS. 63 and 72-75, the door locking assembly 1200 further includes a pair of keys, shear members, or plates, shown as retaining pins 1240. The retaining pins 1240 engage the lock body 1210 and the sleeve 1220 to limit (e.g., prevent) rotation of the sleeve 1220 relative to the lock body 1210. The retaining pins 1240 each include a first portion or section, shown as outer portion 1242, and a second portion or section, shown as inner portion 1244. The outer portion 1242 is located in (e.g., extends into) a corresponding retaining pin aperture 1216 of the lock body 1210, and the inner portion 1244 is located in (e.g., extends into) a corresponding retaining pin aperture 1223. As shown in FIGS. 73 and 74, the outer portion 1242 has a height $H_1$ defined in a radial direction relative to the longitudinal axis 1206, and the inner portion 1244 has a height $H_2$ defined parallel to the height $H_1$. As shown, the height $H_1$ and the height $H_2$ are approximately equal. The outer portion 1242 has a width $W_1$ defined perpendicular to the longitudinal axis 1206 and the height, and the inner portion 1244 has a width $W_2$ defined parallel to the width $W_1$. As shown, the width $W_1$ is larger than the width $W_2$ such that the retaining pin 1240 has a symmetrical T shape. Due to this shape, the retaining pins 1240 may be inserted in a radially inward direction from outside of the lock body 1210, as shown in FIG. 72. The outer portion 1242 and the inner portion 1244 have equal thicknesses T defined parallel to the longitudinal axis 1206.

Referring to FIGS. 59, 61, 62, and 68, the door locking assembly 1200 further includes a lever or interface member, shown as actuator arm 1250. The actuator arm 1250 is coupled to the core cylinder 1232 and positioned opposite the key aperture 1204. Specifically, a spacer, shown as hub 1252, rotationally couples the actuator arm 1250 to the core cylinder 1232 such that the actuator arm 1250 rotates with the core cylinder 1232 when the key 1202 is fully inserted. The hub 1252 extends longitudinally between the actuator arm 1250 and the sleeve 1220. The hub 1252 is substantially centered about the longitudinal axis 1206, and the core cylinder 1232 extends longitudinally through the hub 1252 (e.g., through an aperture defined by the hub 1252). The hub 1252 is rotationally coupled to the core cylinder 1232 (e.g., by a key, splined engagement, setscrew, pin, etc.) such that rotation of the hub 1252 relative to the core cylinder 1232 is limited (e.g., prevented). The hub 1252 is rotationally coupled to the actuator arm 1250 (e.g., one or more protrusions of the hub 1252 extend into corresponding apertures of the actuator arm 1250). A retaining clip, shown as snap ring 1254, limits longitudinal movement of the actuator arm 1250 and the hub 1252 away from the sleeve 1220. A protrusion, shown as spring bar 1256, is fixedly coupled to the hub 1252. The spring bar 1256 is offset from the longitudinal axis 1206 and extends longitudinally rearward from the hub 1252.

Figure 58:
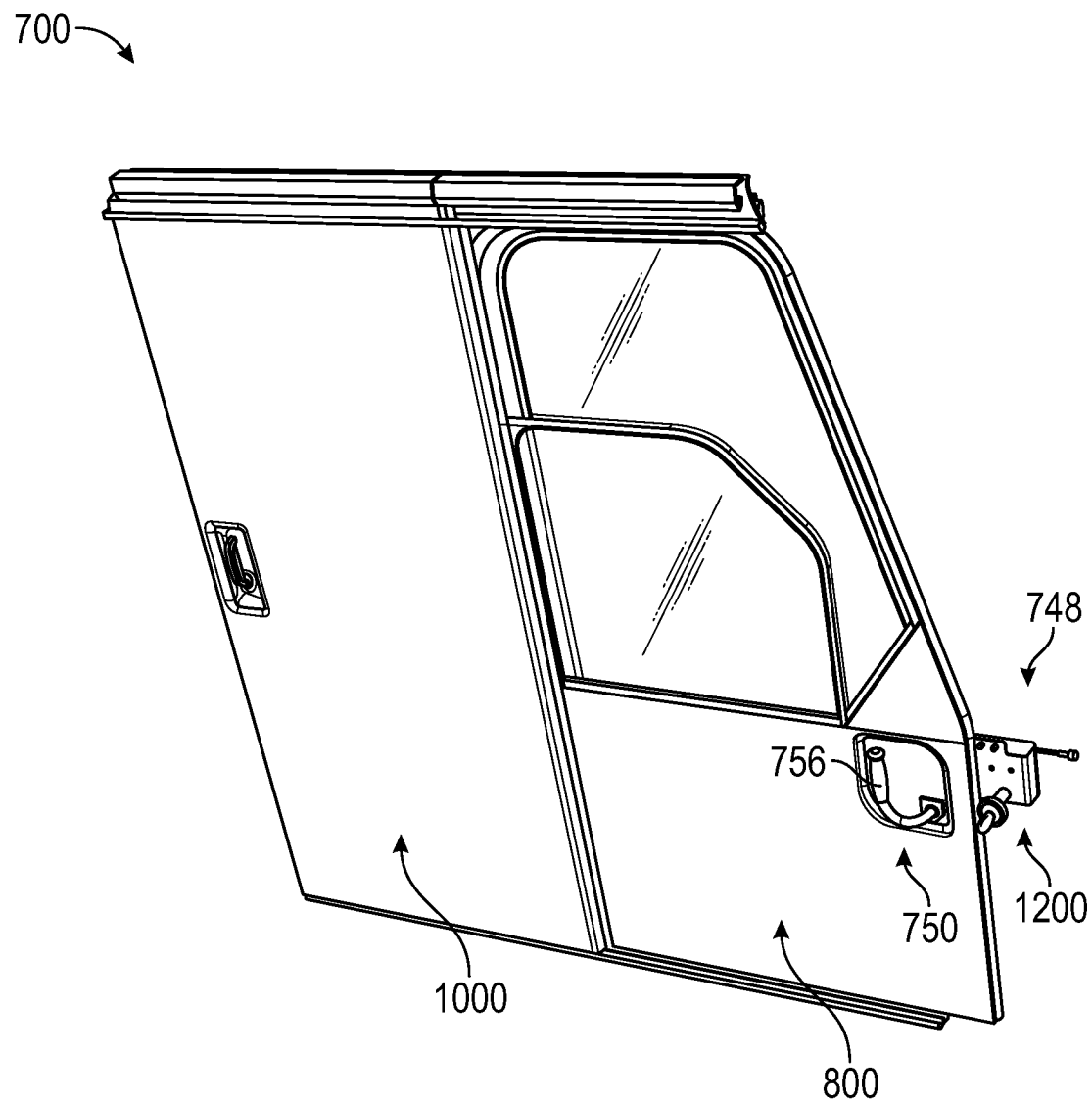
FIG. 58 is a right side perspective view of the side door assembly of the delivery vehicle of FIG. 1, according to an exemplary embodiment.
Figure 59:
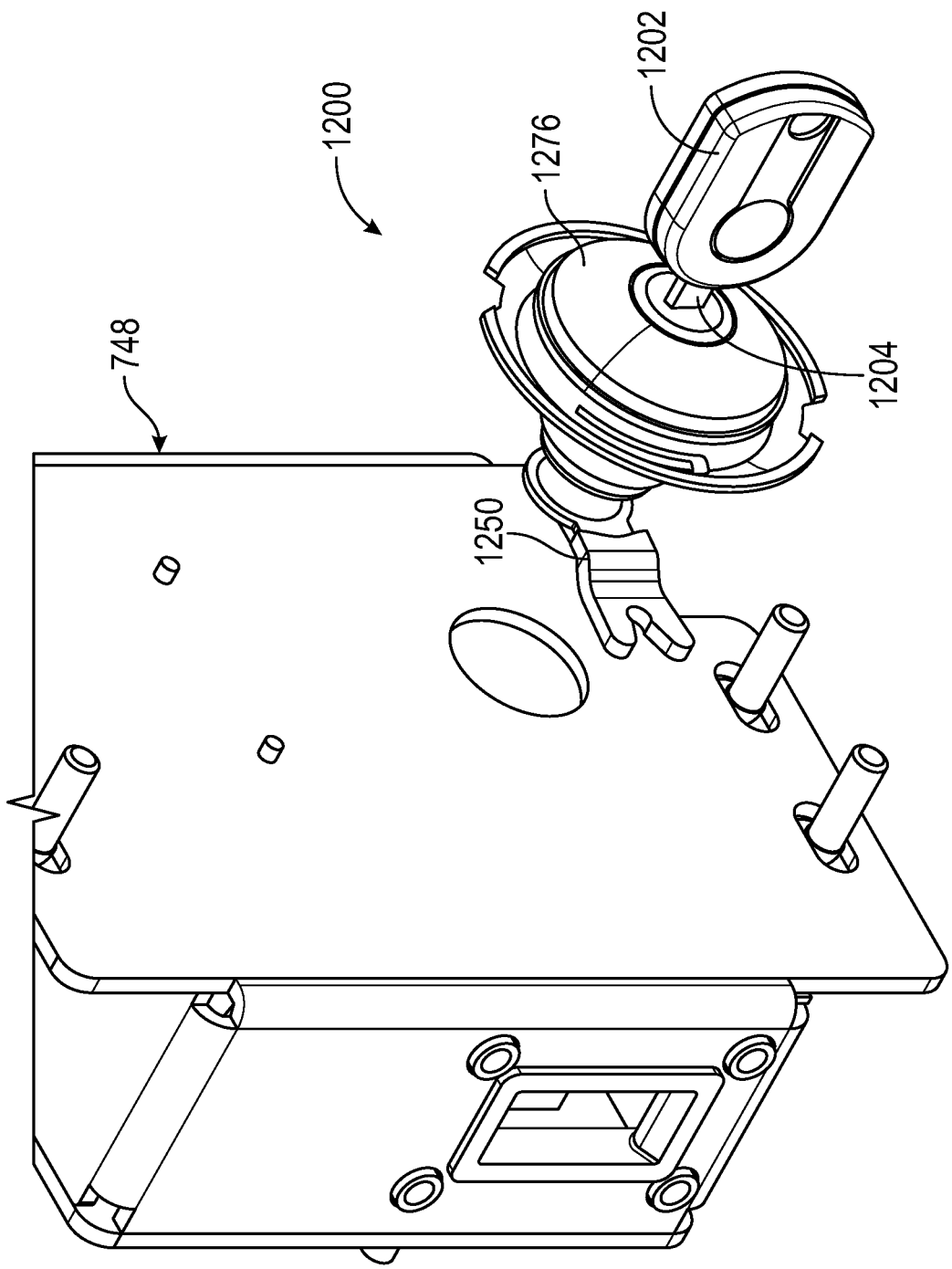
FIGS. 59 and 60 are perspective views of an opening mechanism and a door locking assembly of the delivery vehicle of FIG. 1, according to an exemplary embodiment.
Figure 60:
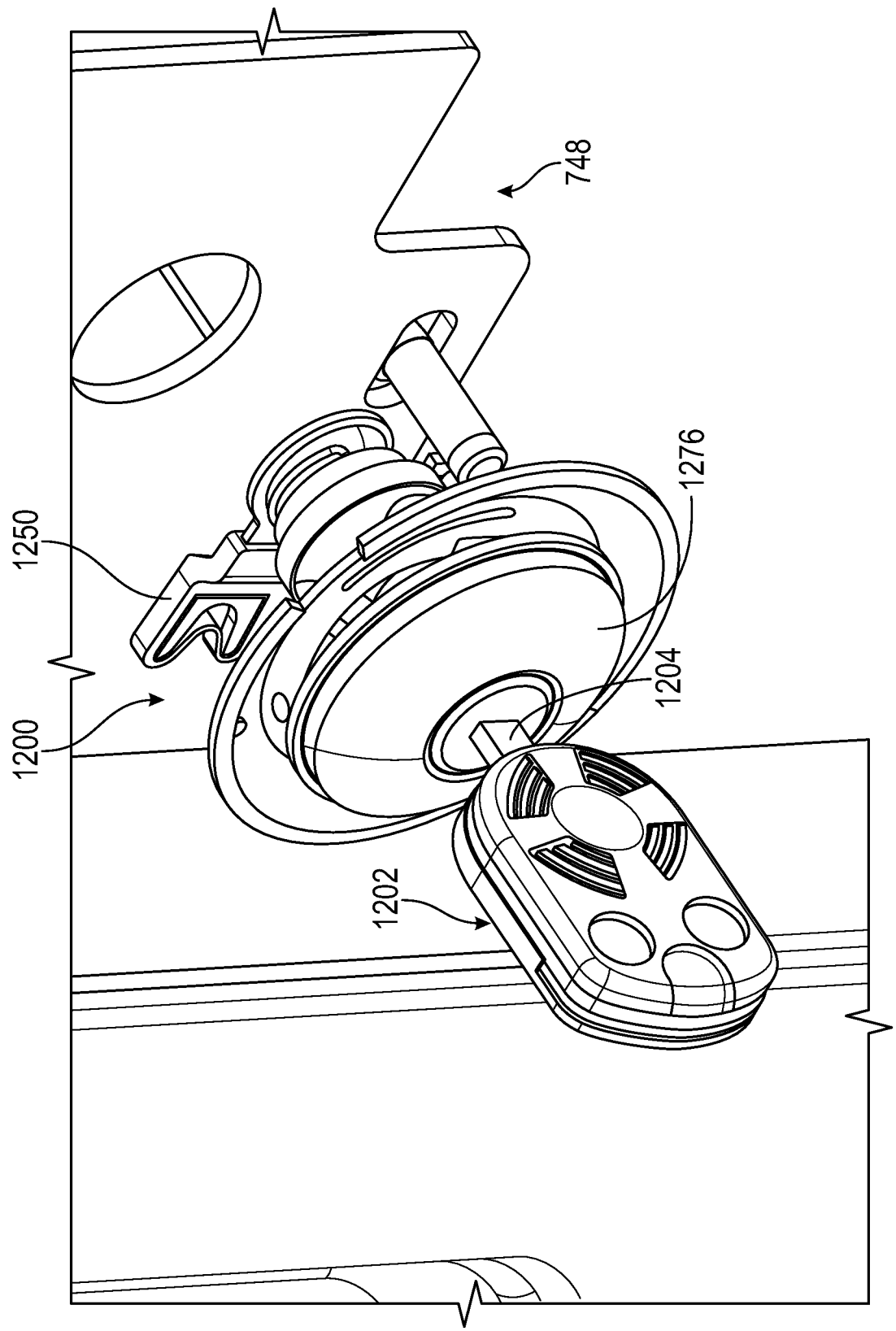

Referring to FIGS. 58-60, the side door assembly 700 includes the opening mechanism 748 including the handle assembly 750. The handle assembly 750 is coupled to the driver cab door 800 and includes an interior handle and the exterior handle 756. The opening mechanism 748 includes various door closure components (e.g., latches, levers, etc.) that releasably secure the driver cab door 800 in the closed position when the opening mechanism 748 is in an engaged configuration (as described above). When the interior handle or the exterior handle 756 are operated by a user, the opening mechanism 748 changes to a disengaged configuration, permitting movement of the driver cab door 800 out of the closed position. The door locking assembly 1200 engages with the opening mechanism 748 such that the door locking assembly 1200 (a) prevents the opening mechanism 748 from changing to the disengaged configuration when the door locking assembly 1200 is in the locked configuration and (b) permits the opening mechanism 748 to change to the disengaged configuration when the door locking assembly 1200 is in the unlocked configuration. Specifically, as shown in FIG. 61, a coupler or interface, shown as clip 1258, couples the actuator arm 1250 to the opening mechanism 748. The clip 1258 is radially offset from the longitudinal axis 1206 such that the clip 1258 translates in an arc around the longitudinal axis 1206 as the key 1202 rotates the core assembly 1230 and the door locking assembly 1200 moves between the locked and unlocked configurations. The clip 1258 may be coupled to a lever, rod, or another component of the opening mechanism 748 (e.g., the locking latch 768, etc.).

Figure 77:
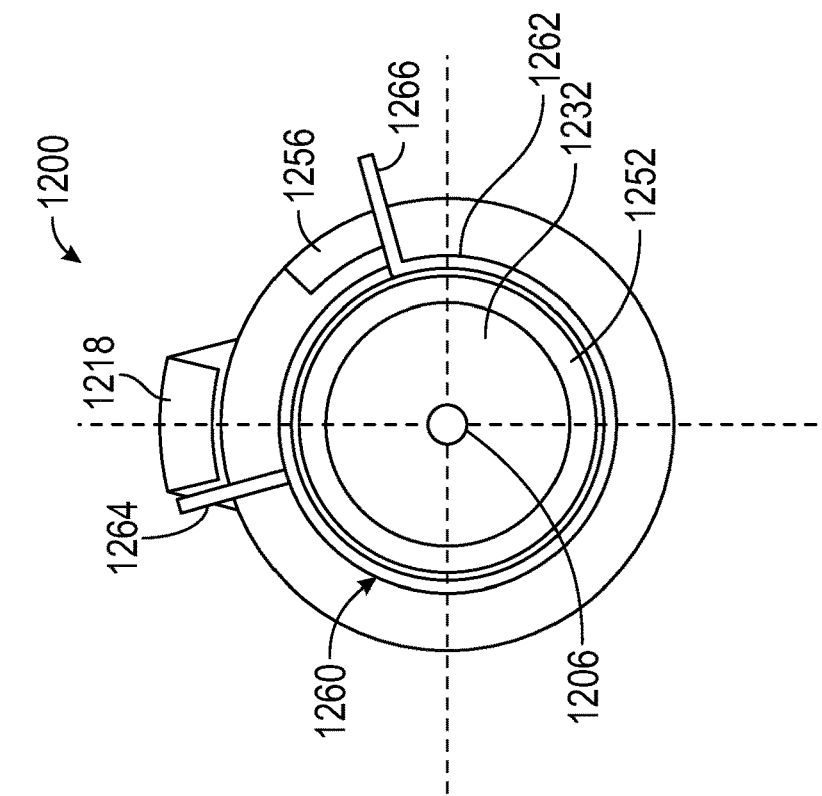
FIGS. 76 and 77 are rear views of the door locking assembly of FIG. 59, according to an exemplary embodiment.
Figure 76:
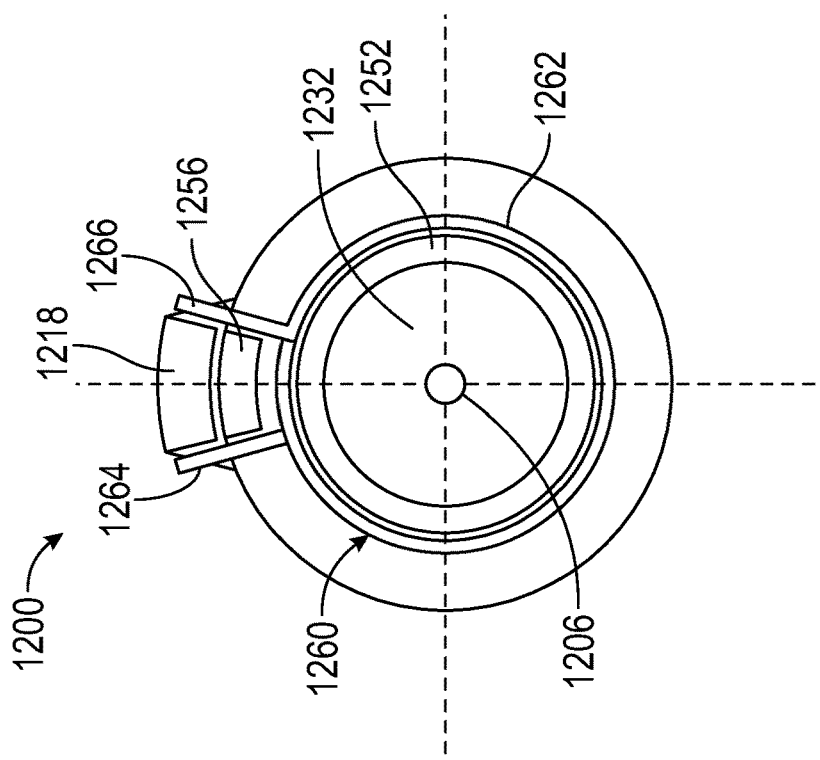

Referring to FIGS. 61, 76, and 77, the door locking assembly 1200 further includes a biasing member (e.g., a torsion spring), shown as centering spring 1260. The centering spring 1260 includes a coil portion 1262 that is wrapped around the hub 1252. A first end and a second end of the centering spring 1260 include protrusions, shown as tang 1264 and tang 1266 respectively, that extend radially outward from the coil portion 1262. The tang 1264 and the tang 1266 extend on opposite sides of the spring bar 1218 and the spring bar 1256. When the hub 1252 is in a centered orientation (e.g., as shown in FIG. 76) relative to the lock body 1210, the spring bar 1218 and the spring bar 1256 align with one another. When the hub 1252 is rotated, the spring bar 1218 and the spring bar 1256 are moved out of alignment, forcing the tang 1266 apart from the tang 1264. This causes the centering spring 1260 to impart a biasing force on the spring bar 1218 and the spring bar 1256, biasing the hub 1252 back into the centered orientation. In some embodiments, the centered orientation corresponds to the unlocked configuration of the door locking assembly 1200. In other embodiments, the centered orientation corresponds to the locked configuration of the door locking assembly 1200.

Referring to FIGS. 61-69 and 78, the door locking assembly 1200 further includes a mounting assembly, shown as front mount 1270, that couples the door locking assembly 1200 to the body 100. The front mount 1270 includes a main body, shown as mounting plate 1272, that is coupled to the lock body 1210. Positioned rearward of the mounting plate 1272 is a seal, shown as face seal 1274. In some embodiments, such as the embodiment shown in FIG. 68, the body 100 extends between the face seal 1274 and the mounting protrusions 1212 to couple the lock body 1210 to the body 100. The face seal 1274 may form a watertight seal between the door locking assembly 1200 and the body 100 to prevent ingress of water into the delivery vehicle 10. Positioned on the exterior of the mounting plate 1272 and coupled to the mounting plate 1272 is a cover, shown as faceplate 1276. The faceplate 1276 at least partially surrounds the key aperture 1204. The faceplate 1276 covers the mounting plate 1272. In the embodiment shown, the exterior of the faceplate 1276 includes a domed surface that surrounds the key aperture 1204.

Referring to FIGS. 7 and 78-81, the door locking assembly 1200 is shown coupled to the body 100 of the delivery vehicle 10. In these embodiments, the door locking assembly 1200 is positioned within a recess 1280 that is inset from an outer surface 1282 of the body 100. Specifically, the door locking assembly 1200 is positioned within the recess 1280 such that the key aperture 1204 is positioned within the recess 1280. In such an embodiment, the key 1202 must be inserted into the recess 1280 to reach the key aperture 1204.

Figure 78:
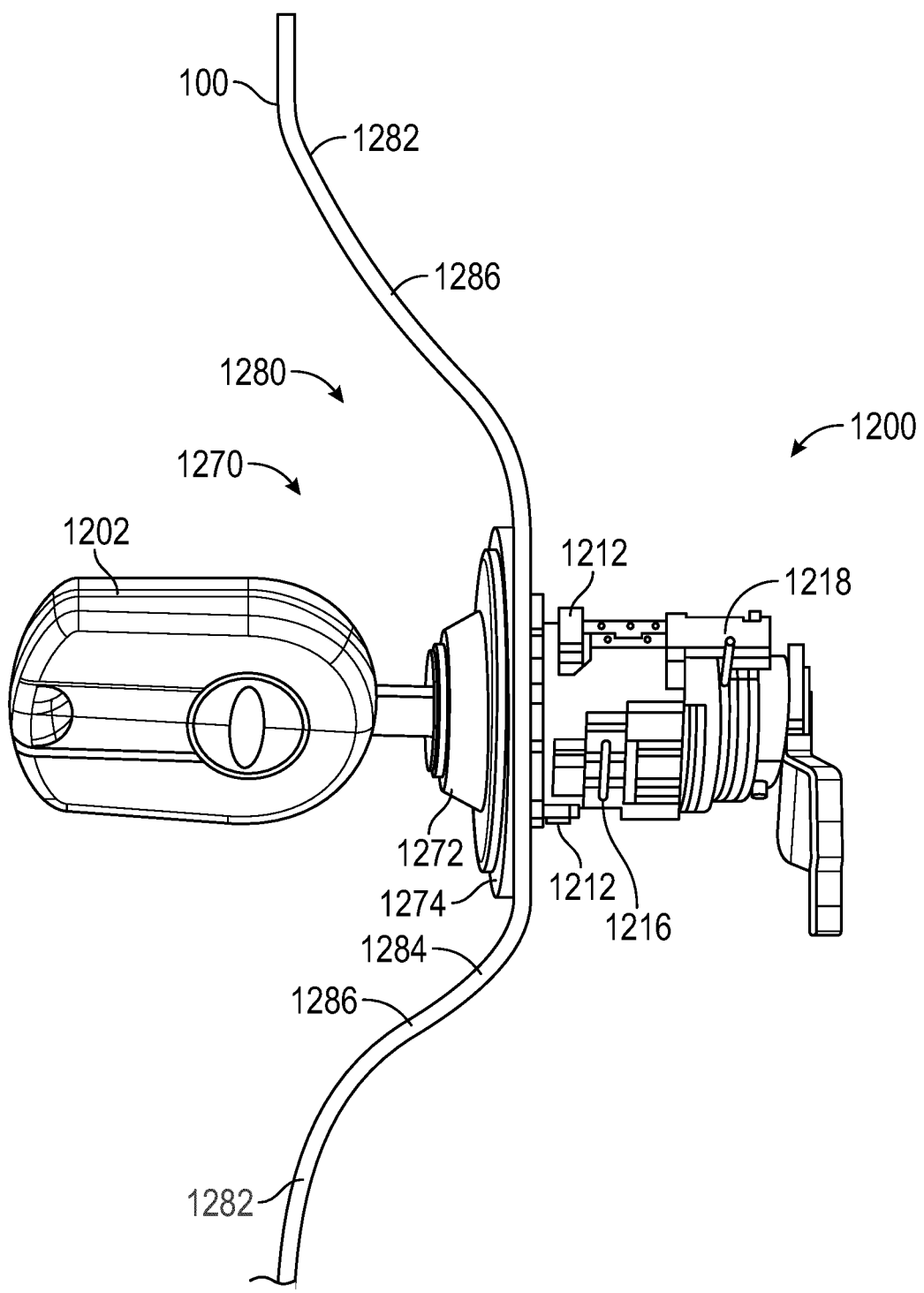
FIG. 78 is a partial section view of a body of the delivery vehicle of FIG. 1, according to an exemplary embodiment.

As shown, the recess 1280 is defined by a body panel 1281 of the body 100 that is positioned forward of the driver cab door 800. In other embodiments, the recess 1280 is defined by another part of the body 100. The body 100 includes a substantially flat face, shown as base portion 1284, and one or more tapered (e.g., curved, angled, etc.) faces, shown as inclined portions 1286, that extend between the outer surface 1282 and the base portion 1284. In other embodiments, the inclined portions 1286 are substantially perpendicular to the base portion 1284 and/or the outer surface 1282. The outer surface 1282, the base portion 1284, and the inclined portions 1286 may be formed from a single, continuous piece of material (e.g., sheet metal). The base portion 1284 defines an aperture that receives the door locking assembly 1200 therethrough. As shown in FIG. 78, the base portion 1284 extends between the mounting plate 1272 and the mounting protrusions 1212.

Figure 81:
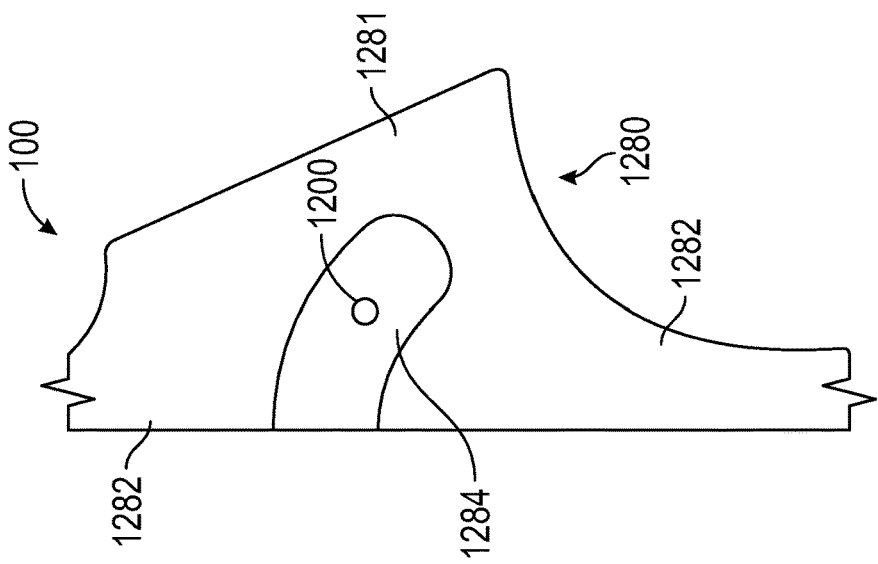
FIGS. 79-81 are side views of a portion of a body of the delivery vehicle of FIG. 1, according to various exemplary embodiments.
Figure 80:
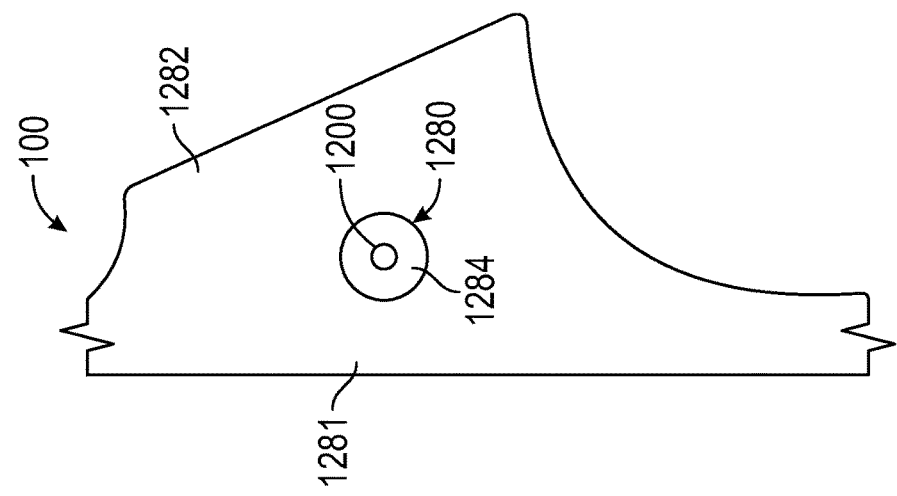
Figure 79:
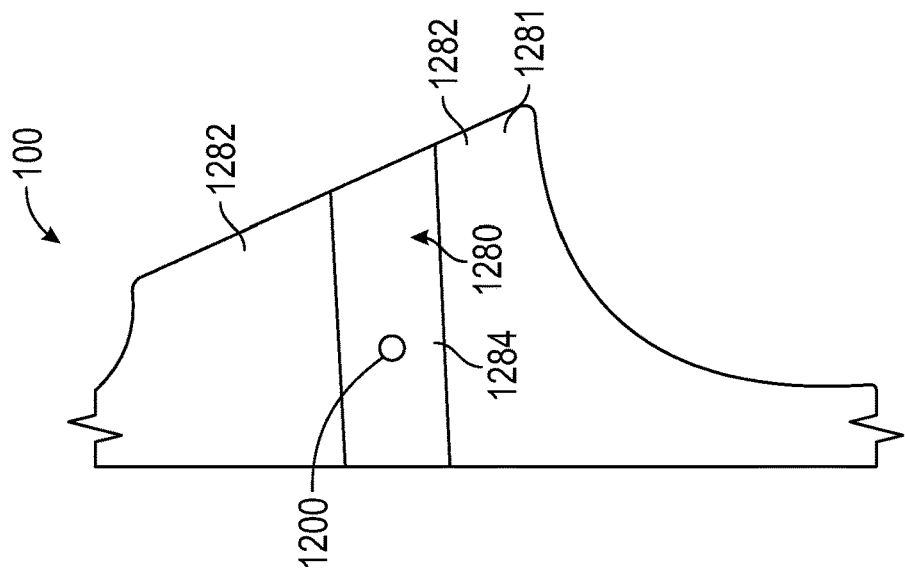

Referring to FIGS. 79-81, the recess 1280 may have a variety of different shapes. In FIG. 79, the recess 1280 extends horizontally along the surface of the body 100, from one edge of the body panel 1281 to an opposing edge of the body panel 1281. In FIG. 80, the recess 1280 is formed as a circle surrounding the door locking assembly 1200 and does not extend to an edge of the body panel 1281. In FIG. 81, the recess 1280 is curved and extends forward from a rear edge of the body panel 1281, but does not extend to any other edge of the body panel 1281. In other embodiments, the recess 1280 is otherwise positioned on the delivery vehicle 10. By way of example, the recess 1280 may be partially or entirely defined by the driver cab door 800, the side cargo door 1000, or another door of the delivery vehicle 10. Accordingly, the door locking assembly 1200 may be coupled to the driver cab door 800, the side cargo door, or another door of the delivery vehicle 10.

During operation of the door locking assembly 1200, a user may insert the key 1202 into the key aperture 1204 and rotate the key 1202 to reconfigure the door locking assembly 1200 between the locked configuration and the unlocked configuration. When the key 1202 is fully inserted, the tumblers 1234 are moved into the retracted position, and the core assembly 1230 is permitted to rotate freely apart from the biasing force of the 1260. When the user has rotated the key 1202 sufficiently to reconfigure the door locking assembly 1200, the key 1202 may be removed, permitting the tumblers 1234 to enter the unlock grooves 1224 or the lock grooves 1225. When the key 1202 is removed, the tumblers 1234 engage the unlock groove 1224 or the lock groove 1225 to limit rotation of the core assembly 1230 relative to the sleeve 1220. The retaining pins 1240 limit rotation of the sleeve 1220 relative to the lock body 1210, which is fixed to the body 100 of the delivery vehicle 10. Accordingly, a user is prevented from moving the door locking assembly 1200 out of the locked configuration without the use of the key 1202, thereby preventing unauthorized access to the interior of the delivery vehicle 10.

Referring to FIGS. 61-65, 73, and 74, a user may attempt to obtain unauthorized access to the interior of the delivery vehicle 10 by forcing the door locking assembly 1200 open. In one instance, the user may attempt to force the door locking assembly 1200 open by inserting a torque transmission device, such as a screwdriver, into the key aperture 1204 and applying a torque to the core assembly 1230 in an attempt to force the core assembly 1230 to rotate toward the unlocked configuration. This applied torque forces the tumblers 1234 against the sleeve 1220, which in turn applies a torque to the sleeve 1220. The retaining pins 1240 resist rotation of the sleeve 1220. The retaining pins 1240 may be configured (e.g., sized, made from specific materials) such that the retaining pins 1240 fail at a lesser applied torque than the tumblers 1234. Such an arrangement may permit replacement of the retaining pins 1240 instead of the core assembly 1230 when the door locking assembly 1200 is forcibly entered. This may be desirable, as the retaining pins 1240 may be easier and/or more cost effective to replace than the core assembly 1230.

When the retaining pins 1240 fail during a forced access attempt, the T-shaped geometry of the retaining pins 1240 may cause the outer portion 1242 to shear off of the inner portion 1244 along a line extending between the outer portion 1242 and the inner portion 1244. To improve the resistance of the door locking assembly 1200 to forced entry, the retaining pins 1240 may be made from a relatively hard material, such as hardened steel. The retaining pins 1240 may be shaped and/or sized such that after failure (e.g., shearing of the retaining pins 1240 due to an applied torque), the retaining pins 1240 prevent the door locking assembly 1200 from changing to the unlocked configuration, even if the key 1202 is used, until the door locking assembly 1200 is disassembled and the retaining pins 1240 are replaced.

Referring to FIGS. 77 and 78, a user may alternatively attempt to obtain unauthorized access to the interior of the delivery vehicle 10 by using a tool (e.g., a pair of pliers, a wrench, etc.) to engage (e.g., grasp, grab, press against, etc.) an exterior surface of the door locking assembly 1200 and apply a torque to force the core assembly 1230 to rotate. To prevent this engagement and thereby thwart this method of forced access, the door locking assembly 1200 is positioned within the recess 1280. In order for a user to engage a tool with the door locking assembly 1200, they must extend the tool into the recess 1280, limiting the types of tool that can be used and the orientations in which a tool can reach the door locking assembly 1200. This prevents the user from using tools in certain orientations in which the tool can securely engage the door locking assembly 1200 and/or provide a user with a maximum amount of leverage. The door locking assembly 1200 is positioned in close proximity to the inclined portions 1286 of the recess 1280, limiting the space around the door locking assembly 1200 in which a tool can maneuver. Additionally, the outer surface of the faceplate 1276 is dome-shaped such that the surface thereof prevents effective engagement with most tools (e.g., tools are incapable of applying sufficient frictional force, grip, or traction to cause movement of the faceplate 1276).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the delivery vehicle 10 and the systems and components thereof as shown in the various exemplary embodiments is illustrative only. Additionally, any element disclosed in one embodiment may be incorporated or utilized with any other embodiment disclosed herein.

The invention claimed is:

1. A vehicle comprising:
    a chassis defining a longitudinal axis;
    a cab coupled to the chassis, the cab having a first door with a first window and a second door with a second window;
    a cargo body coupled to the chassis and positioned rearward of the cab; and
    a driver seat disposed within the cab;
    wherein, when the driver seat is in a position that accommodates an operator being in a $95^{th}$ male height percentile, the operator within the driver seat can see out of (i) the first window at a first angle relative to a forward looking direction that is parallel with the longitudinal axis and (ii) the second window at a second angle relative to the forward looking direction; and
    wherein each of the first angle and the second angle is at least 95 degrees.

2. The vehicle of claim 1, wherein the chassis defines a prime mover compartment at a front end thereof, further comprising:
    a hood coupled to the front end of the chassis; and
    a prime mover coupled to the chassis within the prime mover compartment and beneath the hood.

3. The vehicle of claim 2, wherein the prime mover is transversely mounted within the prime mover compartment.

4. The vehicle of claim 2, wherein the chassis includes a firewall positioned at a rear of the prime mover compartment that separates the cab from the prime mover compartment, and wherein the firewall is substantially flat and vertically oriented.

5. The vehicle of claim 1, further comprising a partition positioned between the cab and the cargo body.

6. The vehicle of claim 1, further comprising a steering column positioned within the cab, wherein the driver seat and the steering column are centered about a central seating plane, wherein the central seating plane is positioned a distance from a side of the cab, and wherein the distance is less than 25% of a total width of the cab.

7. The vehicle of claim 1, further comprising A-pillars positioned at a front end of the cab, the A-pillars having a length of a least one meter to facilitate providing a lower hood position and a larger front windshield.

8. The vehicle of claim 7, wherein the A-pillars have an overlapping construction including an inner portion and an outer portion overlapping the inner portion.

9. The vehicle of claim 1, wherein the first door has a first height and the first window has a second height that is at least 50% of the first height.

10. The vehicle of claim 9, wherein the second height is at least 60% of the first height.

11. The vehicle of claim 1, wherein, when the driver seat is in the position that accommodates the operator being in the 95th male height percentile, the driver seat is positioned a distance of at least four inches forward of a rear edge of the first window.

12. The vehicle of claim 1, wherein each of the first angle and the second angle is at least 100 degrees.

13. The vehicle of claim 12, wherein the first angle is at least 110 degrees.

14. The vehicle of claim 13, wherein the first angle is at least 120 degrees.

15. The vehicle of claim 14, wherein the first angle is at least 130 degrees.

16. A vehicle comprising:
a chassis defining a longitudinal axis;
a cab coupled to the chassis, the cab having a driver side door with a window; and
a driver seat disposed within the cab;
wherein, when the driver seat is in a position that accommodates an operator being in a 95th male height percentile, the operator within the driver seat can see out of the window at an angle of at least 120 degrees relative to a forward looking direction that is parallel with the longitudinal axis.

17. The vehicle of claim 16, wherein the angle is at least 130 degrees.

18. The vehicle of claim 16, wherein, when the driver seat is in the position that accommodates the operator being in the 95th male height percentile, the driver seat is positioned a distance of at least four inches forward of a rear edge of the window.

19. The vehicle of claim 16, wherein the driver side door has a first height and the window has a second height that is at least 50% of the first height.

20. A vehicle comprising:
a chassis defining a longitudinal axis;
a cab coupled to the chassis, the cab having a first door with a first window and a second door with a second window;
a cargo body coupled to the chassis and positioned rearward of the cab;
a driver seat disposed within the cab; and
a steering column positioned within the cab;
wherein the driver seat and the steering column are centered about a central seating plane;
wherein the central seating plane is positioned a first distance from a side of the cab;
wherein the first distance is less than 25% of a total width of the cab;
wherein, when the driver seat is in a position that accommodates an operator being in a $95^{th}$ male height percentile, (i) the driver seat is positioned a second distance of at least four inches forward of a rear edge of the first window and (ii) the operator within the driver seat can see out of (a) the first window at a first angle relative to a forward looking direction that is parallel with the longitudinal axis and (b) the second window at a second angle relative to the forward looking direction;
wherein the first angle is at least 130 degrees; and
wherein the second angle is at least 100 degrees.

* * * * *